US012229587B2

(12) United States Patent
Kim et al.

(10) Patent No.: US 12,229,587 B2
(45) Date of Patent: Feb. 18, 2025

(54) COMMAND PROCESSOR, NEURAL CORE SOC AND METHOD FOR OBTAINING CONTEXT DATA USING THE SAME

(71) Applicant: REBELLIONS INC., Seongnam-si (KR)

(72) Inventors: Hongyun Kim, Seongnam-si (KR); Chang-Hyo Yu, Seongnam-si (KR); Yoonho Boo, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/621,936

(22) Filed: Mar. 29, 2024

(65) Prior Publication Data

US 2024/0330041 A1 Oct. 3, 2024

(30) Foreign Application Priority Data

Mar. 30, 2023 (KR) ........................ 10-2023-0042238

(51) Int. Cl.
*G06F 9/48* (2006.01)
*G06F 9/54* (2006.01)
*G06F 12/0831* (2016.01)

(52) U.S. Cl.
CPC ............ *G06F 9/4856* (2013.01); *G06F 9/544* (2013.01); *G06F 12/0835* (2013.01)

(58) Field of Classification Search
CPC ..... G06F 9/4856; G06F 9/544; G06F 12/0835
See application file for complete search history.

(56) References Cited

U.S. PATENT DOCUMENTS 11,182,314 B1 * 11/2021 Borkovic ............... G06N 3/063
11,561,833 B1 * 1/2023 Heaton ............... G06F 9/45504
2019/0213393 A1 * 7/2019 Liu ........................ G06N 3/063
2023/0021996 A1 * 1/2023 Lassance ............... G06N 3/047
2023/0259486 A1 * 8/2023 Han .................. G06F 15/17325 712/30

FOREIGN PATENT DOCUMENTS

KR 10-2258566 B1 6/2021

* cited by examiner

*Primary Examiner* — Qamrun Nahar
*Assistant Examiner* — Jonathan R Labud
(74) *Attorney, Agent, or Firm* — BROADVIEW IP LAW, PC

(57) ABSTRACT

A command processor determines whether a command descriptor describing a current command is in a first format or in a second format, wherein the first format includes a source memory address pointing to a memory area in a shared memory having a binary code to be accessed according to direct memory access (DMA) scheme, and the second format includes one or more object indices, a respective one of the one or more object indices indicating an object in an object database. If the command descriptor describing the current command is in the second format, the command processor converts a format of the command descriptor to the first format, generates one or more task descriptors describing neural network model tasks based on the command descriptor in the first format, and distributes the one or more task descriptors to the one or more neural processors.

20 Claims, 45 Drawing Sheets

COMMAND PROCESSOR, NEURAL CORE SOC AND METHOD FOR OBTAINING CONTEXT DATA USING THE SAME

CROSS-REFERENCE TO RELATED APPLICATION

This application claims priority under 35 U.S.C. § 119 to Korean Patent Application No. 10-2023-0042238, filed in the Korean Intellectual Property Office on Mar. 30, 2023, the entire contents of which are hereby incorporated by reference.

TECHNICAL FIELD

The present disclosure relates to a command processor, a neural core SoC, and a method for obtaining context data using the same. Specifically, the present disclosure relates to a command processor and a neural core SoC, which maximize efficiency by minimizing memory load using a separate data structure pool, and a method for obtaining context data using the same.

BACKGROUND

For recent years, artificial intelligence (AI) is discussed as the most promising technology worldwide as a core technology of the fourth Industrial Revolution. The biggest challenge of artificial intelligence would be computing performance. For the artificial intelligence that realizes human learning, reasoning, perception, and performance of natural language, the speed of processing big data is the key factor.

In the early days of artificial intelligence, the central processing unit (CPU) or graphics processing unit (GPU) of existing computers were used for the training and inference of the neural network models, but there is a limit to use them in the training and inference works of the neural network models with high workload. Therefore, in recent years, neural processing units (NPUs) structurally specialized for deep learning works are in the spotlight, and it is common to use the NPUs to perform work on neural network models.

In general, a neural network model includes a plurality of layers, and although each layer includes similar computations (e.g., convolution computations), the description of the computation for each layer should be performed every time, which may increase the memory load.

SUMMARY

An object of the present disclosure is to provide a command processor and a neural core SoC, which activate context using a data structure pool.

Another object of the present disclosure is to provide a method for acquiring context data with reduced memory load for the computation description.

The objects of the disclosure are not limited to the objects described above, and other objects and advantages of the disclosure that are not described can be understood by the following description and will be more clearly understood by the examples of the disclosure. In addition, it will be readily apparent that the objects and advantages of the disclosure can be realized by the means and combinations thereof indicated in the claims. According to some examples, a command processor may include a workload manager that receives a first doorbell from a host system and generates a task descriptor according to the first doorbell, and a neural processor interface that transmits the task descriptor to a neural processor and receives, from the neural processor, a report on the task descriptor, in which the workload manager may include a context manager that accesses a first buffer descriptor according to the first doorbell, acquires a context descriptor, and interprets the context descriptor, the context descriptor may include a first context dynamic object ID for a first context dynamic object, and a first context static object ID for a first context static object, and the first context dynamic object may include a variable parameter of the first context, and the first context static object may include an operation code of the first context.

According to some examples, the context manager may activate a first context using the first context dynamic object ID and the first context static object ID.

According to some examples, the interpreting the context descriptor by the context manager may include accessing a data structure pool of the host system to acquire the first context dynamic object corresponding to the first context dynamic object ID, and to acquire the first context static object corresponding to the first context static object ID.

According to some examples, the context manager may access a data structure pool of the host system to acquire a first data structure pool including the first context dynamic object ID, the first context dynamic object mapped to the first context dynamic object ID, the first context static object ID, and the first context static object mapped to the first context static object ID, and store the first data structure pool in a memory of a neural processing device that includes the neural processor.

According to some examples, the context manager may acquire, from the context descriptor, address information on the first command buffer area associated with the first doorbell.

According to some examples, the context manager may access the first command buffer area using the address information on the first command buffer area to acquire a command descriptor.

According to some examples, the first command buffer area may include information related to an address of at least one of a parameter area in which a parameter used for the first context is stored, an input data area in which input data is stored, and a neural core data area in which neural core data is stored.

According to some examples, the first command buffer area may include a command descriptor, and the command descriptor may include a first command dynamic object ID for a first command dynamic object and a first command static object ID for a first command static object.

According to some examples, the context manager may acquire the first command dynamic object and the first command static object using the first command dynamic object ID and the first command static object ID.

According to some examples, the workload manager may receive, from the first doorbell, information on a neural network model to be performed at the neural processor, acquire a first data structure pool from a data structure pool stored in the host system using the information on the neural network model, and acquire, using the first data structure pool, information on the first context dynamic object mapped to the first context dynamic object ID, the first context static object mapped to the first context static object ID, the first command dynamic object mapped to the first command dynamic object ID, and the first command static object mapped to the first command static object ID.

According to some examples, a neural core SoC may include a command processor that receives a first doorbell from a host system, interprets a context descriptor according to the first doorbell, and activates a first context, and a neural processor that performs computation according to the activated first context, in which the context descriptor may include a first context dynamic object ID and a first context static object ID, and the command processor may acquire, using the first context dynamic object ID and the first context static object ID, a variable parameter and an operation code for computation to be executed at the neural processor.

In some examples, the command processor may access a data structure pool stored in the host system to acquire the variable parameter and the operation code, the data structure pool may include the first context dynamic object ID, the first context static object ID, a first context dynamic object mapped to the first context dynamic object ID, and a first context static object mapped to the first context static object ID, and the first context dynamic object may include the variable parameter, and the first context static object includes the operation code.

In some examples, the host system may include a host off-chip memory that stores the data structure pool.

In some examples, the command processor may acquire at least part of the data structure pool to generate a first data structure pool, and acquire, using the first data structure pool, the variable parameter and the operation code.

In some examples, the command processor may receive, from the host system, information on a neural network model to be computed by the neural processor, and generate, using the information on the neural network model, the first data structure pool.

In some examples, the command processor may acquire address information on a first command buffer area from the context descriptor, and access, using an address of the first command buffer area, the first command buffer to acquire a command descriptor for the first context.

In some examples, the command descriptor may include a first command dynamic object ID for a first command dynamic object and a first command static object ID for a first command static object.

In some examples, wherein the command processor may access a data structure pool stored in the host system and acquire, using the first command dynamic object ID and the first command static object ID, the first command dynamic object and the first command static object.

According to some examples, a method for acquiring context data may be performed at a command processor according to instructions from a host system and may include receiving a first doorbell from the host system, accessing the host system according to the first doorbell to acquire a first context dynamic object ID and a first context static object ID included in a context descriptor, and accessing the host system to acquire a first context dynamic object mapped to the first context dynamic object ID and a first context static object mapped to the first context static object ID, in which the first context dynamic object may include information on a variable parameter to perform computation, and the first context static object includes information on an operation code to perform the computation.

In some examples, the method may further include acquiring address information on a first command buffer area included in the context descriptor, accessing, using the address information on the first command buffer area, the first command buffer area to acquire a first command dynamic object ID and a first command static object ID, and accessing the host system to acquire a first command dynamic object mapped to the first command dynamic object ID and a first command static object mapped to the first command static object ID. The command processor, the neural core SoC, and the method for acquiring context data using the same can simply generate a buffer description and a description of the command buffer by storing the dynamic objects and the static objects in the data structure pool, thereby reducing the memory load allocated to the description.

In addition, the dynamic objects and the static objects stored in the data structure pool are grouped according to the neural network model, allowing the command processor and the neural core SoC to access the host system easily and quickly.

In addition to the effects mentioned above, specific effects of the disclosure are described below while explaining specific details for carrying out the disclosure.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
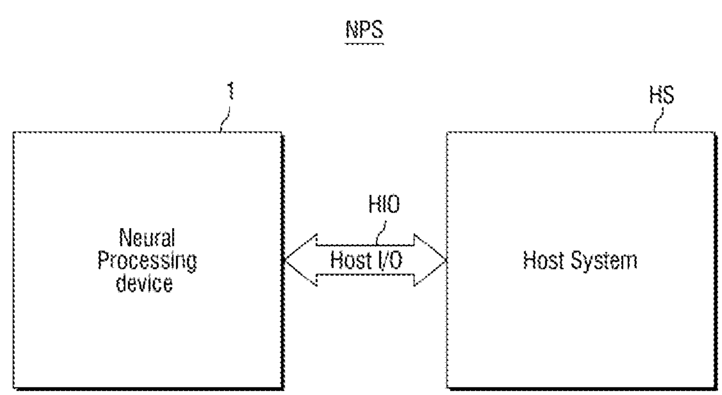
FIG. 1 is a block diagram provided to explain a neural processing system according to some examples.

The terms or words used herein should not be construed as limited to their general or dictionary meanings. According to the principle that the inventor may define the concepts of terms or words in order to explain his or her invention in the best way, it should be interpreted with a meaning and concept consistent with the technical idea of the disclosure. In addition, the examples described herein and the configurations shown in the drawings are merely one example for implementing the disclosure, and do not completely represent the technical idea of the disclosure, so it should be understood that there may be various equivalents, modifications, and applicable examples that may replace them at the time of filing this application.

Terms such as first, second, A, B and so on used in this specification and claims may be used in describing a variety of elements, but these elements should not be limited to the expression. The expressions are used only for the purpose of distinguishing one element from another. For example, without departing from the scope of the present disclosure, a first component may be referred to as a second component, and similarly, the second component may also be referred to as the first component. The term "and/or" includes a combination of a plurality of related described items or any of a plurality of related described items.

The terms used herein are merely used to describe specific examples and are not intended to limit the invention. Unless otherwise specified, a singular expression includes a plural expression. It should be understood that terms such as "include" or "have" used herein do not preclude the existence or possibility of addition of features, numbers, steps, operations, components, parts, or combinations thereof described herein. Terms such as "circuit," or "circuitry" may refer to a circuit on hardware, but may also refer to a circuit on software.

Unless defined otherwise, all expressions used herein, including technical or scientific expressions, have the same meaning as commonly understood by one of ordinary skill in the art to which the disclosure pertains.

Expressions such as those defined in commonly used dictionaries should be interpreted as having a meaning consistent with the meaning in the context of the relevant art and are to be interpreted as ideal or overly formal in meaning unless explicitly defined in the present application.

In addition, each configuration, process, step, method, or the like included in each example of the disclosure may be shared within the scope of not being technically contradictory to each other.

FIG. 1 is a block diagram provided to explain a neural processing system according to some examples.

Referring to FIG. 1, a neural processing system (NPS) according to some examples may include a neural processing device 1, a host system (HS), and a host interface (HIO).

The neural processing device 1 may be a device that performs computations using an artificial neural network. For example, a neural processing device 1 may be specialized for performing deep learning computational works. However, aspects are not limited to the above.

The term "neural processing device" is used herein, but aspects are not limited to this term. For example, the neural processing device 1 may be a processing device other than the neural processing unit. That is, the neural processing device 1 may be a graphics processing unit (GPU), a central processing unit (CPU), or other types of processing units. Hereinafter, for convenience, the neural processing device 1 will be described as the neural processing unit.

The host system (HS) may be a system that instructs the neural processing device 1 to perform a computational work (hereinafter referred to as a computational work) on a neural network model and retrieves the results of the computational work. Compared to the neural processing device 1, the host system (HS) may be a system that is not specialized for computational works. However, aspects are not limited to the above.

The host interface (HIO) may transmit data and control signals between the neural processing device 1 and the host system (HS). For example, the host interface (HIO) may transmit commands and data of the host system (HS) to the neural processing device 1, and accordingly, the neural processing device 1 may perform computational works. Upon completing the computational work, the neural processing device 1 may transmit the result to the host system (HS) through an interrupt request. For example, the host interface (HIO) may be PCI Express (PCIe), but is not limited thereto.

Figure 2:
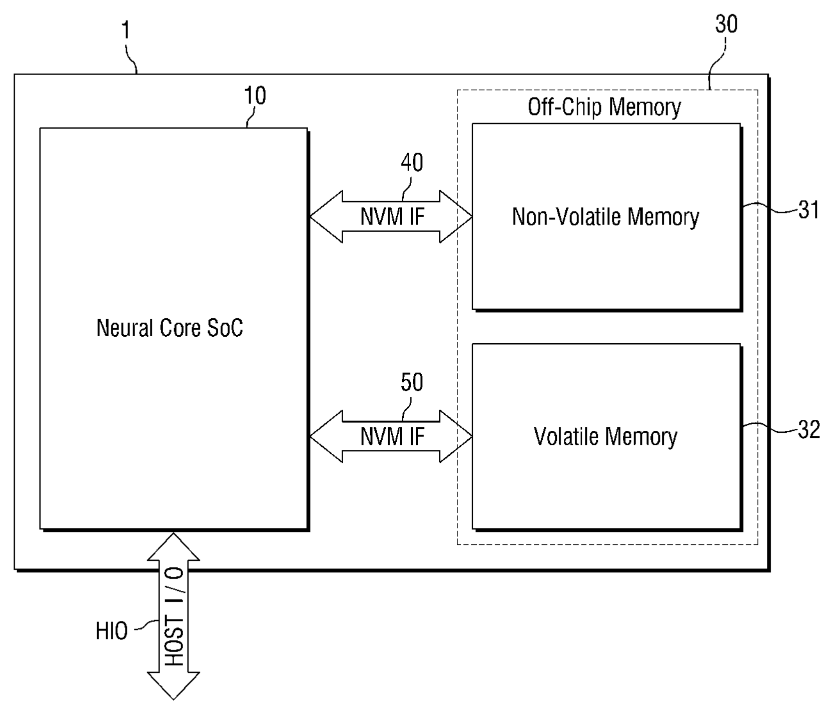
FIG. 2 is a block diagram provided to explain the neural processing device of FIG. 1 in detail.

FIG. 2 is a block diagram provided to explain the neural processing device of FIG. 1 in detail.

Referring to FIG. 2, the neural processing device 1 may include a neural core SoC 10, an off-chip memory 30, a non-volatile memory interface 40, and a volatile memory interface 50.

The neural core SoC 10 may be a System on Chip device. The neural Core SoC 10 is an artificial intelligence computing unit and may also be referred to as "accelerator". The neural core SoC 10 may be any one of a graphics processing unit (GPU), a field programmable gate array (FPGA), and an application-specific integrated circuit (ASIC), for example. However, aspects are not limited to the above.

The neural core SoC 10 may exchange data with other external computing units through a separate external interface. In addition, the neural core SoC 10 may be connected to a non-volatile memory 31 and a volatile memory 32 through the non-volatile memory interface 40 and the volatile memory interface 50, respectively.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVEPROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, and 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, the non-volatile memory interface 40 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, the volatile memory interface 50 may be at least one of Single Data Rate (SDR), Double Data Rate (DDR), Quad Data Rate (QDR), eXtreme Data Rate (XDR), and Octal Data Rate. However, aspects are not limited to the above.

Figure 3:
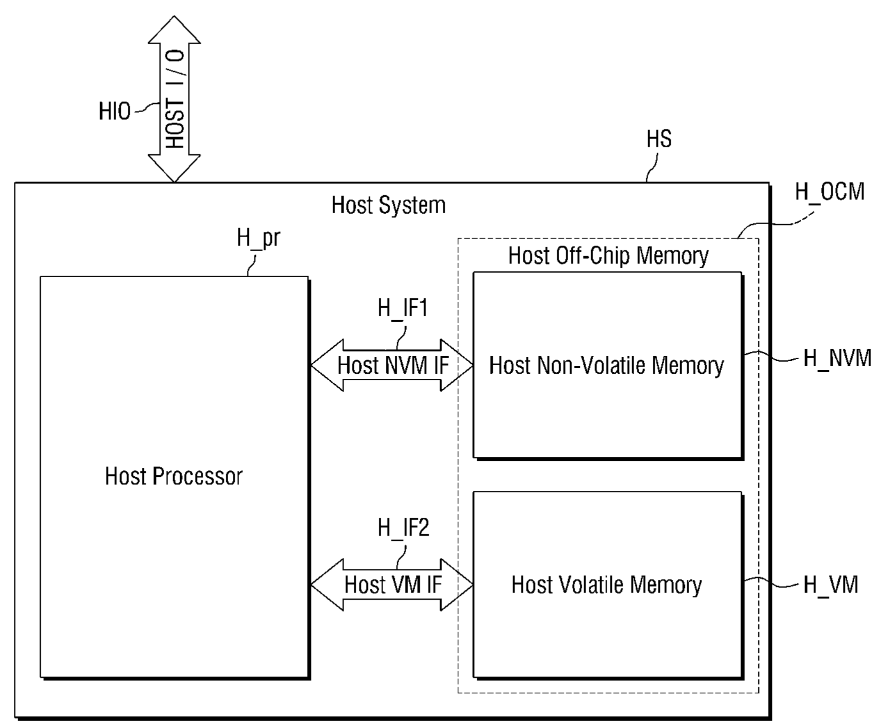
FIG. 3 is a block diagram provided to explain the host system of FIG. 1 in detail.

FIG. 3 is a block diagram provided to explain the host system of FIG. 1 in detail.

Referring to FIG. 3, the host system (HS) may include a host processor (H_pr), a host off-chip memory (H_OCM), a host non-volatile memory interface 7400, and a host volatile memory interface 7400.

The host processor (H_pr) may be a controller that controls the system of the first neural processing device 1 and executes the computations of the program. The host processor (H_pr) may be a general-purpose computing unit and may not be efficient to perform parallel simple computations frequently used in deep learning. Accordingly, efficiency can be increased by performing general computations or processing in the host processor (H_pr), and performing computational works for neural network models such as deep learning inference and learning in the neural core SoC 10.

The host processor (H_pr) may be connected to the host non-volatile memory (H_NVM) and the host volatile memory (H_VM) through the host non-volatile memory interface (H_IF1) and the host volatile memory interface (H_IF2), respectively.

The host processor (H_pr) may also transmit a task to the neural core SoC 10 through commands. The host processor (H_pr) may be an entity that gives instructions for works, and may be a kind of host that instructs the neural core SoC 10. That is, the neural core SoC 10 may efficiently perform parallel computational works such as deep learning works according to the instructions of the host processor (H_pr).

The host off-chip memory (H_OCM) may be memory placed outside the chip of the host processor (H_pr). The host off-chip memory (H_OCM) may include a host non-volatile memory (H_NVM) and a host volatile memory (H_VM).

The host non-volatile memory (H_NVM) may be a memory that continuously retains stored information even when there is no power supply. For example, the host non-volatile memory (H_NVM) may include at least one of ROM, PROM, EAROM, EPROM, EEPROM, UVEPROM, FeRAM, MRAM, PRAM, SONOS, RRAM, NRAM, magnetic computer memory, optical disk drive, and 3D crospoint memory. However, aspects are not limited to the above.

Unlike the host non-volatile memory (H_NVM), the host volatile memory (H_VM) may be a memory that continuously requires power in order to maintain stored information. For example, the host volatile memory (H_VM) may include at least one of DRAM, SRAM, SDRAM, and DDR SDRAM. However, aspects are not limited to the above.

For example, the host non-volatile memory interface (H_IF1) may each include at least one of PATA, SCSI, SAS, SATA, and PCIe. However, aspects are not limited to the above.

For example, each of the host volatile memory interface (H_IF2) may be at least one of SDR, DDR, QDR, and XDR. However, aspects are not limited to the above.

Figure 4:
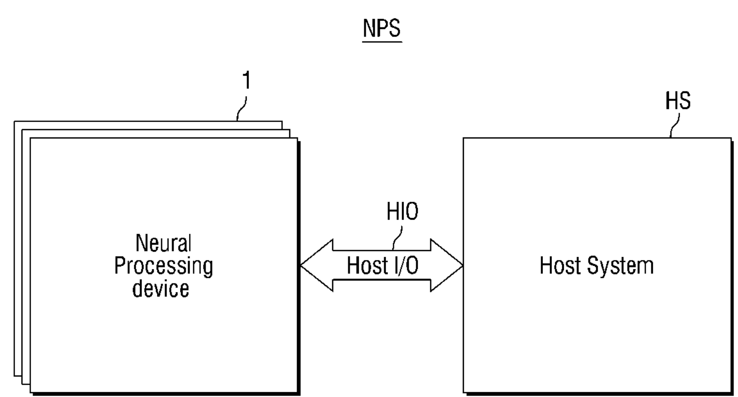
FIG. 4 is a block diagram provided to explain the neural processing system according to some examples.

FIG. 4 is a block diagram provided to explain the neural processing system according to some examples.

Referring to FIG. 4, a plurality of neural processing devices 1 may be provided. The neural processing device 1 may be connected to the host system (HS) through the host interface (HIO). While one host interface (HIO) is illustrated in the drawing, aspects are not limited thereto, and the host interface (HIO) may include a plurality of interfaces connecting each of the neural processing devices 1 and the host system (HS).

The plurality of neural processing devices 1 may exchange data and signals with one another. The plurality of neural processing devices 1 may transmit data and signals to one another via separate interfaces rather than the host system (HS). However, aspects are not limited to the above.

Figure 5:
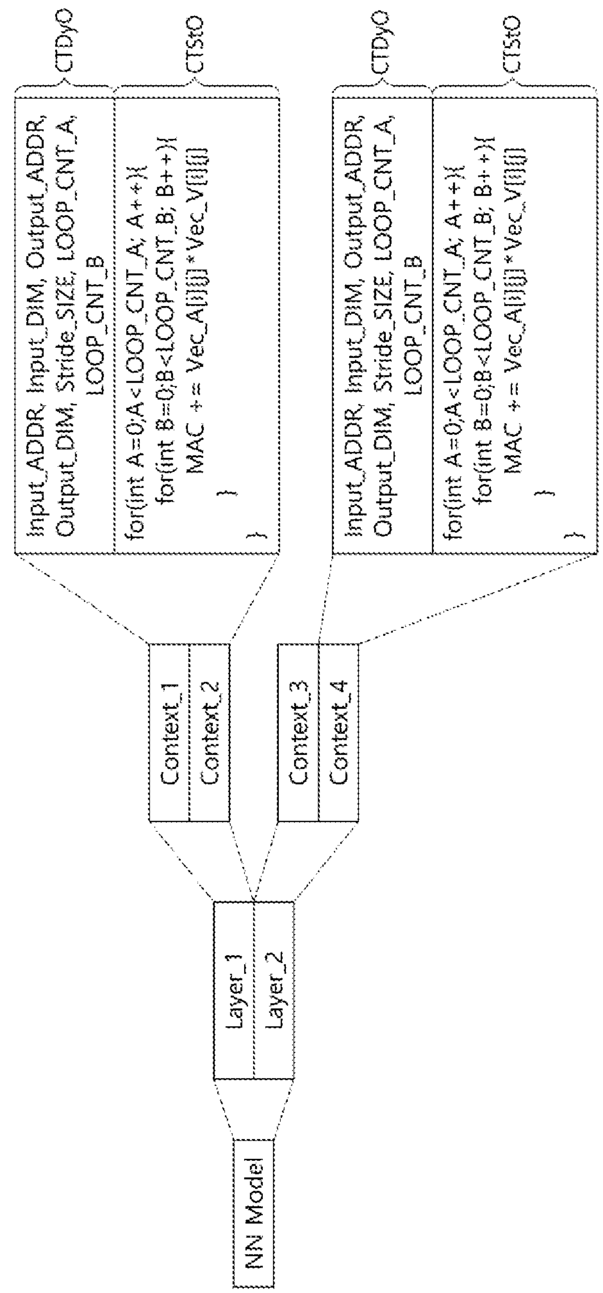
FIG. 5 is a diagram provided to explain a structure of a neural network model.

FIG. 5 is a diagram provided to explain a structure of a neural network model.

Referring to FIG. 5, the neural network model (NN Model) may include a plurality of layers. For example, the neural network model (NN Model) may include a first layer (Layer_1) and a second layer (Layer_2). FIG. 5 illustrates that the neural network model (NN Model) includes only two layers, but this is only for convenience of explanation and aspects are not limited thereto. For example, the neural network model (NN Model) may include one, or three or more layers.

The first layer (Layer_1) and the second layer (Layer_2) may each include a plurality of contexts. For example, the first layer (Layer_1) may include a first context (Context_1) and a second context (Context_2). In addition, the second layer (Layer_2) may include a third context (Context_3) and a fourth context (Context_4). FIG. 5 illustrates that the first layer (Layer_1) and the second layer (Layer_2) each include two contexts, but this is only for convenience of explanation and aspects are not limited thereto. For example, the first layer (Layer_1) may include one, or three or more contexts, and the second layer (Layer_2) may also include one, or three or more contexts.

The context may refer to a workload that should be performed in the neural processing device 1 to achieve a specific purpose. The context may include a plurality of commands. In other words, the context may be defined as a set of commands to achieve a specific purpose. Meanwhile, the command may include a plurality of tasks. That is, the neural processing device 1 may perform a command by performing a plurality of tasks and may perform a context by performing a plurality of commands.

Each context included in the layer may include a context dynamic object (CTDyO) and a context static object (CTStO). The context dynamic object (CTDyO) may include variables with varying values in each context even when the same type of computation (e.g., convolution computation) is performed in each context. Meanwhile, if the same type of computation is performed in each context, the context static object (CTStO) may include an operation code (or source code) with the same value. That is, when performing the same type of computation in different contexts, the context static object (CTStO) may have the same values, and only the context dynamic object (CTDyO) may have different values.

The host system (HS) may form the neural network model (NN Model) with a plurality of layers and describe a plurality of contexts in each layer. In some embodiments, the neural network model (NN Model) may repeat the same type of computations extremely many times. As described above, since each context includes the context static object (CTStO) with the same value, as the number of contexts to be described increases, the number of overlapping values in each context increases, thus increasing the memory load and reducing memory efficiency. A new data structure and system to solve this problem will be described with reference to FIGS. 6 to 16.

Figure 6:
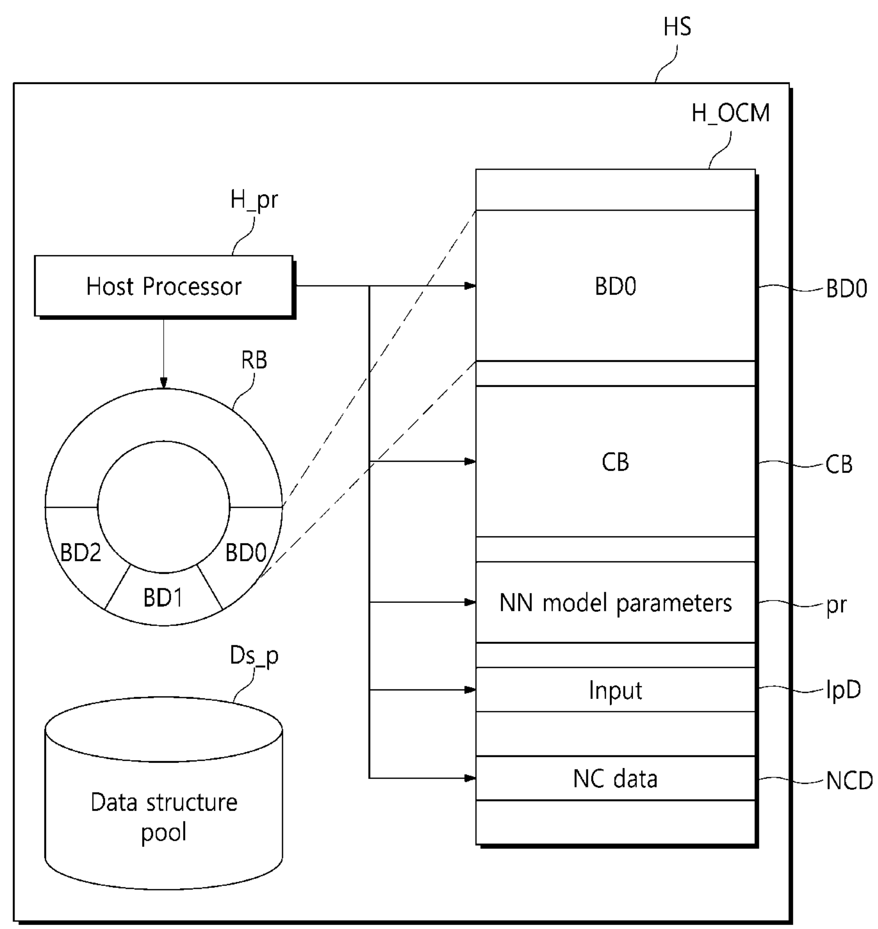
FIG. 6 is a diagram provided to explain data stored by the host processor of FIG. 3 in a host off-chip memory.

FIG. 6 is a diagram provided to explain data stored by the host processor of FIG. 3 in the host off-chip memory.

Referring to FIG. 6, the host system (HS) may include the host processor (H_pr), the host off-chip memory (H_OCM), and a data structure pool (Ds_p). The host processor (H_pr) may store computation data in a computation data area. The computation data may include at least one of neural network model parameter data, input data, and data for the neural processing device, that is, neural core data. However, aspects are not limited to the above.

For example, the neural network model parameter data may be stored in a parameter area (pr) of the host off-chip memory (H_OCM), and the input data may be stored in an input data area (IpD). Further, the neural core data may be stored in a neural core data area (NCD) of the host off-chip memory (H_OCM). In some embodiments, the neural network model parameter data may comprise weights for each of layers the current context of the neural network model. In some embodiments, the neural core data may contain one or more binary codes using the input data and the parameter data for the current context of the neural network model.

The host processor (H_pr) may generate a buffer descriptor. The buffer descriptor may include details about the context. The buffer descriptor may be stored in a ring buffer (RB). The ring buffer (RB) may be formed in the host off-chip memory (H_OCM) and is implemented such that the host system (HS) and the neural processing device 1 may sequentially store and access each area.

In FIG. 6, for example, first to third buffer descriptors may be stored in a first buffer descriptor area (BD0), a second buffer descriptor area (BD1), and a third buffer descriptor area (BD2), respectively. However, aspects are not limited to the above. Of course, the number of buffer descriptors and the number of buffer descriptor areas may vary. The ring buffer (RB) may generate the buffer descriptor areas in such a manner that empty areas in the limited memory area within the ring buffer (RB) are first filled and then the used areas are reused. That is, the ring buffer (RB) has a ring shape in which the first and last elements in the area are connected, thus allowing efficient use of the buffer memory in the limited area.

Further, the host processor (H_pr) may configure a command buffer in a command buffer area (CB) of the host off-chip memory (H_OCM). That is, the host processor (H_pr) may store all of buffer descriptors, command buffers, and computation data in the host off-chip memory (H_OCM). In some embodiments, the buffer descriptor and the command buffer may be referred to as the primary context descriptor and the second primary context descriptor, respectively.

The data structure pool (Ds_p) may include information on the context dynamic object (CTDyO) and the context static object (CTStO) described above. In other words, the data structure pool (Ds_p) may refer to a set of information on dynamic objects and static objects stored in the volatile and/or non-volatile memory of the host system (HS). A more detailed description will be given with further reference to FIG. 7.

Figure 7:
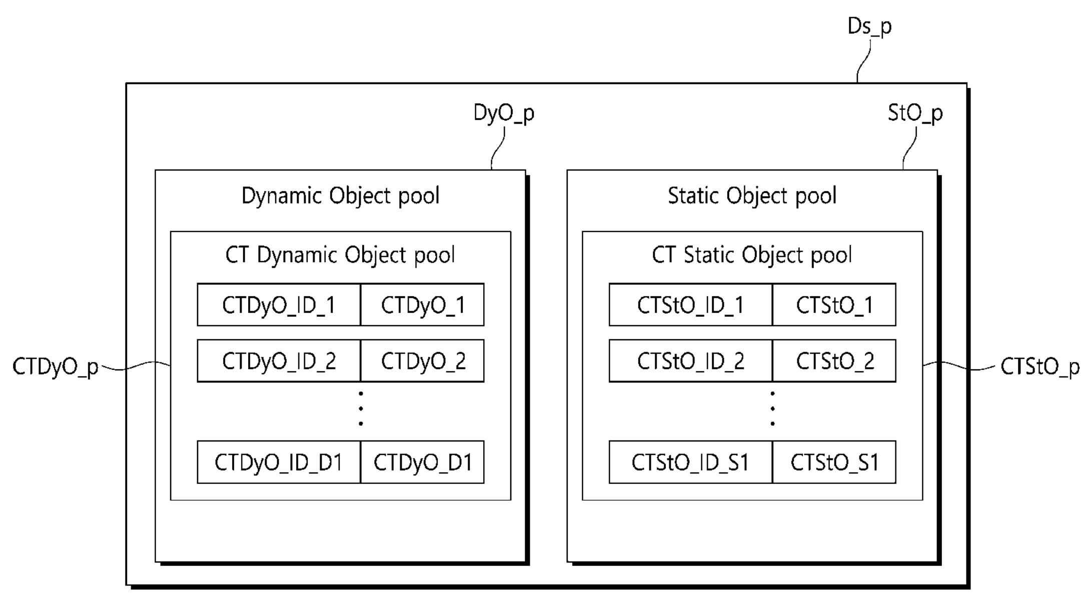
FIG. 7 is a diagram provided to explain a configuration of a data structure pool according to some examples.

FIG. 7 is a diagram provided to explain a configuration of a data structure pool according to some examples.

Referring to FIG. 7, the data structure pool (Ds_p) may include a dynamic object pool (DyO_p) and a static object pool (StO_p). The dynamic object pool (DyO_p) may store dynamic objects and associated dynamic object IDs. Likewise, the static object pool (StO_p) may store static objects and associated static object IDs. According to some examples, the size of the dynamic object may be larger than the size of the dynamic object ID. That is, the dynamic object ID may be an index or identifier to indicate an associated dynamic object. Likewise, the size of the static object may be larger than the size of the static object ID. That is, the static object ID may be an index or identifier to indicate an associated static object.

According to some examples, the dynamic object pool (DyO_p) may include a context dynamic object pool (CTDyO_p), and the static object pool (StO_p) may include a context static object pool (CTStO_p).

The context dynamic object pool (CTDyO_p) may include information on one or more context dynamic object IDs, and one or more context dynamic objects each mapped to the one or more context dynamic object IDs.

For example, the context dynamic object pool (CTDyO_p) may include a first context dynamic object ID (ID_CTDyO_1), and a first context dynamic object (CTDyO_1) mapped to the first context dynamic object ID (ID_CTDyO_1), a second context dynamic object ID (ID_CTDyO_2), and a second context dynamic object (CTDyO_2) mapped to the second context dynamic object ID (ID_CTDyO_2), and a D1-th context dynamic object ID (ID_CTDyO_D1), and a D1-th context dynamic object (CTDyO_D1) mapped to the D1-th context dynamic object ID (ID_CTDyO_D1).

In addition, the context static object pool (CTStO_p) may include information on one or more context static object IDs, and one or more context static objects each mapped to one or more context static object IDs.

For example, the context static object pool (CTStO_p) may include a first context static object ID (ID_CTStO_1), and a first context static object (CTStO_1) mapped to the first context static object ID (ID_CTStO_1), a second context static object ID (ID_CTStO_2), and a second context static object (CTStO_2) mapped to the second context static object ID (ID_CTStO_2), and an S1 context static object ID (ID_CTStO_S1), and an S1 context static object (CTStO_S1) mapped to the S1 context static object ID (ID_CTStO_S1). Examples of the context dynamic objects and the context static objects will be described with further reference to FIG. 8.

Figure 8:
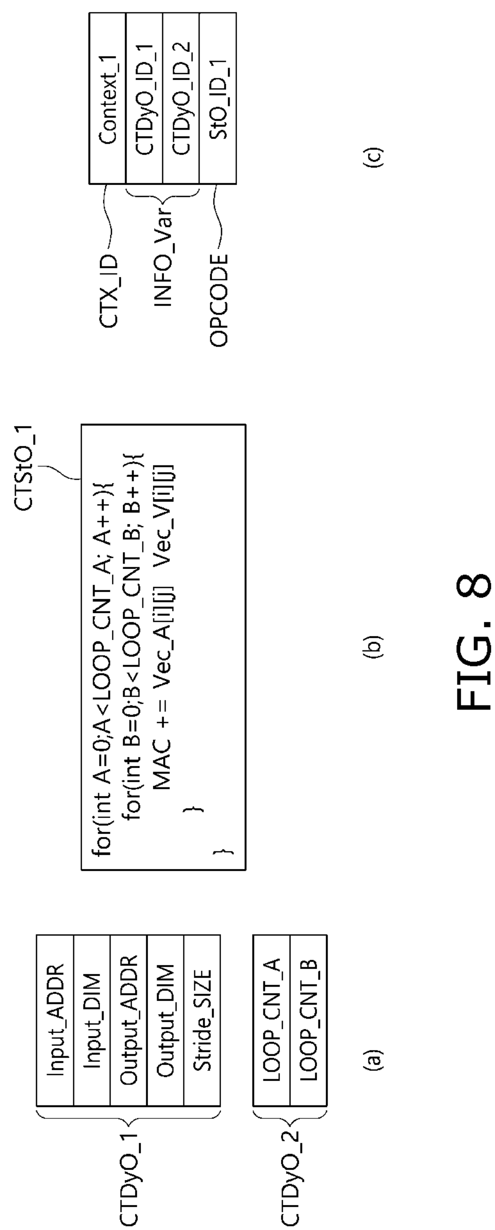
FIG. 8 shows diagrams illustrating a context dynamic object and a context static object according to some examples.

FIG. 8 shows diagrams illustrating a context dynamic object and a context static object according to some examples.

First, a part (a) of FIG. 8 illustrates an example of the context dynamic object. According to a part (a) of FIG. 8, the first context dynamic object (CTDyO_1) may include information on input address (Input_ADDR), input memory (Input_DIM), output address (Output_ADDR), output memory (Output_DIM), and stride size (Stride_Size). In addition, the second context dynamic object (CTDyO_2) may include information on loop count A (LOOP_CNT_A) and loop count B (LOOP_CNT_B). The information on input address (Input_ADDR), input memory (Input_DIM), output address (Output_ADDR), output memory (Output_DIM), stride size (Stride_Size), loop count A (LOOP_CNT_A), and loop count B (LOOP_CNT_B) may be variables that may be different for each context. Therefore, the information on input address (Input_ADDR), input memory (Input_DIM), output address (Output_ADDR), output memory (Output_DIM), stride size (Stride_Size), loop count A (LOOP_CNT_A), and loop count B (LOOP_CNT_B) may all be managed as the context dynamic objects.

Meanwhile, a part (b) of FIG. 8 illustrates an example of the context static object. According to a part (b) of FIG. 8, the first context static object (CTStO_1) may include an operation code for a multiply and accumulate (MAC) computation that is performed repeatedly. The number of repetitions of the multiplication and accumulation computation may be adjusted according to the loop count A (LOOP_CNT_A) and loop count B (LOOP_CNT_B) included in the second context dynamic object (CTDyO_2).

A part (c) of FIG. 8 illustrates an example of a descriptor (hereinafter referred to as a context descriptor) indicating details about a context to be stored in the first buffer descriptor area (BD0). The context descriptor may include context ID (CTX_ID), variable information (INFO_var), and operation code (OPCODE). However, aspects are not limited to the above, and the context descriptor may further include address information for the command buffer area (CB), in addition to the context ID (CTX_ID), the variable information (INFO_var), and the operation code (OPCODE).

According to some examples, the context ID (CTX_ID) is information indicating what the contexts is. For example, the context ID (CTX_ID) may be the first context (Context_1). The variable information (INFO_var) may include information on variables related to the context. In addition, the operation code (OPCODE) may include information on the operation code (or source code) related to the context. In other words, the variable information (INFO_var) may be information on a context dynamic object related to the context, and the operation code (OPCODE) may be information on a static object related to the context.

The variable information (INFO_var) may include the first context dynamic object ID (ID_CTDyO_1) and the second context dynamic object ID (ID_CTDyO_2). In other words, the variable information (INFO_var) included in the context descriptor that describes the first context (Context_1) may not directly describe the first context dynamic object (CTDyO_1) and the second context dynamic object (CTDyO_2), but may describe the first context dynamic object ID (ID_CTDyO_1) and the second context dynamic object ID (ID_CTDyO_2). As described above, since the size of the context dynamic object ID is smaller than the size of the context dynamic object, describing the variable information (INFO_var) with the context dynamic object ID rather than describing it with the context dynamic object may reduce the load on memory, thereby increasing memory efficiency.

In addition, the operation code (OPCODE) may include the first context static object ID (ID_CTStO_1). In other words, the operation code (OPCODE) included in the context descriptor that describes the first context (Context_1) may not directly describe the first context static object (CTStO_1), but may describe the first context static object ID (ID_CTStO_1). Likewise, since the size of the context static object ID is smaller than the size of the context static object, describing the operation code (OPCODE) with the context static object ID rather than describing it with the context static object may reduce the load on memory, thereby increasing memory efficiency.

In summary, the context descriptor stored in the first buffer descriptor area (BD0) may include the information related to the context ID (CTX_ID), the variable information (INFO_var), the operation code (OPCODE), the address of the command buffer area (CB), etc. The context descriptor may describe variable information (INFO_var) with the context dynamic object ID and describe the operation code (OPCODE) with the context static object ID. The operation between the host system (HS) and the neural processing device 1 will be further described with reference to FIG. 9.

Figure 9:
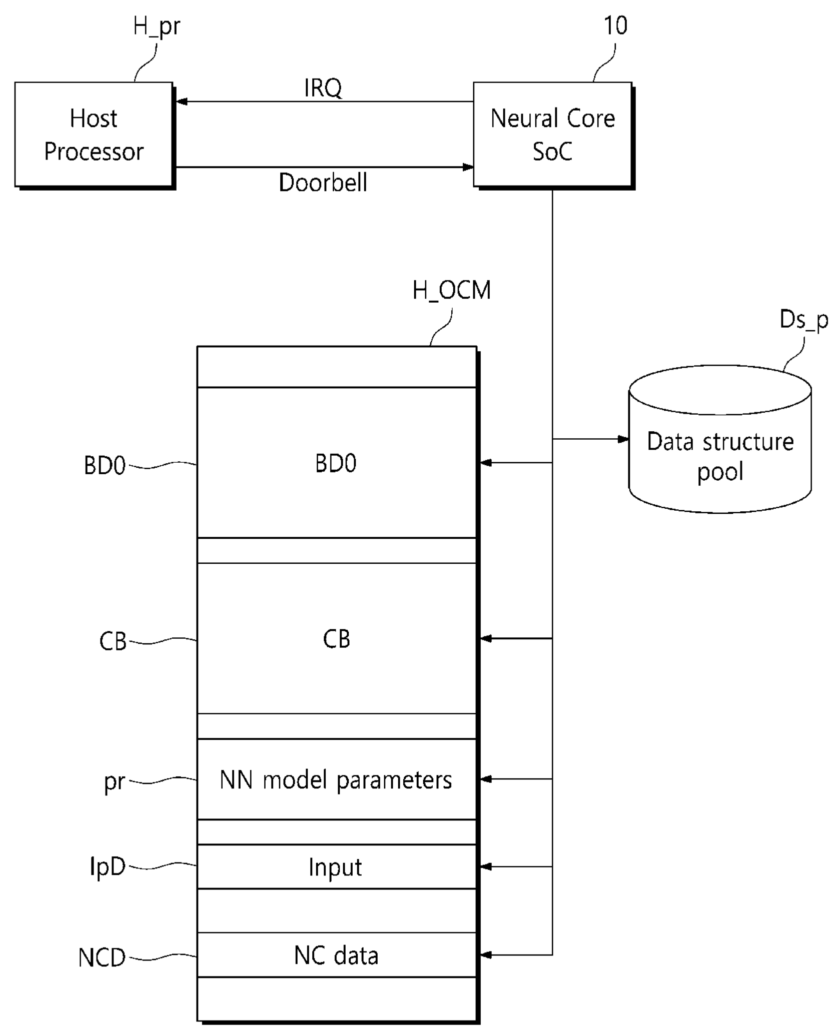
FIG. 9 is a diagram provided to explain interaction between a host system and a neural processing unit according to some examples.

FIG. 9 is a diagram provided to explain interaction between a host system and a neural processing unit according to some examples.

Referring to FIGS. 7 to 9, the host processor (H_pr) may transmit a doorbell to the neural core SoC 10. The doorbell may include information on the buffer descriptor area that should be read by the neural core SoC 10. In some embodiments, a context start signal indicating a start of a context of the neural network model may be referred to as the doorbell.

In some embodiments, a work that should be performed in the neural processing device 1 to achieve a specific purpose may be referred to as the context. The context may include a plurality of commands. In some embodiments, a set of commands to achieve a specific purpose may be referred to as the context. In some embodiments, the command may include a plurality of tasks. In some embodiments, the neural processing device 1 may perform a command by performing a plurality of tasks and may perform a context by performing a plurality of commands.

Based on the received doorbell, the neural core SoC 10 may read and decode the first buffer descriptor area (BD0) in the host off-chip memory (H_OCM) to interpret the context descriptor. As described above, the context descriptor may include the context ID (CTX_ID), the variable information (INFO_var), the operation code (OPCODE), the address for the command buffer area (CB), etc. The variable information (INFO_var) may include the context dynamic object ID, and the operation code (OPCODE) may include the context static object ID. It will be assumed herein that the variable information (INFO_var) includes the first context dynamic object ID (ID_CTDyO_1) and the second context dynamic object ID (ID_CTDyO_2), and the operation code (OPCODE) includes the first context static object ID (ID_CTStO_1).

The neural core SoC 10 may access the data structure pool (Ds_p) to interpret the variable information (INFO_var) of the context descriptor. The neural core SoC 10 may access the data structure pool (Ds_p) and acquire the first context dynamic object (CTDyO_1) mapped to the first context dynamic object ID (ID_CTDyO_1). In addition, the neural core SoC 10 may access the data structure pool (Ds_p) and acquire the second context dynamic object (CTDyO_2) mapped to the second context dynamic object ID (ID_CTDyO_2). In other words, the neural core SoC 10 may use the data structure pool (Ds_p) to interpret the first context dynamic object ID (ID_CTDyO_1) and the second context dynamic object ID (ID_CTDyO_2) included in the variable information (INFO_var) and acquire the first context dynamic object (CTDyO_1) and the second context dynamic object (CTDyO_2).

Likewise, the neural core SoC 10 may access the data structure pool (Ds_p) to interpret the operation code (OPCODE) of the context descriptor. The neural core SoC 10 may access the data structure pool (Ds_p) and acquire the first context static object (CTStO_1) mapped to the first context static object ID (ID_CTStO_1). In other words, the neural core SoC 10 may use the data structure pool (Ds_p) to interpret the first context static object ID (ID_CTStO_1) included in the operation code (OPCODE) and acquire the first context static object (CTStO_1).

The neural core SoC 10 may acquire the address for the command buffer area (CB) included in the context descriptor. The neural core SoC 10 may interpret the command buffer area (CB). The command buffer area (CB) may store a descriptor (hereinafter referred to as command descriptor) indicating details about the command. The command descriptor may include a command dynamic object ID and a command static object ID. A detailed description will be given with further reference to FIGS. 10 and 11.

Figure 10:
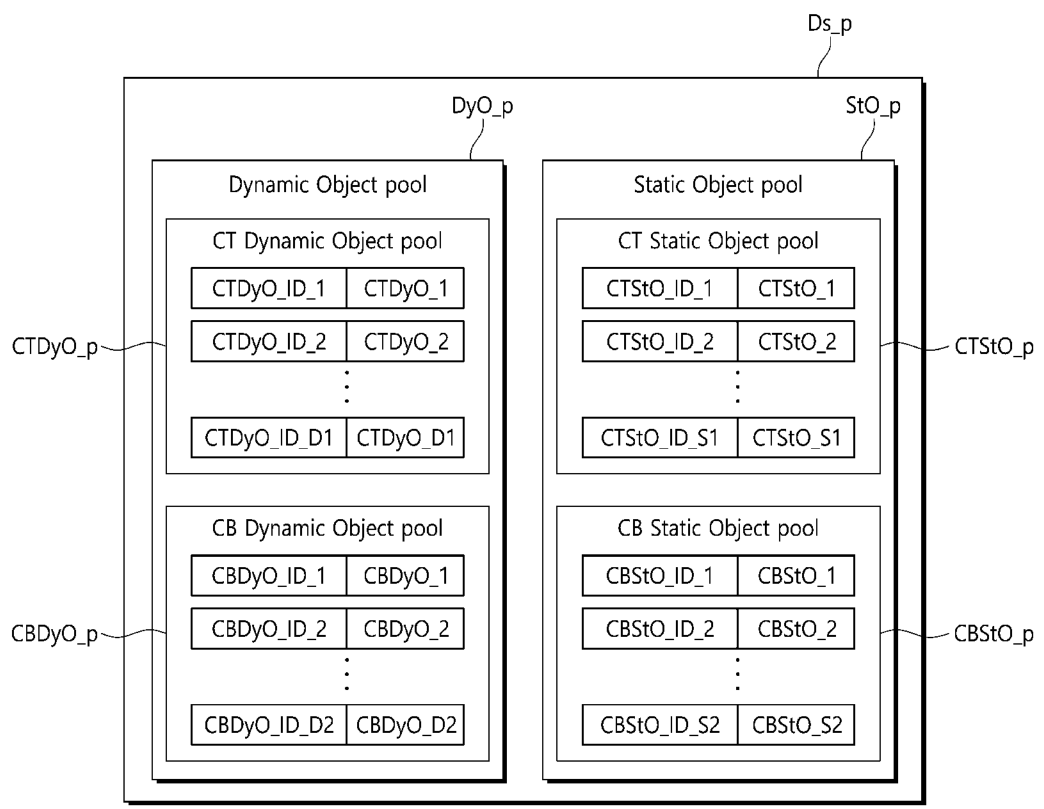
FIG. 10 is a diagram provided to explain the configuration of the data structure pool according to some other examples.

FIG. 10 is a diagram provided to explain the configuration of the data structure pool according to some other examples. For convenience of explanation, the elements or operations same as or similar to those described above will be omitted or briefly explained.

Referring to FIG. 10, the data structure pool (Ds_p) may include a dynamic object pool (DyO_p) and a static object pool (StO_p). The dynamic object pool (DyO_p) may store dynamic objects and associated dynamic object IDs. Likewise, the static object pool (StO_p) may store static objects and associated static object IDs. According to some examples, the size of the dynamic object may be larger than the size of the dynamic object ID, and the size of the static object may be larger than the size of the static object ID.

According to some examples, the dynamic object pool (DyO_p) may include a context dynamic object pool (CTDyO_p) and a command dynamic object pool (CBDyO_p). In addition, the static object pool (StO_p) may include a context static object pool (CTStO_p) and a command static object pool (CBStO_p).

The context dynamic object pool (CTDyO_p) may include information on one or more context dynamic object IDs, and one or more context dynamic objects each mapped to the one or more context dynamic object IDs.

For example, the context dynamic object pool (CTDyO_p) may include a first context dynamic object ID (ID_CTDyO_1), and a first context dynamic object (CTDyO_1) mapped to the first context dynamic object ID (ID_CTDyO_1), a second context dynamic object ID (ID_CTDyO_2), and a second context dynamic object (CTDyO_2) mapped to the second context dynamic object ID (ID_CTDyO_2), and a D1-th context dynamic object ID (ID_CTDyO_D1), and a D1-th context dynamic object (CTDyO_D1) mapped to the D1-th context dynamic object ID (ID_CTDyO_D1).

The context static object pool (CTStO_p) may include information on one or more context static object IDs, and one or more context static objects each mapped to one or more context static object IDs.

For example, the context static object pool (CTStO_p) may include a first context static object ID (ID_CTStO_1), and a first context static object (CTStO_1) mapped to the first context static object ID (ID_CTStO_1), a second context static object ID (ID_CTStO_2), and a second context static object (CTStO_2) mapped to the second context static object ID (ID_CTStO_2), and an S1 context static object ID (ID_CTStO_S1), and an S1 context static object (CTStO_S1) mapped to the S1 context static object ID (ID_CTStO_S1).

The command dynamic object pool (CBDyO_p) may include information on one or more command dynamic object IDs, and one or more command dynamic objects each mapped to one or more command dynamic object IDs.

For example, the command dynamic object pool (CBDyO_p) may include a first command dynamic object ID (ID_CBDyO_1), and a first command dynamic object (CBDyO_1) mapped to the first command dynamic object ID (ID_CBDyO_1), a second command dynamic object ID (ID_CBDyO_2), and a second command dynamic object (CBDyO_2) mapped to the second command dynamic object ID (ID_CBDyO_2), and a D2-th command dynamic object ID (ID_CBDyO_D2), and a D2-th command dynamic object (CBDyO_D2) mapped to the D2-th command dynamic object ID (ID_CBDyO_D2).

The command static object pool (CBStO_p) may include information on one or more command static object IDs, and one or more command static objects each mapped to one or more command static object IDs.

For example, the command static object pool (CBStO_p) may include a first command static object ID (ID_CBStO_1), and a first command static object (CBStO_1) mapped to the first command static object ID (ID_CBStO_1), a second command static object ID (ID_CBStO_2), and a second command static object (CBStO_2) mapped to the second command static object ID (ID_CBStO_2), and an S2-th command static object ID (ID_CBStO_S2), and a S2-th command static object (CBStO_S2) mapped to the S2-th command static object ID (ID_CBStO_S2). Examples of command dynamic objects and the command static objects will be described with further reference to FIG. 11.

Figure 11:
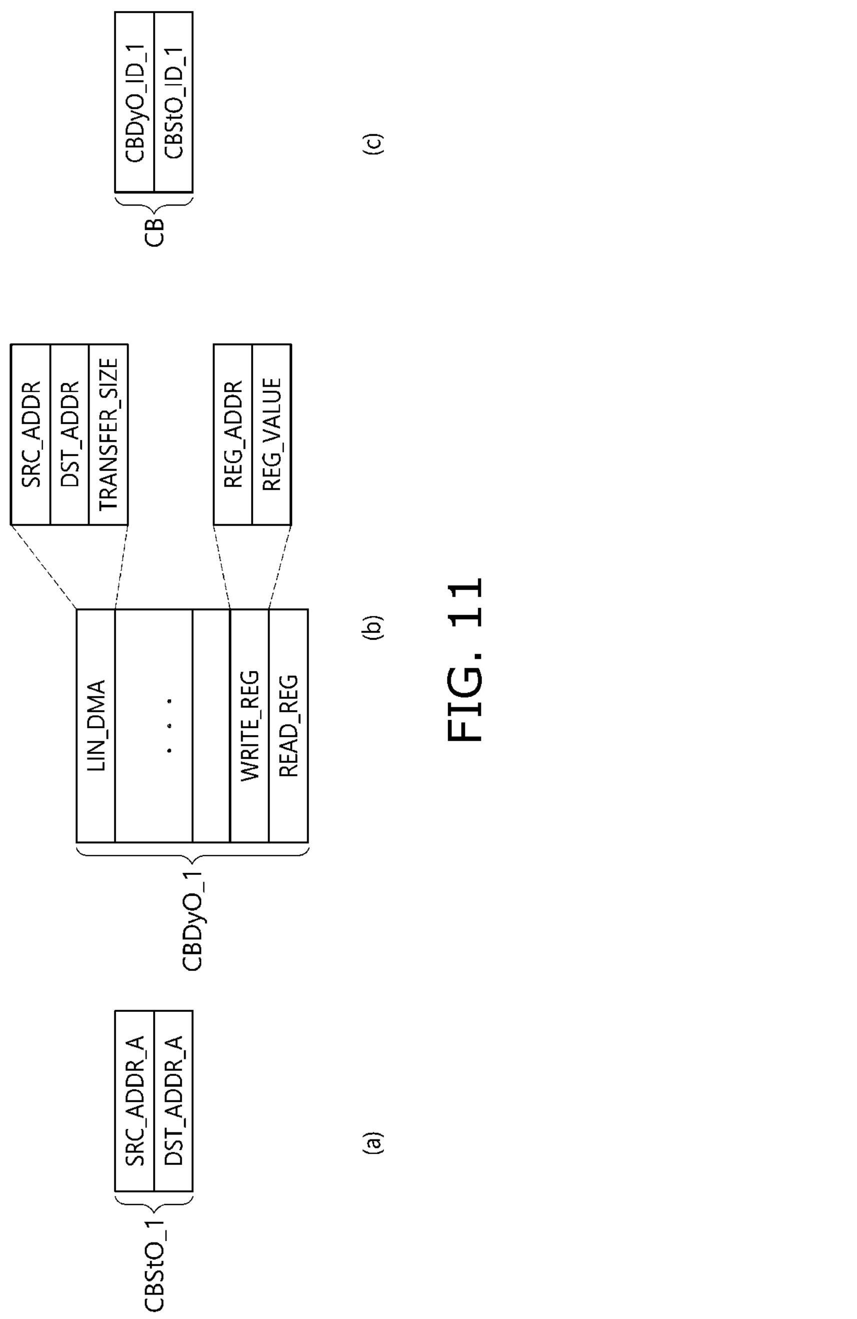
FIG. 11 shows diagrams illustrating a command dynamic object and a command static object according to some examples.

FIG. 11 shows diagrams illustrating a command dynamic object and a command static object according to some examples.

First, a part (a) of FIG. 11 illustrates an example of the command static object. According to a part (a) of FIG. 11, the first command static object (CBStO_1) may include a source address (SRC_ADDR_A) and a destination address (DST_ADDR_A). The source address (SRC_ADDR_A) may refer to an address of a device that transmitted the command or context, that is, it may refer to the address of the host system (HS). In addition, the destination address (DST_ADDR_A) may refer to an address of a device receiving the command or context, that is, it may refer to the address of the neural processing device 1. Since the source address (SRC_ADDR_A) and the destination address (DST_ADDR_A) always have the same value in all commands, they may be managed as the first command static object (CBStO_1).

Meanwhile, a part (b) of FIG. 11 illustrates an example of the command dynamic object. According to a part (b) of FIG. 11, the first command dynamic object (CBDyO_1) may include information (LIN_DMA) on the memory in which data is stored, write register information (WRITE_REG), read register information (READ_REG), etc. The information (LIN_DMA) on the memory in which data is stored may include an address of input data (SRC_ADDR), an address of output data (DST_ADDR), and a data transfer size (TRANSFER_SIZE) of the corresponding memory. In addition, the write register information (WRITE_REG) and the read register information (READ_REG) may include a register address (REG_ADDR) and a register value (REG_VALUE), respectively.

A part (c) of FIG. 11 illustrates an example of a command descriptor to be stored in the command buffer area (CB). The command descriptor may include a first command dynamic object ID (ID_CBDyO_1) and a first command static object ID (ID_CBStO_1).

According to some examples, the command descriptor stored in the command buffer area (CB) may not directly include the first command dynamic object (CBDyO_1) and the first command static object (CBStO_1), but may include the first command dynamic object ID (ID_CBDyO_1) related to the first command dynamic object (CBDyO_1) and the first command static object ID (ID_CBStO_1) related to the first command static object (CBStO_1). As described above, since the size of the command dynamic object ID is smaller than the size of the command dynamic object, and the size of the command static object ID is smaller than the size of the command static object, the memory load of the command buffer area (CB) may be reduced, thereby increasing memory efficiency.

In summary, the command descriptor stored in the command buffer area (CB) may include object IDs related to the source address (SRC_ADDR_A), the destination address (DST_ADDR_A), the information (LIN_DMA) on the memory in which the data is stored, the write register information (WRITE_REG), and the read register information (READ_REG). The command descriptor may describe the information related to the source address (SRC_ADDR_A) and the destination address (DST_ADDR_A) with the command static object ID, and describe the information related to the information (LIN_DMA) on the memory in which data is stored, the write register information (WRITE_REG), and the read register information (READ_REG) with the command dynamic object ID.

Referring again to FIGS. 9 and 10, the neural core SoC 10 may access the first buffer descriptor area (BD0) to acquire address information on the command buffer area (CB). The neural core SoC 10 may access the command buffer area (CB) to acquire, decode, and interpret the command descriptor.

For convenience of explanation, it will be assumed herein that the command descriptor includes the first command dynamic object ID (ID_CBDyO_1) and the first command static object ID (ID_CBStO_1). According to some examples, the neural core SoC 10 may access the data structure pool (Ds_p) to interpret the first command dynamic object ID (ID_CBDyO_1) included in the command descriptor. The neural core SoC 10 may acquire, from the command dynamic object pool (CBDyO_p) of the data structure pool (Ds_p), the first command dynamic object (CBDyO_1) mapped to the first command dynamic object ID (ID_CBDyO_1). In addition, the neural core SoC 10 may access the data structure pool (Ds_p) to interpret the first command static object ID (ID_CBStO_1) included in the command descriptor. The neural core SoC 10 may acquire, from the command static object pool (CBStO_p) of the data structure pool (Ds_p), the first command static object (CBStO_1) mapped to the first command static object ID (ID_CBStO_1). The neural core SoC 10 may acquire, through the acquired information, address information on areas where the data is stored, that is, address information on the parameter area (pr), the input data area (IpD), and the neural core data area (NCD) where the first computation data is located, and perform works accordingly.

The neural core SoC 10 may send an interrupt request (IRQ) to the host processor (H_pr), if the interrupt request (IRQ) to the host processor (H_pr) is required during or after the work.

Figure 12:
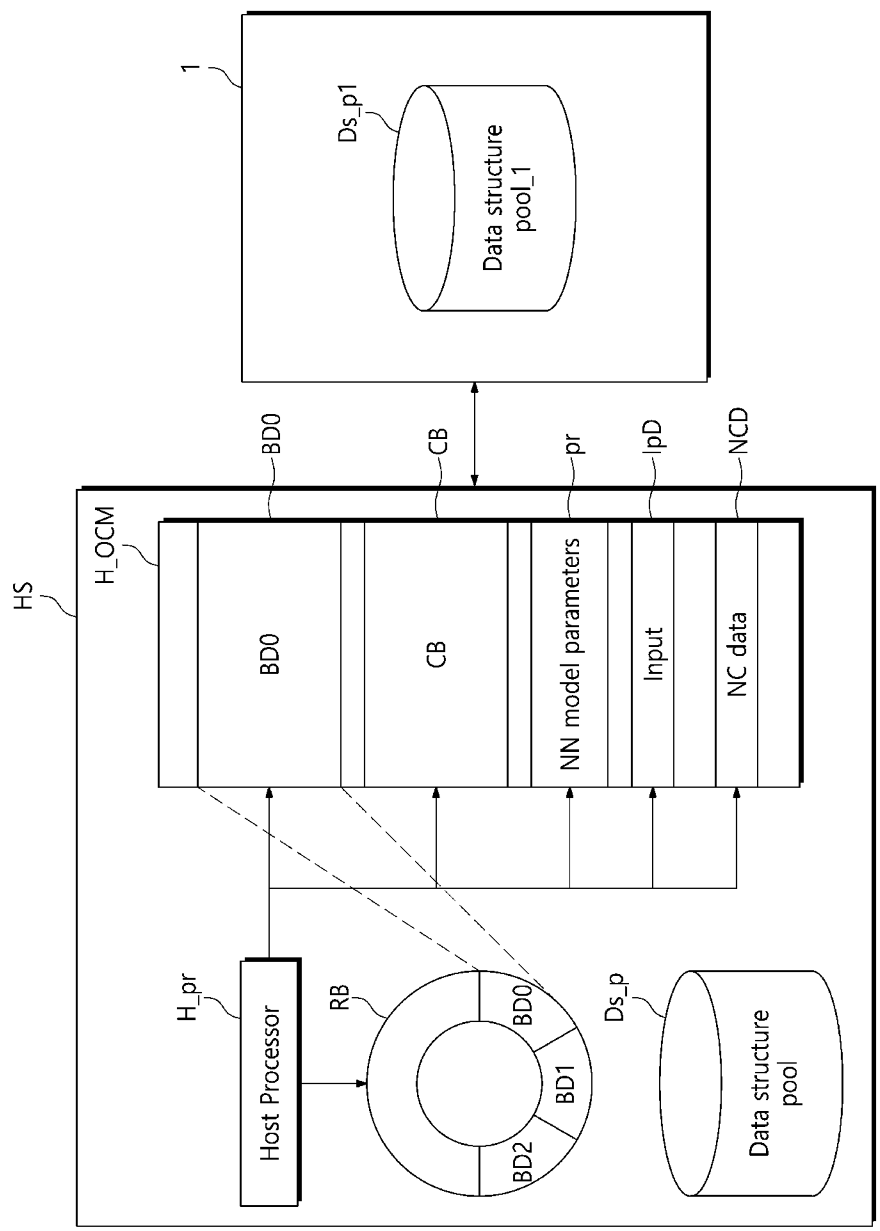
FIG. 12 is a diagram provided to explain interaction between the host system and the neural processing unit according to some other examples.

FIG. 12 is a diagram provided to explain interaction between the host system and the neural processing unit according to some other examples. For convenience of explanation, the elements or operations same as or similar to those described above will be omitted or briefly explained.

Referring to FIG. 12, unlike FIG. 9, the neural processing device 1 may load at least part of the data structure pool (Ds_p) from the host system (HS) and manage it as a first data structure pool (Ds_p1). In other words, in order to shorten the time required to interpret the context descriptor and the command descriptor, the neural processing device 1 may load at least part of the data structure pool (Ds_p), store as a first data structure pool (Ds_p1), and manage the same. That is, the first data structure pool (Ds_p1) may refer to a set of information on dynamic objects and static objects stored in the volatile and/or non-volatile memory of the neural processing device 1. An example of the first data structure pool (Ds_p1) managed by the neural processing device 1 will be described with further reference to FIGS. 13 to 15.

Figure 13:
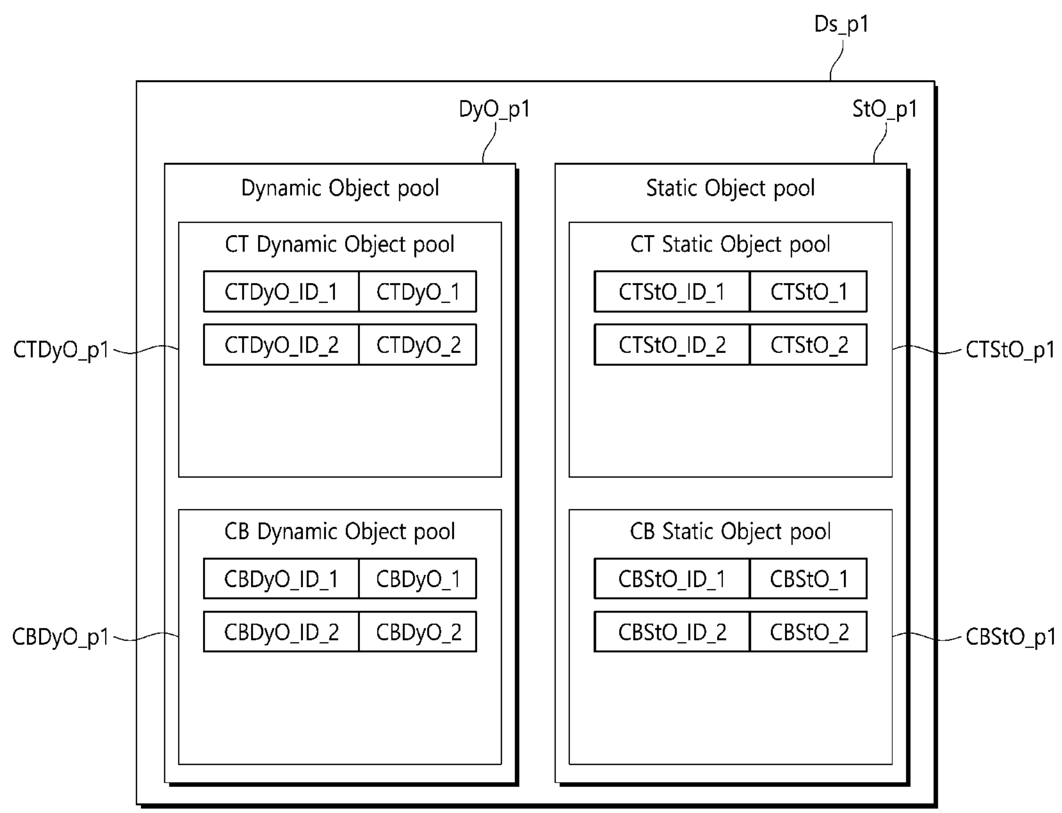
FIGS. 13 to 15 are diagrams provided to explain the configuration of a first data structure pool according to some examples.
Figure 14:
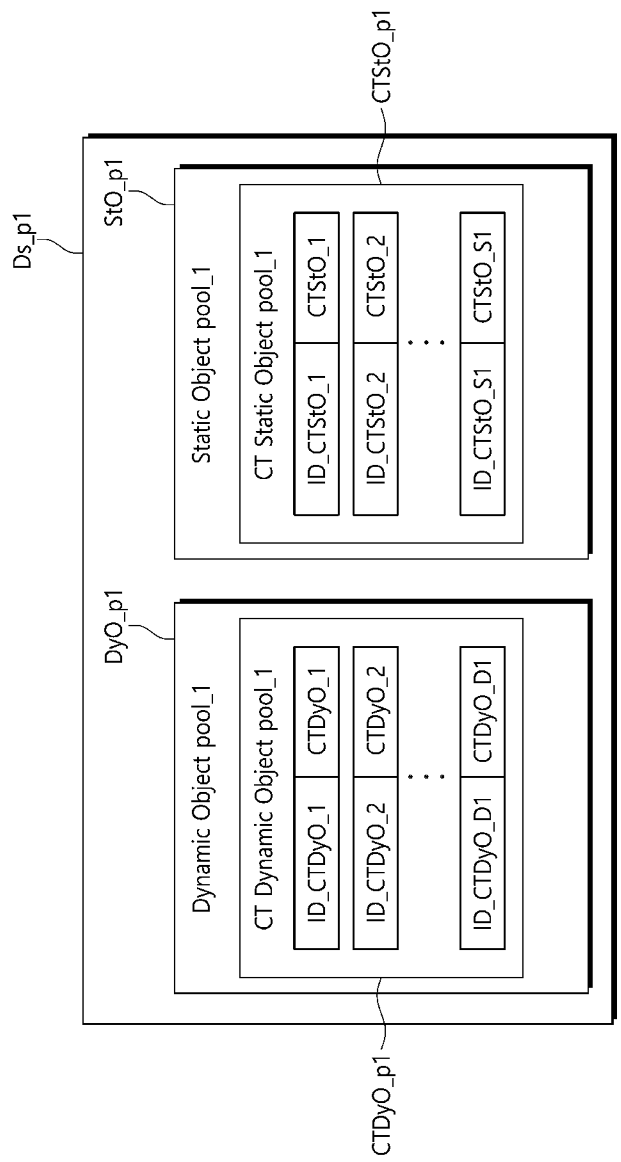
Figure 15:
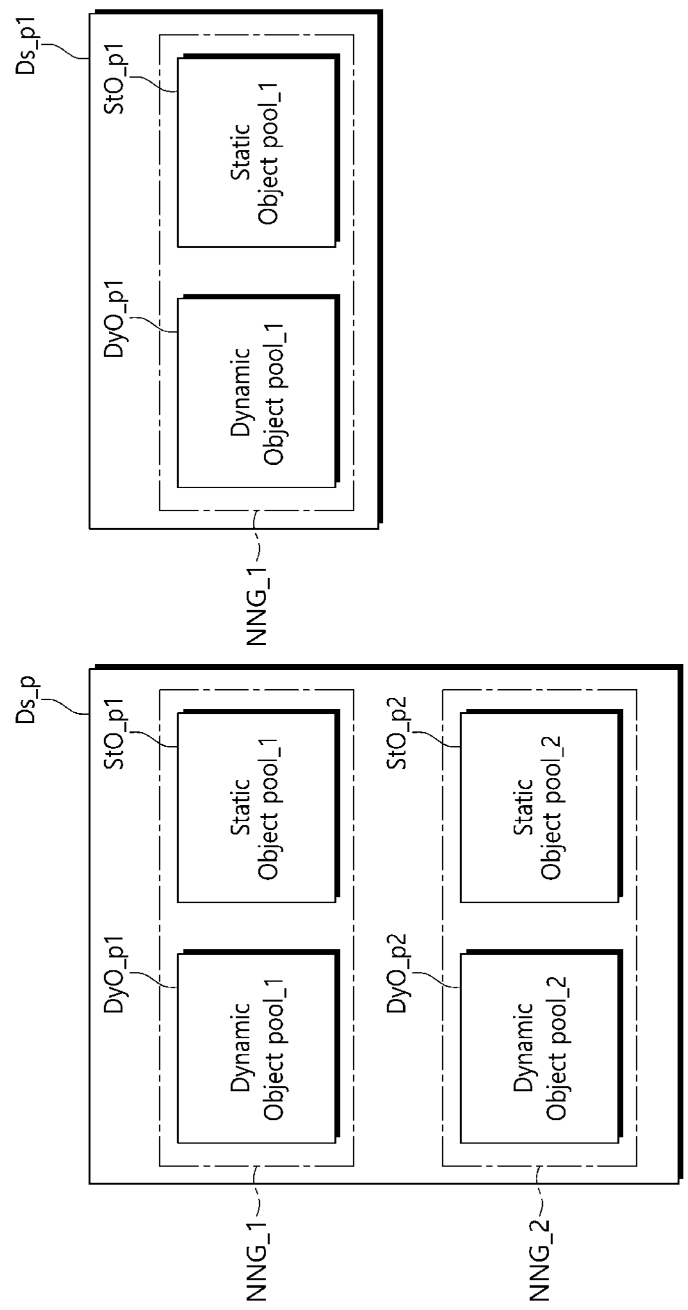

FIGS. 13 to 15 are diagrams provided to explain the configuration of a first data structure pool according to some examples.

Referring to FIG. 13, the first data structure pool (Ds_p1) may include a first dynamic object pool (DyO_p1) and a first static object pool (StO_p1). The first dynamic object pool (DyO_p1) may include a first context dynamic object pool (CTDyO_p1) and a first command dynamic object pool (CBDyO_p1). In addition, the first static object pool (StO_p1) may include a first context static object pool (CTStO_p1) and a first command static object pool (CBStO_p1).

The first context dynamic object pool (CTDyO_p1) may include at least part of the data included in the context dynamic object pool (CTDyO_p) of the data structure pool (Ds_p) managed by the host system (HS). For example, the context dynamic object pool (CTDyO_p) of the data structure pool (Ds_p) may include the first context dynamic object ID (ID_CTDyO_1) to the D1-th context dynamic object ID (ID_CTDyO_D1), and the first context dynamic object (CTDyO_1) to D1-th context dynamic object (CTDyO_D1) mapped to each of the first context dynamic object ID (ID_CTDyO_1) to the D1-th context dynamic object ID (ID_CTDyO_D1). Meanwhile, the first data structure pool (Ds_p1) may include only the first context dynamic object ID (ID_CTDyO_1), the second context dynamic object ID (ID_CTDyO_2), the first context dynamic object (CTDyO_1), and the second context dynamic object (CTDyO_2), which are part of the data stored in the context dynamic object pool (CTDyO_p) of the data structure pool (Ds_p).

Likewise, the first context static object pool (CTStO_p1) may include at least part of the data included in the context static object pool (CTStO_p) of the data structure pool (Ds_p) managed by the host system (HS). For example, the context static object pool (CTStO_p) of the data structure pool (Ds_p) may include the first context static object ID (ID_CTStO_1) to the S1 context static object ID (ID_CTStO_S1), and the first context static object (CTStO_1) to S1-th context static object (CTStO_S1) mapped to each of the first context static object ID (ID_CTStO_1) to the S1 context static object ID (ID_CTStO_S1). Meanwhile, the first data structure pool (Ds_p1) may include only the first context static object ID (ID_CTStO_1), the second context static object ID (ID_CTStO_2), the first context static object (CTStO_1), and the second context static object (CTStO_2), which are part of the data stored in the context static object pool (CTStO_p) of the data structure pool (Ds_p).

Likewise, the first command dynamic object pool (CBDyO_p1) may include at least part of the data included in the command dynamic object pool (CBDyO_p) of the data structure pool (Ds_p) managed by the host system (HS). For example, the command dynamic object pool (CBDyO_p) in the data structure pool (Ds_p) may include the first command dynamic object ID (ID_CBDyO_1) to the D2-th command dynamic object ID (ID_CBDyO_D2), and the first command dynamic object (CBDyO_1) to the D2-th command dynamic object (CBDyO_D2) mapped to each of the first command dynamic object ID (ID_CBDyO_1) to the D2-th command dynamic object ID (ID_CBDyO_D2). Meanwhile, the first data structure pool (Ds_p1) may include only the first command dynamic object ID (ID_CBDyO_1), the second command dynamic object ID (ID_CBDyO_2), the first command dynamic object (CBDyO_1), and the second command dynamic object (CBDyO_2), which are part of the data stored in the command dynamic object pool (CBDyO_p) of the data structure pool (Ds_p).

In addition, the first command static object pool (CBStO_p1) may include at least part of the data included in the command static object pool (CBStO_p) of the data structure pool (Ds_p) managed by the host system (HS). For example, the command static object pool (CBStO_p) in the data structure pool (Ds_p) may include the first command static object ID (ID_CBStO_1) to the S2-th command static object ID (ID_CBStO_S2), and the first command static object (CBStO_1) to the S2-th command static object (CBStO_S2) mapped to each of the first command static object ID (ID_CBStO_1) to the S2-th command static object ID (ID_CBStO_S2). Meanwhile, the first data structure pool (Ds_p1) may include only the first command static object ID (ID_CBStO_1), the second command static object ID (ID_CBStO_2), the first command static object (CBStO_1), and the second command static object (CBStO_2), which are part of the data stored in the command static object pool (CBStO_p) of the data structure pool (Ds_p).

Referring to FIG. 14, the first data structure pool (Ds_p1) may include the first dynamic object pool (DyO_p1) and the first static object pool (StO_p1). The first dynamic object pool (DyO_p1) may include the first context dynamic object pool (CTDyO_p1). In addition, the first static object pool (StO_p1) may include the first context static object pool (CTStO_p1).

The first dynamic object pool (DyO_p1) may include only the context dynamic object pool (CTDyO_p) of the context dynamic object pool (CTDyO_p) and the command dynamic object pool (CBDyO_p) managed by the host system (HS). In addition, the first static object pool (StO_p1) may include only the context static object pool (CTStO_p) of the context static object pool (CTStO_p) and the command static object pool (CBStO_p) managed by the host system (HS). However, this is an illustrative description and aspects are not limited thereto. In other words, the first data structure pool (Ds_p1) may load and manage at least part of the context dynamic object pool (CTDyO_p), the context static object pool (CTStO_p), the command dynamic object pool (CBDyO_p), and the command static object pool (CBStO_p).

Referring to FIG. 15, the data structure pool (Ds_p) of the host system (HS) may separately manage the dynamic object pool and the static object pool for each neural network model. For example, the data structure pool (Ds_p) may be managed based on a first neural network group (NNG_1) that is a group including the first dynamic object pool (DyO_p1) and the first static object pool (StO_p1) related to the first neural network model, and managed based on a second neural network group (NNG_2) that is a group including a second dynamic object pool (DyO_p2) and a second static object pool (StO_p2) related to the first neural network model.

The first data structure pool (Ds_p1) may load and store at least part of the plurality of neural network groups of the data structure pool (Ds_p) of the host system (HS). For example, the first data structure pool (Ds_p1) may be managed by loading, from the host system (HS), the first dynamic object pool (DyO_p1) and the first static object pool (StO_p1) corresponding to the first neural network group (NNG_1).

According to some examples, when the host processor (H_pr) transmits a doorbell to the neural processing device 1, information on the neural network model may also be transmitted. The neural processing device 1 may use the received information on the neural network model to access the data structure pool (Ds_p) of the host system (HS), load only the related dynamic object pool and static object pool, and manage the loaded pools as the first data structure pool (Ds_p1) in the neural processing device 1. According to this, there are advantages in that the memory load can be reduced by using the dynamic object ID and the static object ID, the memory and communication efficiency can be increased by loading only the necessary data structure pool, and the computation speed can be maximized by performing decoding within the neural processing device 1.

Figure 16:
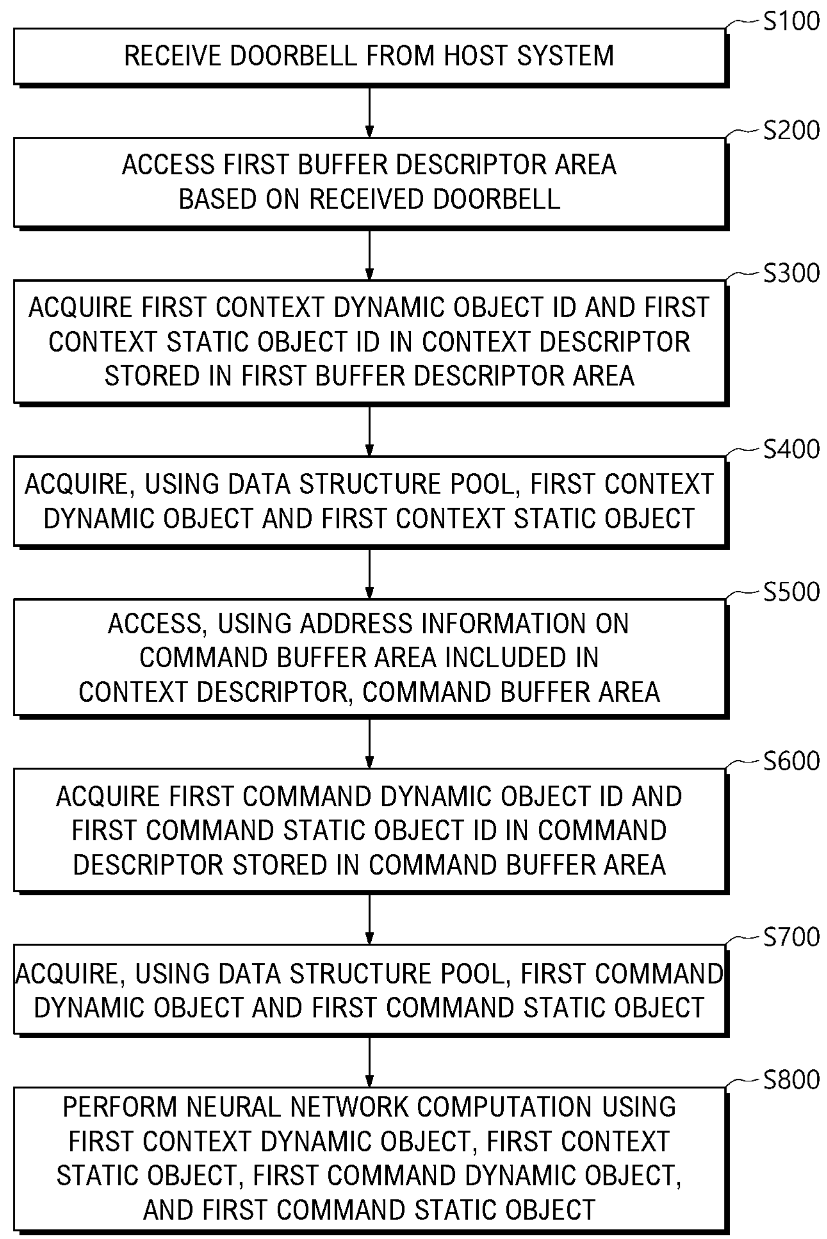
FIG. 16 is a diagram provided to explain a method for acquiring context data of a neural core SoC according to some examples.

FIG. 16 is a diagram provided to explain a method for acquiring the context data of the neural core SoC according to some examples. For convenience of explanation, the elements or operations same as or similar to those described above will be omitted or briefly explained.

Referring to FIGS. 6, 9, 10, and 16, the neural core SoC 10 may receive a doorbell from the host system (HS), at S100.

The neural core SoC 10 may access the first buffer descriptor area (BD0) based on the received doorbell, at S200. The first buffer descriptor area (BD0) may include the context descriptor.

The neural core SoC 10 may acquire the first context dynamic object ID (ID_CTDyO_1) and the first context static object ID (ID_CTStO_1) included in the context descriptor, at S300.

The neural core SoC 10 may acquire, using the data structure pool (Ds_p), the first context dynamic object (CTDyO_1) related to the first context dynamic object ID (ID_CTDyO_1) and acquire the first context static object (CTStO_1) related to the first context static object ID (ID_CTStO_1), at S400.

In addition, the neural core SoC 10 may access the command buffer area (CB), using the address information on the command buffer area (CB) included in the context descriptor, at S500. The command buffer area (CB) may include the command descriptor.

The neural core SoC 10 may acquire the first command dynamic object ID (ID_CBDyO_1) and the first command static object ID (ID_CBStO_1) included in the command descriptor, at S600.

The neural core SoC 10 may acquire, using the data structure pool (Ds_p), the first command dynamic object (CBDyO_1) related to the first command dynamic object ID (ID_CBDyO_1) and acquire the first command static object (CBStO_1) related to the first command static object ID (ID_CBStO_1), at S700.

The neural core SoC 10 may perform computations using the first context dynamic object (CTDyO_1), the first context static object (CTStO_1), the first command dynamic object (CBDyO_1), and the first command static object (CBStO_1) on the neural network model, at S800.

Figure 17:
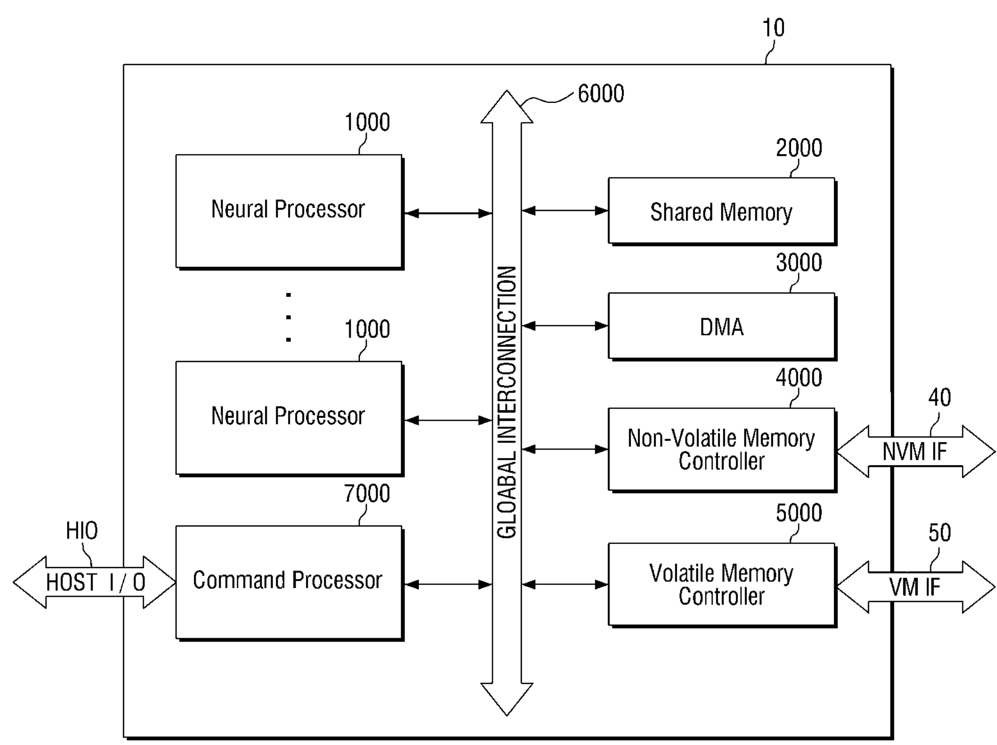
FIG. 17 is a block diagram provided to explain the neural core SoC of FIG. 2 in detail.

FIG. 17 is a block diagram provided to explain the neural core SoC of FIG. 2 in detail.

Referring to FIGS. 2 and 17, the neural core SoC 10 may include at least one neural processor 1000, a shared memory 2000, a Direct Memory Access (DMA) 3000, a non-volatile memory controller 4000, a volatile memory controller 5000, a command processor 7000, and a global interconnection 6000. The command processor 7000 may also be called a command processor circuit, but will be uniformly referred to as the command processor for convenience of description. Additionally, the command processor 7000 may be implemented as a circuit (or circuitry).

In software aspect, the command processor 7000 may be implemented on the off-chip memory 30 of FIG. 2, or particularly, on the volatile memory 32. However, aspects are not limited to the above, and it may be implemented as separate hardware. Further, part of the command processor 7000 may be implemented in software, and another part may be implemented in hardware. The part implemented in hardware may increase the computing speed of the command processor 7000.

The neural processor 1000 may be a computing unit that directly performs computational works. If there are a plurality of neural processors 1000, the computational works may be allocated to each of the neural processors 1000. Each of the neural processors 1000 may be connected to each other through the global interconnection 6000.

The shared memory 2000 may be a memory shared by several neural processors 1000. The shared memory 2000 may store data of each neural processor 1000. In addition, the shared memory 2000 may receive data from the off-chip memory 30, temporarily store the data, and transmit the data to each neural processor 1000. Conversely, the shared memory 2000 may receive data from the neural processor 1000, temporarily store the data, and transmit the data to the off-chip memory 30 of FIG. 2.

The shared memory 2000 may require a relatively fast memory. Accordingly, the shared memory 2000 may include SRAM, for example. However, aspects are not limited to the above. That is, the shared memory 2000 may include DRAM.

The shared memory 2000 may be a memory corresponding to an SoC level, that is, to level 2 (L2). Accordingly, the shared memory 2000 may be defined as the L2 shared memory.

The DMA 3000 may directly control data movement without requiring the host processor (H_pr) or the neural processor 1000 to control input/output of data. Accordingly, the DMA 3000 may control the data movement between memories to minimize the number of interrupts of the host processor (H_pr) or the neural processor 1000.

The DMA 3000 may control the data movement between the shared memory 2000 and the off-chip memory 30. The non-volatile memory controller 4000 and the volatile memory controller 5000 may perform the movement of data through the authority of the DMA 3000.

The non-volatile memory controller 4000 may control read or write work for the non-volatile memory 31. The non-volatile memory controller 4000 may control the non-volatile memory 31 through the non-volatile memory interface 40.

The volatile memory controller 5000 may control the read or write work for the volatile memory 32. In addition, the volatile memory controller 5000 may perform a refresh work for the volatile memory 32. The volatile memory controller 5000 may control the volatile memory 32 through the volatile memory interface 50.

The command processor 7000 may be connected to the host interface (HIO). The command processor 7000 may receive a control signal from the host processor (H_pr) through the host interface (HIO). The command processor 7000 may generate a task through the control signal received from the host processor (H_pr) and transmit the generated task to each neural processor 1000. In addition, the command processor 7000 may receive a task completion report from each neural processor 1000. That is, as described above, the process of receiving the doorbell from the host system (HS), accessing the host system (HS) to acquire the dynamic object ID and the static object ID, and using the acquired IDs to acquire the dynamic object and the static object may be performed by the command processor 7000.

The global interconnection 6000 connects at least one neural processor 1000, the shared memory 2000, the DMA 3000, the non-volatile memory controller 4000, the command processor 7000, and the volatile memory controller 5000 to one another. Additionally, the external interface may also be connected to the global interconnection 6000. The global interconnection 6000 may be a path through which data moves between at least one neural processor 1000, the shared memory 2000, the DMA 3000, the non-volatile memory controller 4000, the volatile memory controller 5000, the command processor 7000, and the external interface.

The global interconnection 6000 may transmit not only the data, but also control signals and signals for synchronization. In the neural processing device according to some examples of the disclosure, each neural processor 1000 may directly transmit and receive the synchronization signal. Accordingly, latency due to transmission of the synchronization signal generated by the command processor 7000 may be minimized.

That is, if there are a plurality of neural processors 1000, there may be a dependency of individual works in which the work of one neural processor 1000 must be completed before the next neural processor 1000 may start a new work. The end and start of these individual works may be confirmed through the synchronization signals, but according to the existing technology, the command processor 7000 or the host, that is, the host processor (H_pr) is in full charge of receiving the synchronization signal and instructing the start of a new work.

However, if the number of neural processors 1000 increases and the dependency of the works is designed more complexly, the number of synchronization signals will increase exponentially, and the latency according to each synchronization signal may significantly reduce the efficiency of the works.

Therefore, in the neural processing device according to some examples of the disclosure, instead of the command processor 7000, each neural processor 1000 may directly transmit part of the synchronization signals to the other neural processors 1000 according to the dependency of the work. In this case, compared to the way of managing by the command processor 7000, multiple neural processors 1000 may perform synchronization works in parallel, thereby minimizing latency due to synchronization.

In addition, the command processor 7000 also performs work scheduling of the neural processors 1000 according to work dependency, and the overhead of such scheduling may increase significantly as the number of neural processors 1000 increases. Accordingly, in the neural processing device according to some examples of the disclosure, the scheduling work is partially performed by the individual neural processor 1000, which may reduce the scheduling burden and thus improve the performance of the device.

Figure 18:
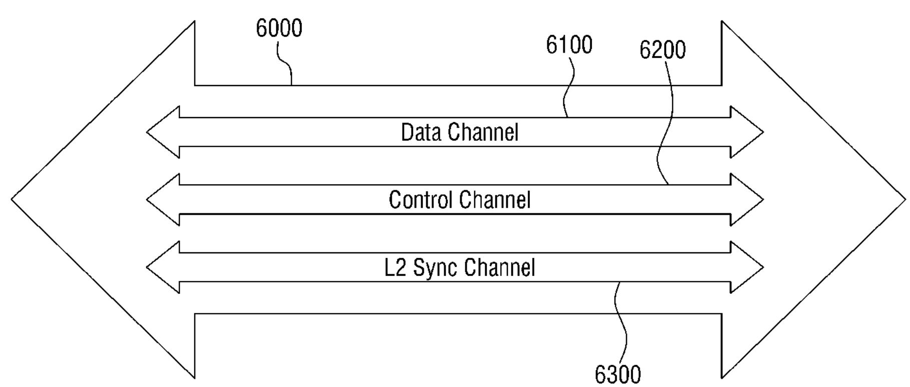
FIG. 18 is a structural diagram provided to explain the global interconnection of FIG. 17 in detail.

FIG. 18 is a structural diagram provided to explain the global interconnection of FIG. 17 in detail.

Referring to FIG. 4, the global interconnection 6000 may include a data channel 6100, a control channel 6200, and an L2 sync channel 6300.

The data channel 6100 may be a private channel for transmitting data. Through the data channel 6100, at least one neural processor 1000, the shared memory 2000, the DMA 3000, the non-volatile memory controller 4000, the volatile memory controller 5000, and the external interface may exchange data with one another.

The control channel 6200 may be a private channel for transmitting control signals. Through the control channel 6200, at least one neural processor 1000, the shared memory 2000, the DMA 3000, the non-volatile memory controller 4000, the volatile memory controller 5000, the command processor 7000, and the external interface may exchange control signals with one another. In particular, the command processor 7000 may transmit various control signals to each of the neural processors 1000.

The L2 sync channel 6300 may be a private channel for transmitting synchronization signals. Through the L2 sync channel 6300, at least one neural processor 1000, the shared memory 2000, the DMA 3000, the non-volatile memory controller 4000, the volatile memory controller 5000, the command processor 7000, and the external interface may exchange synchronization signals with one another.

The L2 sync channel 6300 may be set as a private channel inside the global interconnection 6000 so as to allow fast transmission of the synchronization signals without overlapping with other channels. Accordingly, the neural processing device may smoothly perform synchronization using the existing global interconnection 6000 without requiring new wiring work.

Figure 19:
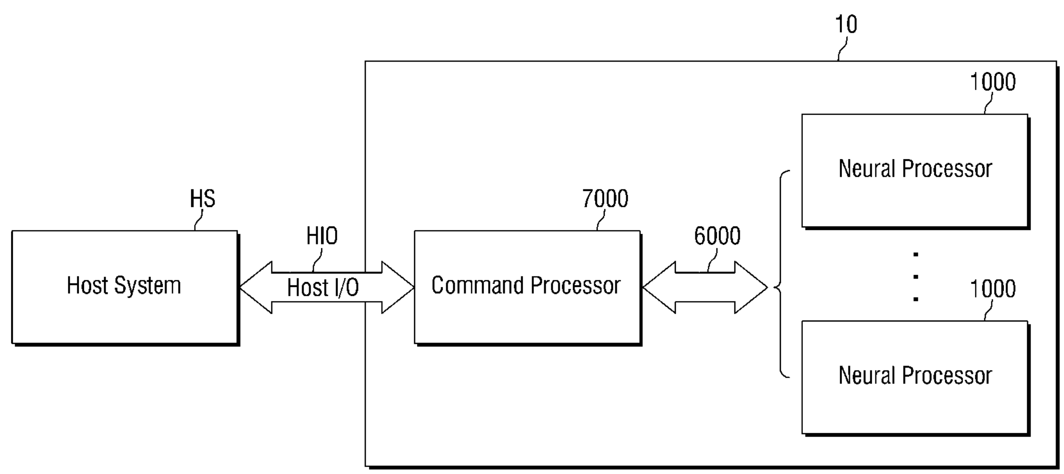
FIG. 19 is a block diagram provided to explain the flow of control signals of the neural processing unit of FIG. 1.

FIG. 19 is a block diagram provided to explain the flow of control signals of the neural processing unit of FIG. 1.

Referring to FIG. 19, the host processor (H_pr) may transmit the control signals to the command processor 7000 through the host interface (HIO). The control signal may be a signal to instruct to perform each operation including a computational work, a data load/store work, etc.

The command processor 7000 may receive the control signal and transmit the control signal to the at least one neural processor 1000 through the control channel 6200. Each control signal may be stored as each task in the neural processor 1000.

Figure 20:
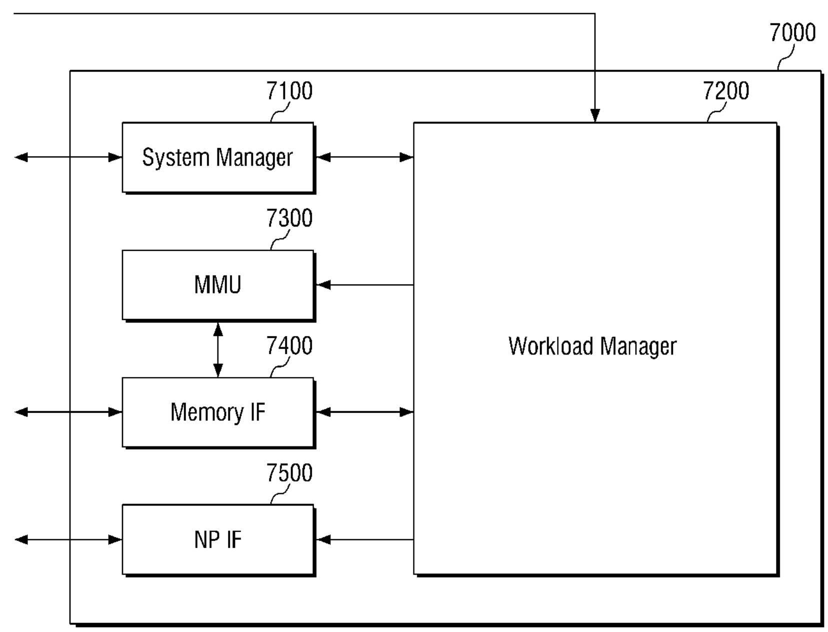
FIG. 20 is a block diagram provided to explain the command processor of FIG. 19 in detail.

FIG. 20 is a block diagram provided to explain the command processor of FIG. 19 in detail.

Referring to FIG. 20, the command processor 7000 may include a system manager 7100, a workload manager 7200, a memory management unit (MMU) 7300, a memory interface 7400, and a neural processor interface 7500. The system manager 7100, the workload manager 7200, the MMU 7300, the memory interface 7400, and the neural processor interface 7500 may also be called a system manager circuit, a workload manager circuit, an MMU circuit, a memory interface circuit, and a neural processor interface circuit, but will be uniformly referred to as the system manager, the workload manager, the MMU, the memory interface, and the neural processor interface herein for convenience of description. Further, the system manager 7100, the workload manager 7200, the MMU 7300, the memory interface 7400, and the neural processor interface 7500 may each be implemented as a circuit (or circuitry).

The system manager 7100 may manage the interrupt requests transmitted to the host system (HS) and control system details such as the clock, power, or the like of the command processor 7000. The system manager 7100 may exchange data related to the interrupt requests with the workload manager 7200.

The workload manager 7200 may receive and analyze the computation data from the host system (HS). The workload manager 7200 may analyze the computation data and divide it on the basis of command and task units. The workload manager 7200 may generate a task descriptor according to the computation data and transmit the generated task descriptor to the memory interface 7400 and the neural processor interface 7500.

The MMU 7300 may perform management of the memory where data generated by the workload manager 7200 is stored. The MMU 7300 may perform update of the TLB, and perform allocation of memory and management of addresses.

The memory interface 7400 may transmit or receive data to or from the memory through control of the MMU 7300. The memory may include the off-chip memory 30 and the shared memory 2000 of the neural processing device 1.

The neural processor interface 7500 may transmit the task descriptor generated by the workload manager 7200 to the neural processor. Further, each neural processor may transmit a report generated upon completing the work to the workload manager 7200.

Figure 21:
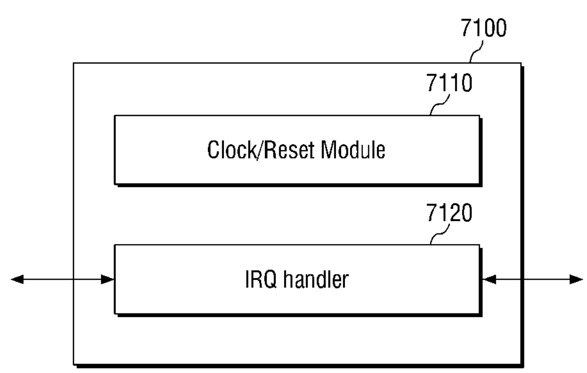
FIG. 21 is a block diagram provided to explain the system manager of FIG. 20 in detail.

FIG. 21 is a block diagram provided to explain the system manager of FIG. 20 in detail.

Referring to FIG. 21, the system manager 7100 may include a clock/reset module 7110 and an IRQ handler 7120. The clock/reset module 7110 and the IRQ handler 7120 may also be called a clock/reset module circuit and an IRQ handler circuit, respectively, but will be uniformly referred to as the clock/reset module and the IRQ handler herein for convenience of description. Further, the clock/reset module 7110 and the IRQ handler 7120 may be implemented as a circuit (or circuitry).

The clock/reset module 7110 may supply the clock of the command processor 7000 and control the same. Further, the clock/reset module 7110 may provide clock signals of the command processor 7000. Such clock signals may be modulated in each module and used.

The IRQ handler 7120 may control the interrupt request transmitted from the workload manager 7200 to the host system (HS). That is, if the workload manager 7200 needs a response from the host system (HS) during work, or when reporting work result after work, the interrupt request may first be transmitted to the IRQ handler 7120, and the IRQ handler 7120 may report this to the host system (HS).

Figure 22:
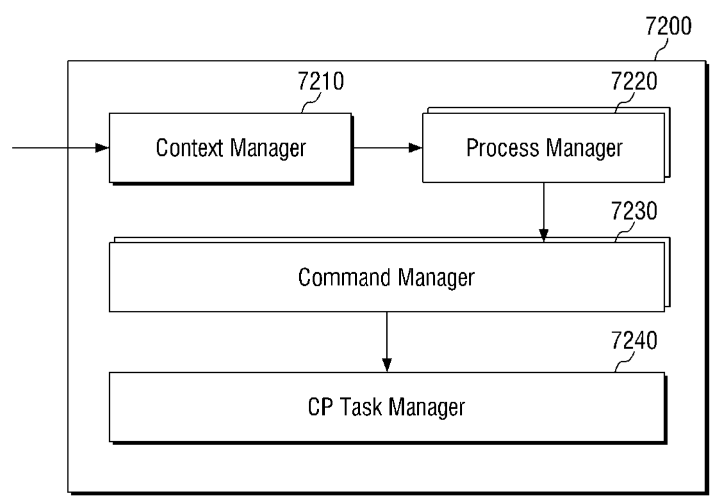
FIG. 22 is a block diagram provided to explain the workload manager of FIG. 20 in detail.

FIG. 22 is a block diagram provided to explain the workload manager of FIG. 20 in detail.

Referring to FIG. 22, the workload manager 7200 may include a context manager 7210, a process manager 7220, a command manager 7230, and a CP task manager 7240. The context manager 7210, the process manager 7220, the command manager 7230, and the CP task manager 7240 may also be called a context manager circuit, a process manager circuit, a command manager circuit, and a CP task manager circuit, respectively, but will be uniformly referred to as the context manager, the process manager, the command manager, and the CP task manager herein for convenience of description. Further, the context manager 7210, the process manager 7220, the command manager 7230, and the CP task manager 7240 may be implemented as a circuit (or circuitry).

The context manager 7210 may read the buffer descriptor and check the context ID. Accordingly, the context manager 7210 may determine to activate the context. The context manager 7210 may acquire the dynamic object ID and the static object ID, and use the acquired IDs to manage and control a series of operations for acquiring the dynamic object and the static object. In other words, the context manager 7210 may use the context dynamic object ID to acquire the context dynamic object, and may use the context static object ID to acquire the context static object. In addition, the context manager 7210 may use the command dynamic object ID to acquire the command dynamic object, and use the command static object ID to acquire the command static object. In addition, the context determined by the context manager 7210 may be transmitted to the process manager 7220.

The process manager 7220 may determine a process to be allocated with the context received from the context manager 7210. Because there may be a plurality of processes for one OS, the process manager 7220 may determine a process corresponding to the current workload. There may be a plurality of process managers 7220. For example, there may be eight process managers 7220, although aspects are not limited thereto. Each process manager 7220 may correspond to a separate process. Accordingly, if there are eight process managers 7220, a total of eight processes may be driven simultaneously.

The command manager 7230 may identify command information such as command stream in the computation data and check dependency between commands. There may be various types of commands. The command manager 7230 may check the dependency between commands and sequentially transmit the commands to the CP task manager 7240. There may be a plurality of command managers 7230. For example, there may be eight command managers 7230, although aspects are not limited thereto. The command managers 7230 may each correspond to a separate process manager 7220. Accordingly, the command manager 7230 may correspond to the process manager 7220 on a 1:1 basis and may be operated per process.

The CP task manager 7240 may receive the command and divide it into task units. The CP task manager 7240 may generate a task descriptor for each task. The task descriptor may later be transmitted to each neural processor for deep learning works. Each task may be a computational work or a memory computational work.

Figure 23:
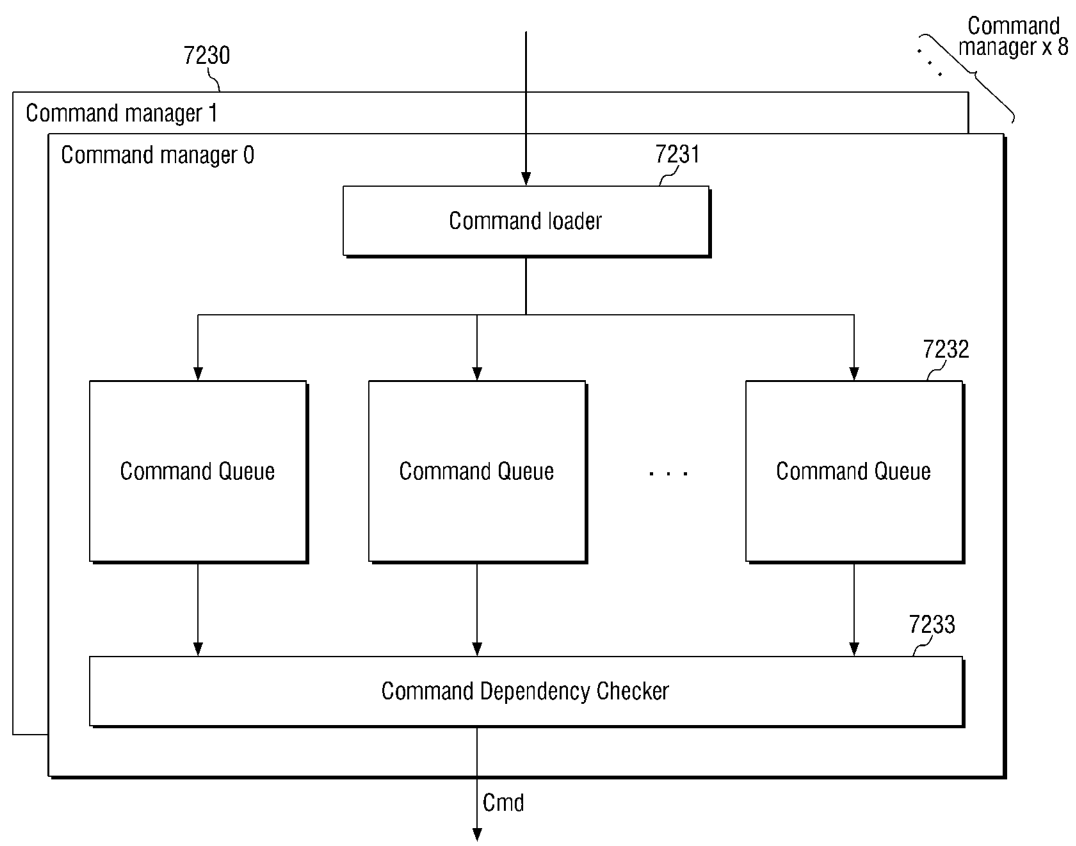
FIG. 23 is a block diagram provided to explain the command manager of FIG. 22 in detail.

FIG. 23 is a block diagram provided to explain the command manager of FIG. 22 in detail.

Referring to FIG. 23, eight command managers 7230 are illustrated, but aspects are not limited thereto. That is, the number of command managers 7230 may vary. For example, if there are eight command managers 7230, the command managers 7230 may include first to eighth command managers.

Each command manager 7230 may include a command loader 7231, at least one command queue 7232, and a command dependency checker 7233. The command loader 7231, the command queue 7232, and the command dependency checker 7233 may also be called a command loader circuit, a command queue circuit, and a command dependency checker circuit, respectively, but will be uniformly referred to as the command loader, the command queue, and the command dependency checker herein for convenience of description. Further, the command loader 7231, the command queue 7232, and the command dependency checker 7233 may be implemented as a circuit (or circuitry). The command loader 7231 may load the commands from the computation data received from the process manager 7220. The command loader 7231 may distribute the commands to at least one command queue 7232 according to each command type.

The command queue 7232 may separately receive compute commands for computational works and DMA commands for memory operations. The DMA command may be at least one of hDMA, dDMA, μDMA, and LP μDMA. The hDMA may be a command to access the host off-chip memory (H_OCM), the dDMA may be a command to access the off-chip memory 30, and the μDMA may be a command to access the shared memory 2000, etc. The LP μDMA may be a command with a relatively lower priority among the commands to access the shared memory 2000, etc. That is, the LP μDMA is relatively unimportant command that is performed only when there are no other commands, and may be the command that is previously assigned with a low priority so that relatively more important commands are performed first.

The command dependency checker 7233 may check the dependency of each command and sequentially transmit the commands (Cmd). The command (Cmd) may be transmitted to the CP task manager 7240. The command dependency checker 7233 may not transmit the commands (Cmd) in each command queue 7232 at once, but transmit them sequentially according to the dependency. Accordingly, the sequential execution of the commands (Cmd) according to dependency may be possible.

Figure 24:
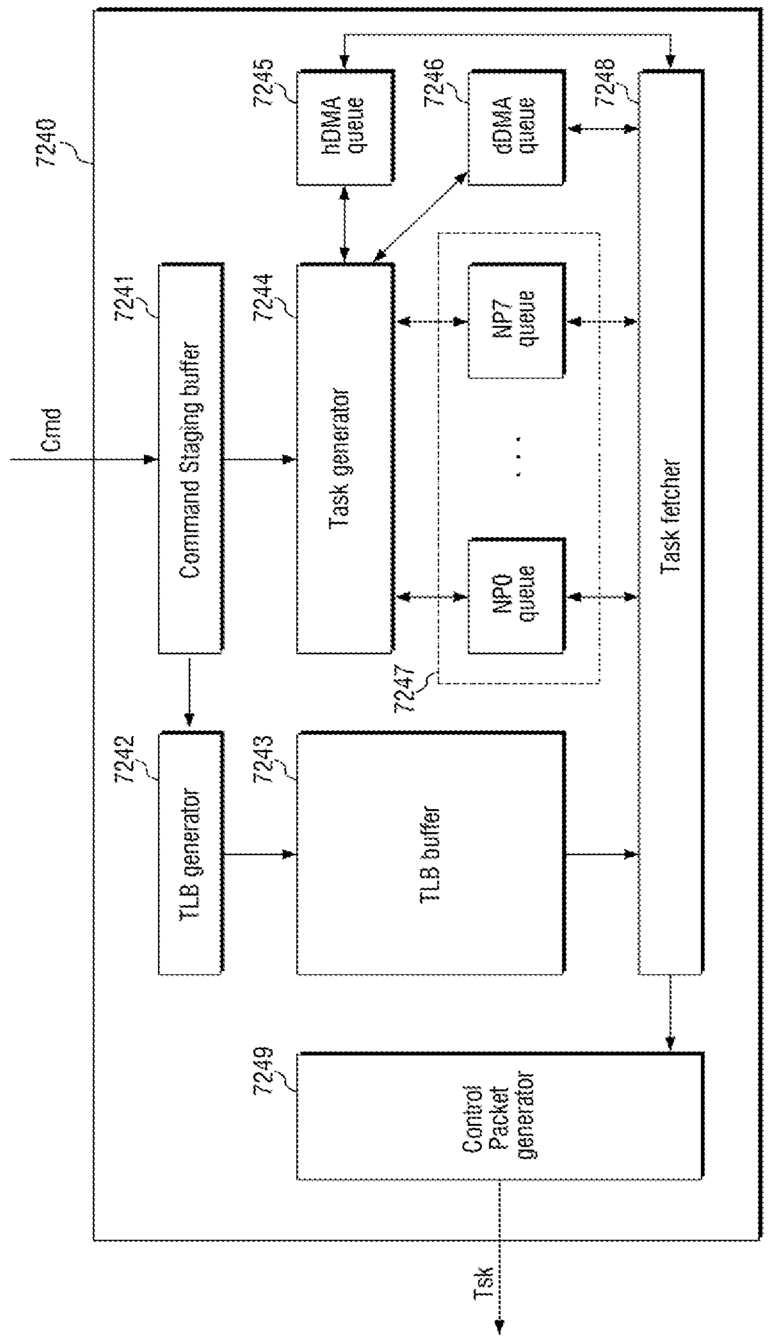
FIG. 24 is a block diagram provided to explain the CP task manager of FIG. 22 in detail.

FIG. 24 is a block diagram provided to explain the CP task manager of FIG. 22 in detail.

Referring to FIG. 24, the CP task manager 7240 may include a command staging buffer 7241, a TLB generator 7242, a TLB buffer 7243, a task generator 7244, an hDMA queue 7245, a dDMA queue 7246, a neural processor queue 7247, a task fetcher 7248, and a control packet generator 7249. The command staging buffer 7241, the TLB generator 7242, the TLB buffer 7243, the task generator 7244, the hDMA queue 7245, the dDMA queue 7246, the neural processor queue 7247, the task fetcher 7248 and the control packet generator 7249 may also be called a command staging buffer circuit, a TLB generator circuit, a TLB buffer circuit, a task generator circuit, a hDMA queue circuit, a dDMA queue circuit, a neural processor queue circuit, a task fetcher circuit, and a control packet generator circuit, respectively, but will be uniformly referred to as the command staging buffer, the TLB generator, the TLB buffer, the task generator, the hDMA queue, the dDMA queue, the neural processor queue, the task fetcher, and the control packet generator herein for convenience of description. Further, the command staging buffer 7241, the TLB generator 7242, the TLB buffer 7243, the task generator 7244, the hDMA queue 7245, the dDMA queue 7246, the neural processor queue 7247, the task fetcher 7248, and the control packet generator 7249 may be implemented as a circuit (or circuitry).

The command staging buffer 7241 may receive the command (Cmd) from the command manager 7230. The command staging buffer 7241 may transmit the received command (Cmd) to the TLB generator 7242 and the task generator 7244. The command staging buffer 7241 may receive the commands (Cmd), synchronize them in order, and transmit them again.

The TLB generator 7242 may receive the commands (Cmd) and generate translation index buffer information. The translation index buffer information may be information for translating a virtual address into a physical address. The TLB buffer 7243 may store the translation index buffer information generated by the TLB generator 7242.

The task generator 7244 may receive the command (Cmd) and generate a task (Tsk). The task (Tsk) may be generated in the form of a task descriptor, but not limited thereto. The tasks (Tsk) may be generated per type in various ways. For example, the task (Tsk) may include a DMA task and a computational task. The DMA task may include at least one of hDMA for the host off-chip memory (H_OCM) and dDMA for the off-chip memory 30. Such tasks (Tsk) may be transmitted to the hDMA queue 7245 and the dDMA queue 7246, respectively.

The task generator 7244 may distribute and allocate the tasks (Tsk) for the computational tasks of each neural processor. Each task (Tsk) may be transmitted to at least one neural processor queue 7247 so as to be transmitted to at least one neural processor. Although eight neural processor queues 7247 are illustrated in the drawing, aspects are not limited thereto. That is, the number of neural processor queues 7247 may vary.

The task fetcher 7248 may receive the task (Tsk) from the hDMA queue 7245, the dDMA queue 7246, and the neural processor queue 7247 and transmit the received tasks to the control packet generator 7249. The task fetcher 7248 may also receive the translation index buffer information from the TLB buffer 7243 and transmit the same.

The control packet generator 7249 may transmit each task (Tsk) to the neural processor or the hierarchical memory. The task (Tsk) may be transmitted in the form of a task descriptor.

Figure 25:
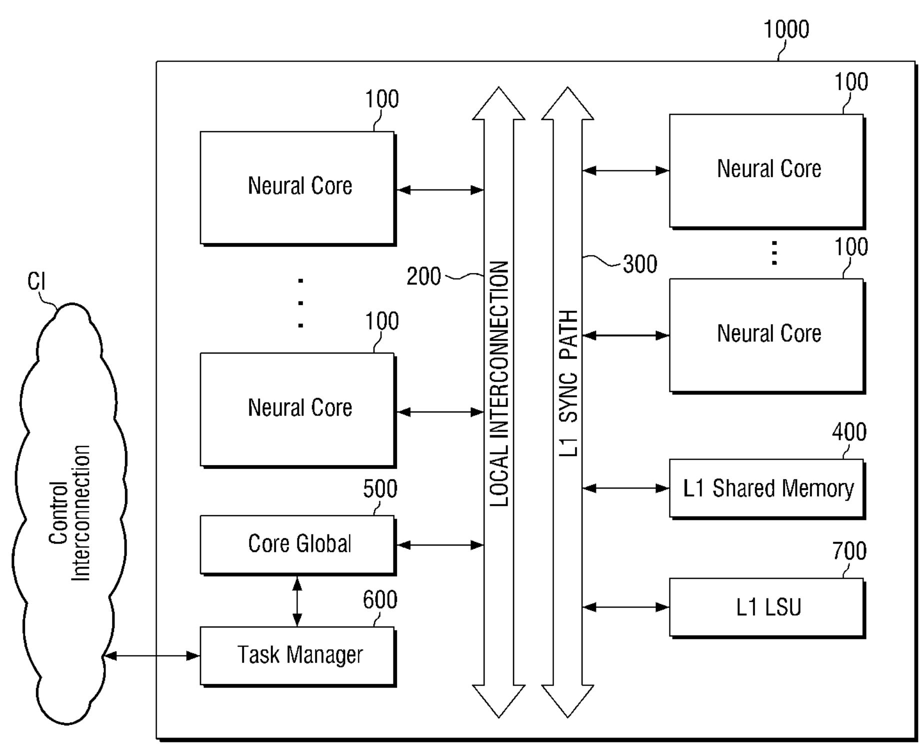
FIG. 25 is a block diagram provided to explain the neural processor of FIG. 19 in detail.

FIG. 25 is a block diagram provided to explain the neural processor of FIG. 19 in detail.

Referring to FIGS. 19 and 25, the neural processor 1000 may include at least one neural core 100, an L1 shared memory 400, an L1 LSU 700, a task manager 600, a core global 500, a local interconnection 200, and an L1 sync path 300. The L1 LSU 700, the task manager 600, and the core global 500 may also be called an L1 LSU circuit, a task manager circuit, and a core global circuit, respectively, but will be uniformly referred to as an L1 LSU, a task manager, and a core global herein for convenience of description. Further, the L1 LSU 700, the task manager 600, and the core global 500 may be implemented as a circuit (or circuitry).

At least one neural core 100 may divide and perform the work of the neural processor 1000. For example, there may be eight neural cores 100. However, aspects are not limited to the above. Although it is shown in FIG. 25 that several neural cores 100 are included in the neural processor 1000, aspects are not limited to the above. That is, the neural processor 1000 may be configured with only one neural core 100.

The neural core 100 may receive task information from the core global 500 and perform a task according to the task information. The task may be defined by the control signals, and the task may be either a compute operation or a memory operation. The memory operation may be, for example, any one of micro DMA (μDMA), LP micro DMA (low priority μDMA), store μDMA (STμDMA), and pre-processing works.

The L1 shared memory 400 may be a memory shared by each neural core 100 in the neural processor 1000. The L1 shared memory 400 may store data of each neural core 100. In addition, the L1 shared memory 400 may receive data from the shared memory 2000 of FIG. 4, temporarily store the data, and transmit the data to each neural core 100. Conversely, the L1 shared memory 400 may receive data from the neural core 100, temporarily store the data, and transfer the data to the shared memory 2000 of FIG. 17.

The L1 shared memory 400 may be a memory corresponding to the neural processor level, that is, to level 1 (L1). The L2 shared memory, that is, the shared memory 2000 may be shared by the neural processor 1000, and the L1 shared memory 400 may be shared by the neural core 100.

The L1 LSU 700 may receive at least one of data, control signals, and synchronization signals from the outside through the global interconnection 6000. The L1 LSU 700 may transmit at least one of the data, the control signals, and the synchronization signals received by the L1 shared memory 400. Similarly, the L1 LSU 700 may transmit at least one of the data, the control signals, and the synchronization signals to the outside through the global interconnection 6000. Further, for each of the neural cores 100, the L1 LSU 700 may transmit and receive at least one of the data, the control signals, and the synchronization signals.

The neural core 100 may receive task information from the core global 500 and perform a task according to the task information. The task may be a work related to the computational work or the memory operation. The task may be defined by the control signals. The task information is information on the task, and it may be information on type of task, form of task, additional information on task, etc.

The neural core 100 may transmit a completion signal indicating completion of the task to the core global 500.

The task manager 600 may receive a task from the control interconnection (CI). The control interconnection (CI) may be a general term for the transmission interfaces that transmit the tasks from the command processor 7000. That is, the control interconnection (CI) may include the control channel 6200 and the local interconnection 200.

The task manager 600 may receive a task, generate task information, and transmit the result to the core global 500. Further, the task manager 600 may receive a completion signal through the core global 500, accordingly generate a completion report, and transmit the result to the command processor 7000 through the control interconnection (CI).

The core global 500 may be a wire structure connected in hardware within the neural core 100. Although not illustrated, the core global 500 may be a structure that connects the neural core 100, the L1 shared memory 400, the L1 LSU 700, and the task manager 600. Accordingly, the local interconnection 200 and the L1 sync path 300 may also be included in the core global 500. However, aspects are not limited to the above.

The core global 500 may receive the task information from the task manager 600, transmit the same to the neural core 100, and receive a corresponding completion signal from the neural core 100. The core global 500 may transmit the completion signal to the task manager 600.

The local interconnection 200 may connect at least one neural core 100, the L1 shared memory 400, the L1 LSU 700, the core global 500, and the task manager 600 to one another. The local interconnection 200 may be a path through which data moves between at least one neural core 100, the L1 shared memory 400, the L1 LSU 700, the core global 500, and the task manager 600. The local interconnection 200 may be connected to the global interconnection 6000 of FIG. 3 to transmit the data.

The L1 sync path 300 may connect at least one neural core 100, the L1 shared memory 400, the L1 LSU 700, the core global 500, and the task manager 600 to one another. The L1 sync path 300 may be a path through which the synchronization signals of at least one neural core 100, the L1 shared memory 400, the L1 LSU 700, the core global 500, and the task manager 600 move.

The L1 sync path 300 may be physically separated from the local interconnection 200. Unlike the global interconnection 6000, the local interconnection 200 may not have sufficient channels formed therein. In this case, the L1 sync path 300 may be formed separately such that it is possible to perform transfer of the synchronization signal quickly and without delay. The L1 sync path 300 may be used for synchronization performed at a level that is one level lower than the L2 sync channel 6300 of the global interconnection 6000.

Figure 26:
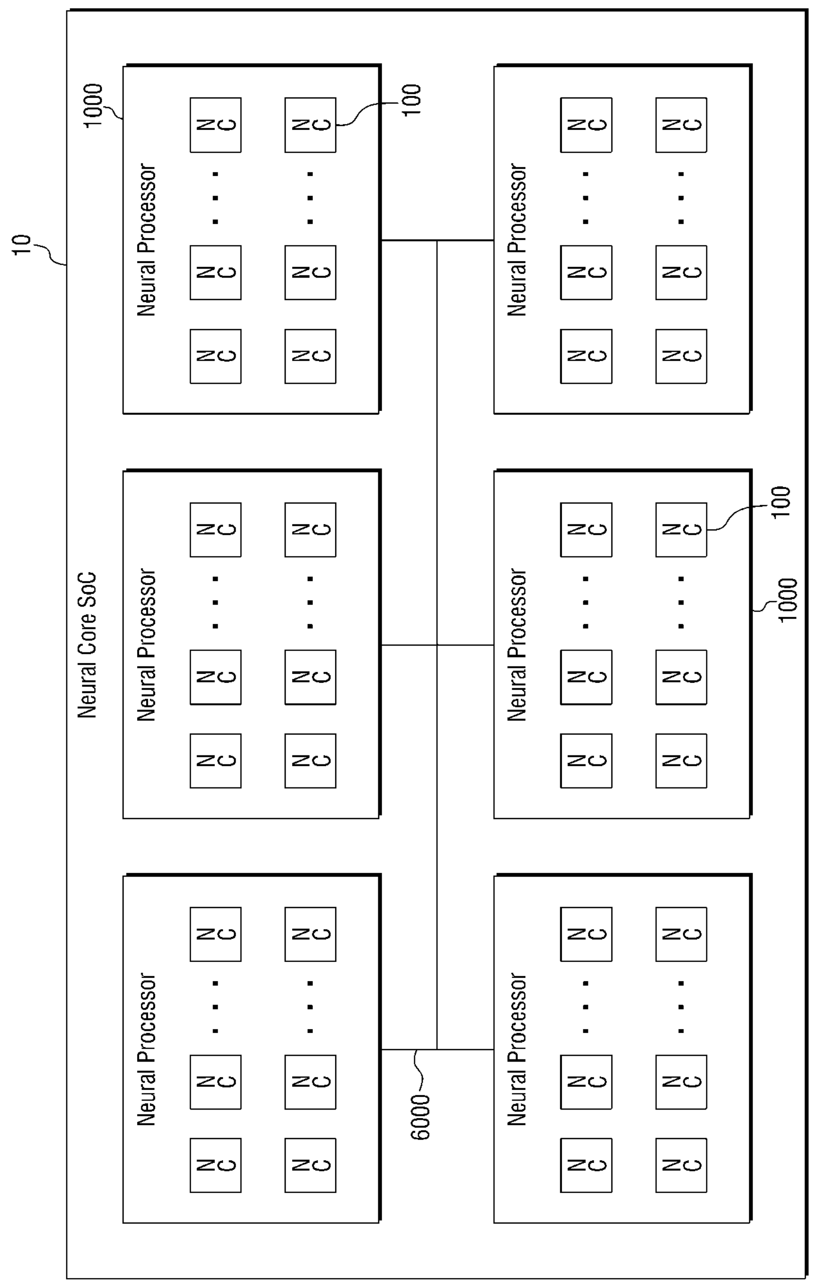
FIG. 26 is a diagram provided to explain a hierarchical structure of a neural processing device according to some examples.

FIG. 26 is a diagram provided to explain a hierarchical structure of the neural processing device according to some examples.

Referring to FIG. 26, the neural core SoC 10 may include at least one neural processor 1000. Each neural processor 1000 may transmit data to each other through the global interconnection 6000.

Each neural processor 1000 may include at least one neural core 100. The neural core 100 may be a processing unit optimized for deep learning computational works. The neural core 100 may be a processing unit corresponding to one operation of the deep learning computational work. That is, the deep learning computational work may be expressed as a sequential or parallel combination of several operations. The neural core 100 is a processing unit that may each process one operation, and may be the minimum unit of computation that can be considered for scheduling from a compiler's perspective.

The neural processing device may achieve fast and efficient scheduling and performance of computational works by configuring the minimum unit of computations considered for scheduling from the compiler's perspective and the hardware processing unit on the same scale.

That is, if the hardware processing unit that may be divided is too large compared to the computational work, inefficiency in the computational work may occur when operating the processing unit. Conversely, it is not appropriate to always schedule the processing unit smaller than the operation which is the compiler's minimum scheduling unit, as this may result in scheduling inefficiencies and also increase hardware design costs.

Therefore, the scale of the compiler's scheduling unit and the hardware processing unit may be similarly adjusted to satisfy both the fast computational work scheduling and the efficient computational work performance without wasting hardware resources.

Figure 27:
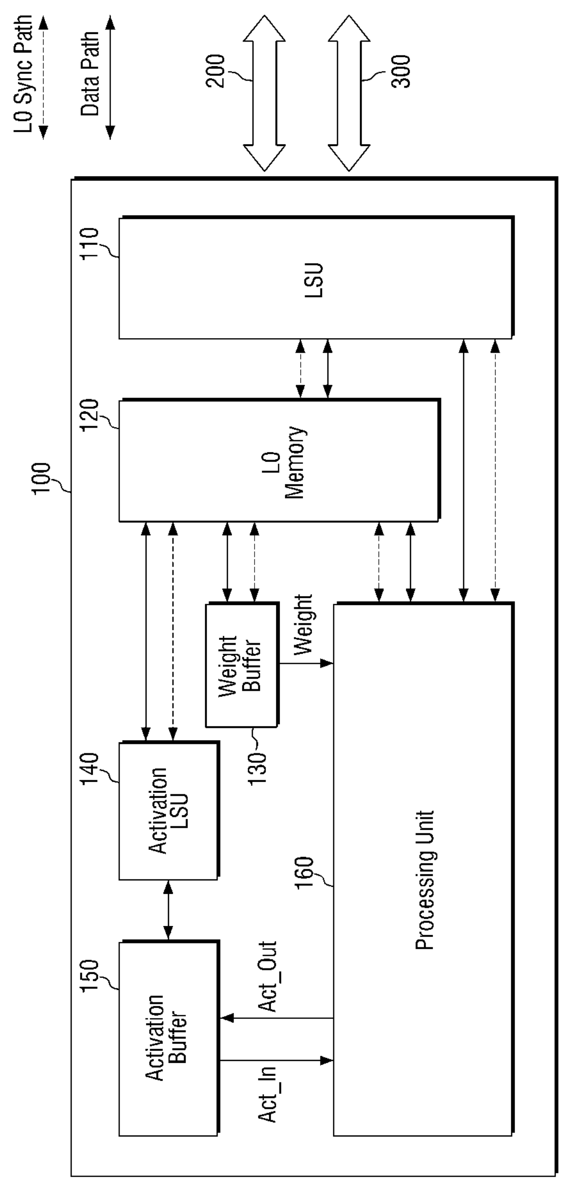
FIG. 27 is a block diagram provided to explain the neural core of FIG. 25 in detail.

FIG. 27 is a block diagram provided to explain the neural core of FIG. 25 in detail.

Referring to FIG. 27, the neural core 100 may include a load/store unit (LSU) 110, an L0 memory 120, a weight buffer 130, an activation LSU 140, an activation buffer 150, and a processing unit 160. The LSU 110 and the activation LSU 140 may also be called an LSU circuit and an activation LSU circuit, respectively, but will be uniformly referred to as the LSU and the activation LSU herein for convenience of description. Further, the LSU 110 and the activation LSU 140 may be implemented as a circuit (or circuitry).

The LSU 110 may receive at least one of data, control signals, and synchronization signals from the outside through the local interconnection 200 and the L1 sync path 300. The LSU 110 may transmit at least one of the data, the control signals, and the synchronization signals received by the L0 memory 120. Similarly, the LSU 110 may transmit at least one of the data, the control signals, and the synchronization signals to the outside through the local interconnection 200 and the L1 sync path 300.

Specifically, a micro DMA work may be a work of the neural core 100 loading program or data from the shared memory 2000 or the off-chip memory 30 to the L0 memory 120. Unlike the typical micro DMA work, the LP micro DMA work may be a work of loading program or data to be used later, rather than the current program or data. Because these works have a low priority, they may be identified differently from the micro DMA works. An ST Micro DMA work may be a store work of storing the data from the L0 memory 120 of the neural core 100 to the shared memory 2000 or the off-chip memory 30. A pre-processing work may include a work of pre-loading data such as a large amount of lookup tables from the host processor (H_pr).

Figure 28:
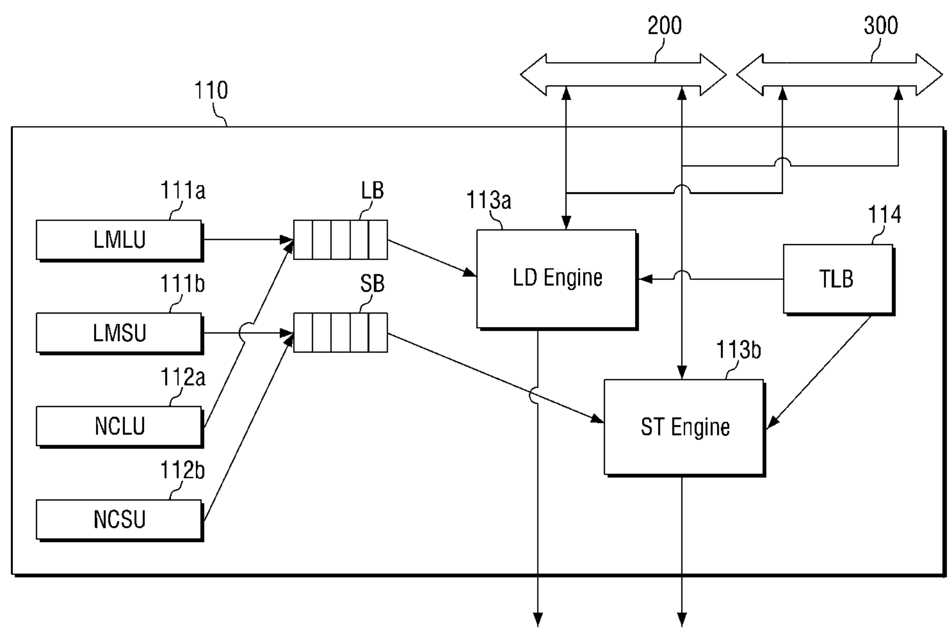
FIG. 28 is a block diagram provided to explain the LSU of FIG. 27 in detail.

FIG. 28 is a block diagram provided to explain the LSU of FIG. 27 in detail. Referring to FIG. 28, the LSU 110 includes a local memory load unit 111*a*, a local memory store unit 111*b*, a neural core load unit 112*a*, a neural core store unit 112*b*, a load buffer (LB), and a store buffer (SB), a load engine 113*a*, a store engine 113*b*, and a translation index buffer 114. The local memory load unit 111*a*, the local memory store unit 111*b*, the neural core load unit 112*a*, the neural core store unit 112*b*, the load engine 113*a*, and the store engine 113*b* may also be called a local memory unit circuit, a local memory store unit circuit, a neural core load unit circuit, a neural core store unit circuit, a load engine circuit, and a store engine circuit, but will be uniformly referred to as the local memory load unit, the local memory store unit, the neural core load unit, the neural core store unit, the load engine, and the store engine herein for convenience of description. Further, the local memory load unit 111*a*, the local memory store unit 111*b*, the neural core load unit 112*a*, the neural core store unit 112*b*, the load engine 113*a*, and the store engine 113*b* may be implemented as a circuit (or circuitry).

The local memory load unit 111*a* may fetch a load instruction for the L0 memory 120 and issue the load instruction. If the local memory load unit 11*a* provides the issued load instruction to the load buffer (LB), the load buffer (LB) may send the memory access requests to the load engine 113*a* in order of input.

Further, the local memory store unit 111*b* may fetch a store instruction for the L0 memory 120 and issue the store instruction. If the local memory store unit 111*b* provides the issued store instruction to the store buffer (SB), the store buffer (SB) may send the memory access requests to the store engine 113*b* in order of input.

The neural core load unit 112*a* may fetch a load instruction for the neural core 100 and issue the load instruction. If the neural core load unit 112*a* provides the issued load instruction to the load buffer (LB), the load buffer (LB) may send the memory access requests to the load engine 113*a* in order of input.

Further, the neural core store unit 112*b* may fetch a store instruction for the neural core 100 and issue the store instruction. If the neural core store unit 112*b* provides the issued store instruction to the store buffer (SB), the store buffer SB may send the memory access requests to the store engine 113*b* in order of input.

The load engine 113*a* may receive the memory access request and call up the data through the local interconnection 200. The load engine 113*a* may quickly find the data using the translation table of the recently used logical addresses and physical addresses in the translation index buffer 114. If the logical address of the load engine 113*a* is not in the translation index buffer 114, the address translation information may be found in another memory.

The store engine 113*b* may receive the memory access request and call up the data through the local interconnection 200. The store engine 113*b* may quickly find the data using the translation table of the recently used logical addresses and physical addresses in the translation index buffer 114. If the logical address of the store engine 113*b* is not in the translation index buffer 114, the address translation information may be found in another memory.

The load engine 113*a* and the store engine 113*b* may send a synchronization signal to the L1 sync path 300. The synchronization signal may indicate that the work is completed.

Referring to FIG. 27, the L0 memory 120 may be a memory located within the neural core 100, and the neural core 100 may receive all of input data required for the work from the outside and temporarily store the received data in the L0 memory 120. Further, the L0 memory 120 may temporarily store output data computed by the neural core 100 so as to transmit the same to the outside.

The L0 memory 120 may, by the activation LSU 140, transmit input activation (Act_In) to the activation buffer 150 and receive output activation (Act_Out). Other than the activation LSU 140, the L0 memory 120 may directly transmit and receive data to and from the processing unit 160. That is, the L0 memory 120 may exchange data with each of the PE array 163 and the vector unit 164. The L0 memory 120 may be a memory corresponding to the neural core level. The L0 memory 120 may be a private memory of the neural core.

The L0 memory 120 may transmit data such as activation or weight through a data path. The L0 memory 120 may transmit and receive synchronization signals through an L0 sync path which is a separate private path. For example, the L0 memory 120 may exchange the synchronization signals with the LSU 110, the weight buffer 130, the activation LSU 140, and the processing unit 160, through the L0 sync path.

The weight buffer 130 may receive weight from the L0 memory 120. The weight buffer 130 may transmit the weight to the processing unit 160. The weight buffer 130 may temporarily store the weight before transmitting the same.

The input activation (Act_in) and the output activation (Act_Out) may refer to input value and output value of the layer of the neural network. If the neural network has a plurality of layers, the output value of the previous layer becomes the input value of the next layer, and therefore, the output activation (Act_Out) of the previous layer may be used as the input activation (Act_in) of the next layer.

The weight may refer to a parameter multiplied by the input activation (Act_in) which is input from each layer. The weight is adjusted and confirmed in the deep learning stage, and may be used to derive the output activation (Act_Out) through a fixed value in the inference stage.

The activation LSU 140 may transmit the input activation (Act_In) from the L0 memory 120 to the activation buffer 150 and transmit the output activation (Act_Out) from the activation buffer 150 to the on-chip buffer. That is, the activation LSU 140 may perform both load and store works of the activation.

The activation buffer 150 may provide the input activation (Act_in) to the processing unit 160 and receive the output activation (Act_Out) from the processing unit 160. The activation buffer 150 may temporarily store the input activation (Act_in) and the output activation (Act_Out).

The activation buffer 150 may quickly provide the activation to the processing unit 160 with a large computation load, in particular, to the PE array 163, and quickly receive the activation so as to increase the computing speed of the neural core 100.

The processing unit 160 may be a module that performs computations. The processing unit 160 may perform not only one-dimensional computations but also two-dimensional matrix computations, that is, convolution computations. The processing unit 160 may receive the input activation (Act_In), multiply it by the weight, and add the result to generate the output activation (Act_Out).

Figure 29:
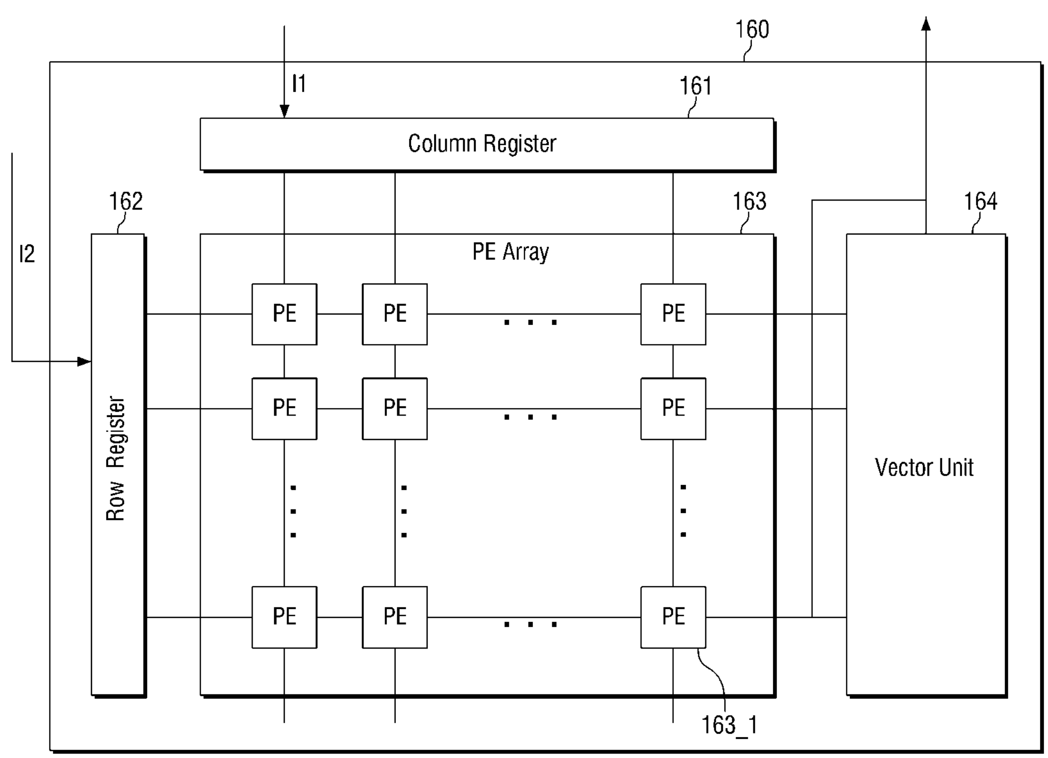
FIG. 29 is a block diagram provided to explain the processing unit of FIG. 27 in detail.

FIG. 29 is a block diagram provided to explain the processing unit of FIG. 27 in detail.

Referring to FIGS. 27 and 29, the processing unit 160 may include a PE array 163, a vector unit 164, a column register 161, and a row register 162.

The PE array 163 may receive the input activation (Act_in) and the weight (Weight) and perform multiplication. The input activation (Act_in) and the weight (Weight) may each be computed through convolution in matrix form. Through this, the PE array 163 may generate the output activation (Act_Out). However, aspects are not limited to the above. The PE array 163 may generate any type of output other than the output activation (Act_Out).

The PE array 163 may include at least one or more processing elements 163_1. The processing elements 1631 may be aligned with one another and perform multiplication of one input activation (Act_in) and one weight (Weight), respectively.

The PE array 163 may generate a subtotal of the resultant values of each multiplication. The partial sum may be used as the output activation (Act_Out). The PE array 163 may also be called a two-dimensional matrix computing unit as it performs two-dimensional matrix multiplication.

The vector unit 164 may perform one-dimensional computation. The vector unit 164 may perform deep learning computation with the PE array 163. Through this, the processing unit 160 may be specialized for necessary computations. That is, the neural core 100 may include computation modules to perform a large amount of two-dimensional matrix multiplications and one-dimensional computations, and thus be able to perform the deep learning computation efficiently.

The column register 161 may receive a first input (I1). The column register 161 may receive the first input (I1), divide it, and provide the result to each column of the PE array 163.

The row register 162 may receive a second input (I2). The row register 162 may receive the second input 12, divide the same, and provide the result to each row of the PE array 163.

The first input (I1) may be the input activation (Act_In) or the weight (Weight). The second input (I2) may be either the input activation (Act_In) or the weight (Weight), which is not the first input (I1). Alternatively, the first input (I1) and the second input (I2) may be values other than the input activation (Act_in) and the weight (Weight).

Figure 30:
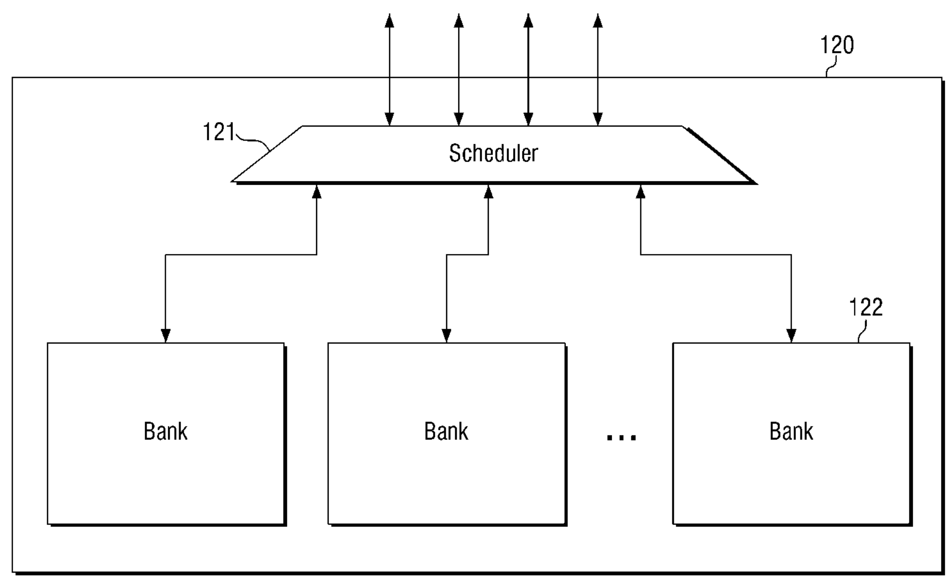
FIG. 30 is a block diagram provided to explain the L0 memory of FIG. 27 in detail.

FIG. 30 is a block diagram provided to explain the L0 memory of FIG. 27 in detail.

Referring to FIG. 30, the L0 memory 120 may include a scheduler 121 and at least one local memory bank 122.

When data is stored in the L0 memory 120, the scheduler 121 may receive the data from the load engine 113*a*. The data may be allocated to the local memory bank 122 in a round robin manner. Accordingly, the data may be stored in any one of at least one local memory bank 122.

Conversely, when the data is loaded from the L0 memory 120, the scheduler 121 may receive the data from the local memory bank 122 and transmit the same to the store engine 113*b*. The store engine 113*b* may store the data to the outside through the local interconnection 200.

Figure 31:
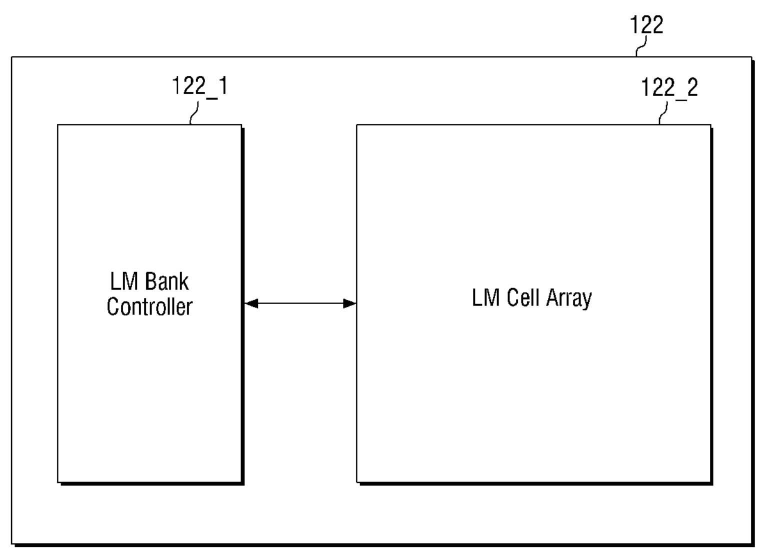
FIG. 31 is a block diagram provided to explain the local memory bank of FIG. 30 in detail.

FIG. 31 is a block diagram provided to explain the local memory bank of FIG. 30 in detail.

Referring to FIG. 31, the local memory bank 122 may include a local memory bank controller 122_1 and a local memory bank cell array 122_2.

The local memory bank controller 122_1 may manage read and write operations through address of data stored in the local memory bank 122. That is, the local memory bank controller 122_1 may manage the overall data input and output.

The local memory bank cell array 1222 may have a structure in which cells directly stored with data are aligned in rows and columns. The local memory bank cell array 1222 may be controlled by the local memory bank controller 122_1.

Figure 32:
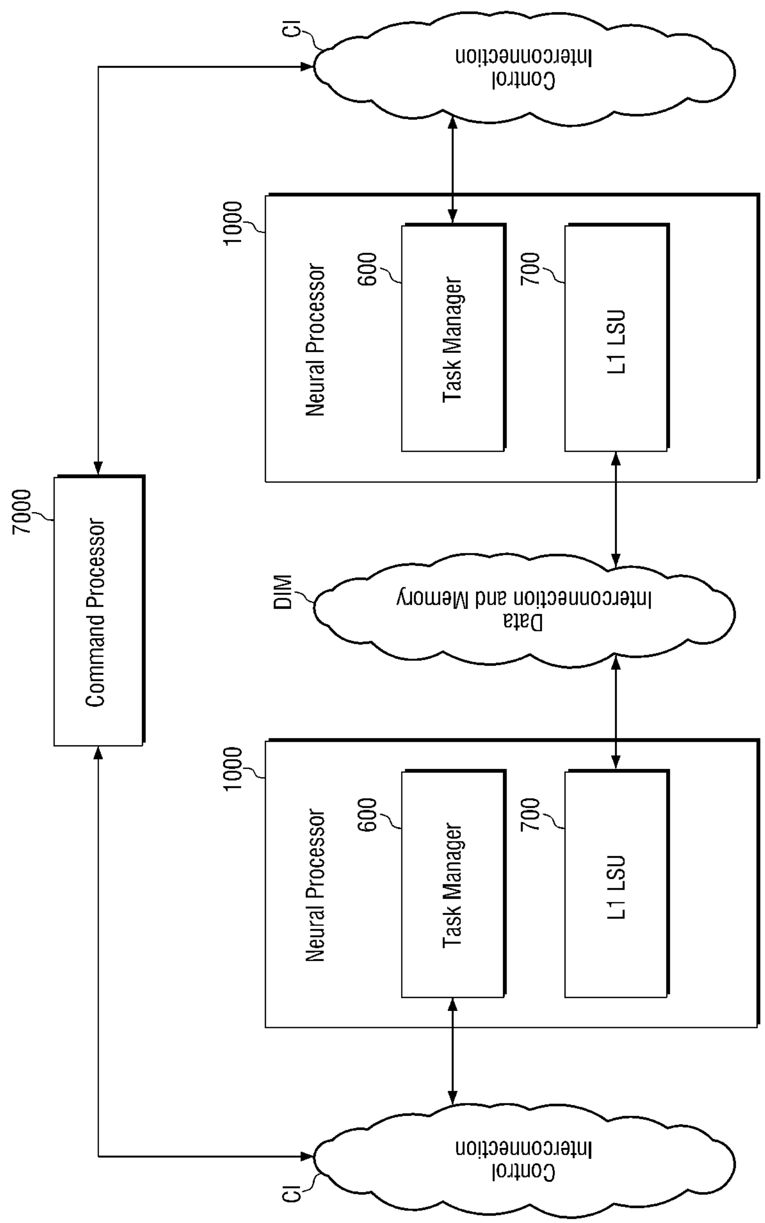
FIG. 32 is a block diagram provided to explain the flow of data and control signals of the neural processing device of FIG. 1.
Figure 33:
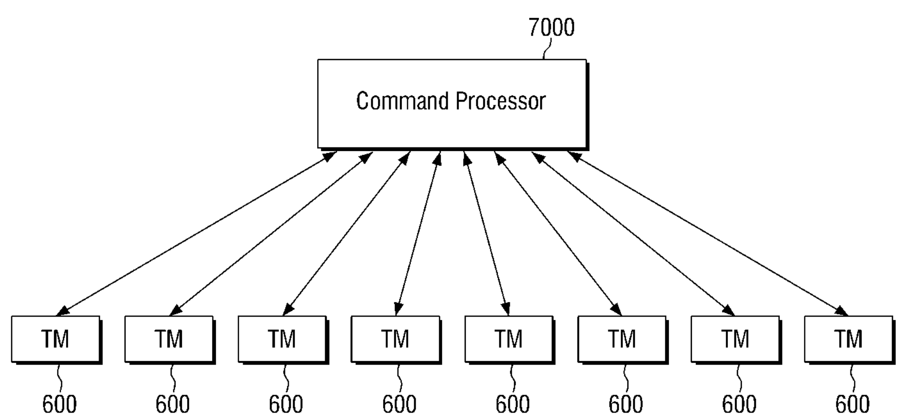
FIG. 33 is a block diagram provided to explain the relations between the command processor of FIG. 32 and the task manager.

FIG. 32 is a block diagram provided to explain the flow of data and control signals of the neural processing device of FIG. 1, and FIG. 33 is a block diagram provided to explain the relations between the command processor of FIG. 32 and the task manager.

Referring to FIGS. 32 and 33, each neural processor 1000 may include the task manager 600 and the L1 LSU 700 therein, respectively. The task managers 600 may exchange control signals and responses with the command processor 7000 through the control interconnection (CI).

Conversely, the L1 LSU 700 may exchange data through the data interconnection and the memory (DIM). The data interconnection and the memory (DIM) may include an interconnection for transmitting data, and a memory for sharing the data. Specifically, the data interconnection and the memory (DIM) may include the local interconnection 200 and the data channel 6100. Further, the data interconnection and the memory (DIM) may include the L1 shared memory 400, the shared memory 2000, and the volatile memory 32. However, aspects are not limited to the above.

The task manager 600 may be controlled by the command processor 7000. That is, the command processor 7000 may transmit a task to the task manager 600 through the control signals, and the task manager 600 may transmit a task completion report to the command processor 7000. The neural processor 1000 may include at least one task manager 600. Further, if there are a plurality of neural processors 1000, the number of task managers 600 may increase. All of the plurality of task managers 600 may be controlled by the command processor 7000.

Figure 34:
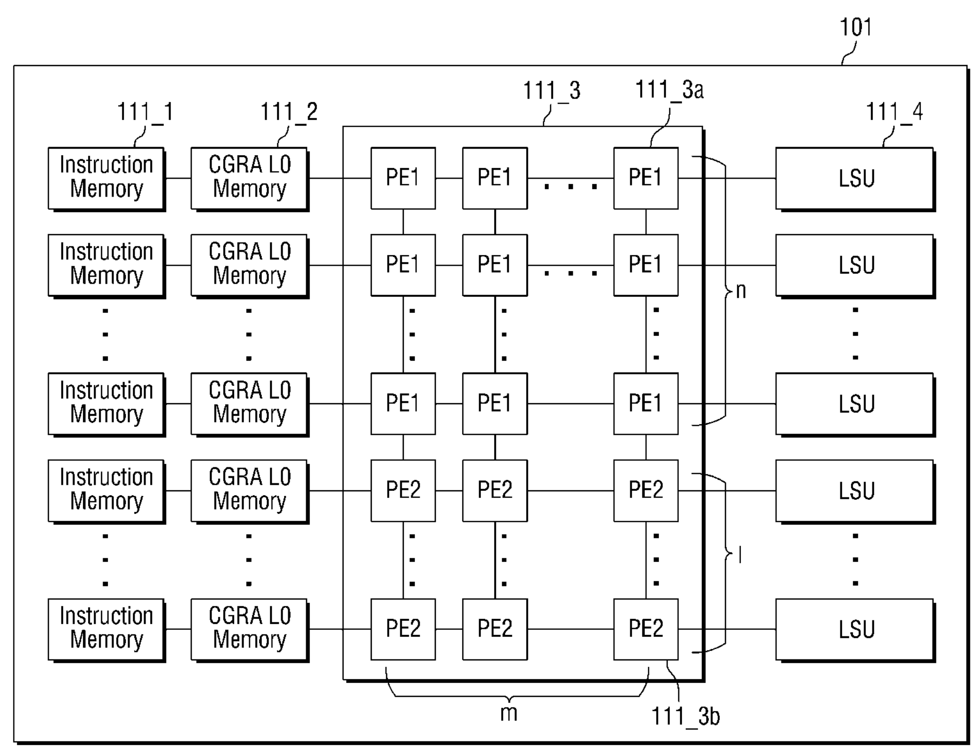
FIG. 34 is a block diagram provided to explain in detail the structure of the neural processing system according to some examples.

FIG. 34 is a block diagram provided to explain in detail the structure of the neural processing system according to some examples.

Referring to FIG. 34, unlike the neural core 100, the neural core 101 may have a CGRA structure. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 1111 may sequentially store the instructions therein and provide the stored instructions to the PE array 111_3. The instruction may instruct the operation of a first type processing element 111_3*a* included in each PE array 111_3.

The CGRA L0 memory 1112 may be a memory located within the neural core 101, and the neural core 101 may receive all of input data required for the work from the outside and temporarily store the same in the CGRA L0 memory 111_2. Further, the CGRA L0 memory 1112 may temporarily store the output data computed by the neural core 101 so as to transmit the same to the outside. The CGRA L0 memory 1112 may play a role of a cache memory of the neural core 101.

The CGRA L0 memory 1112 may transmit and receive data to and from the PE array 111_3. The CGRA L0 memory 1112 may be a memory corresponding to level 0 (L0) lower than L1. The L0 memory may be a private memory of the neural core 101 which is not shared. The CGRA L0 memory (111_2) may transmit data and programs such as activation or weight to the PE array (111_3).

The PE array 1113 may be a module that performs computation. The PE array 111_3 may perform not only the one-dimensional computation but also the two-, or higher-dimensional matrix/tensor computations. The PE array 1113 may include a plurality of first type processing elements 111_3_a_ and second type processing elements 111_3_b_ therein.

The first type processing elements 111_3_a_ and the second type processing elements 111_3_b_ may be aligned in rows and columns. The first type processing elements 111_3_a_ and the second type processing elements 111_3_b_ may be aligned in m columns. Further, the first type processing elements 111_3_a_ may be aligned in n rows, and the second type processing elements 111_3_b_ may be aligned in 1 rows. Accordingly, the first type processing elements 111_3_a_ and the second type processing elements 111_3_b_ may be aligned in (n+1) rows and m columns.

The LSU 111_4 may receive at least one of data, control signals, and synchronization signals from the outside through the local interconnection 200. The LSU 1114 may transmit at least one of the data, the control signals, and the synchronization signals received by the CGRA L0 memory 111_2. Similarly, the LSU 111_4 may transmit at least one of the data, the control signals, and the synchronization signals to the outside through the local interconnection 200.

The neural core 101 may have a Coarse Grained Reconfigurable Architecture (CGRA) structure. Accordingly, for the neural core 101, each of the first type processing elements 111_3_a_ and the second type processing elements 111_3_b_ of the PE array 1113 may be connected to at least one of the CGRA L0 memory 111_2, the instruction memory 111_1, and the LSU 111_4, respectively. That is, the first type processing element 111_3_a_ and the second type processing element 111_3_b_ may not necessarily be connected to all of the CGRA L0 memories 111_2, the instruction memories 111_1, and the LSUs 111_4, but may be connected to some of them.

Further, the first type processing elements 111_3_a_ and the second type processing elements 111_3_b_ may be different types of processing elements. Accordingly, among the CGRA L0 memory 111_2, the instruction memory 111_1, and the LSU 111_4, the element connected to the first type processing element 111_3_a_ may be different from the element connected to the second type processing element 111_3_b_.

The neural core 101 with the CGRA structure is capable of high-level parallel computations and direct data exchanges between the first type processing elements 111_3_a_ and the second type processing elements 111_3_b_, thus greatly saving power consumption. Further, inclusion of two or more types of first type processing elements 111_3_a_ also enable optimization according to various computational works.

For example, if the first type processing element 111_3_a_ is a processing element that performs two-dimensional computation, the second type processing element 111_3_b_ may be a processing element that performs one-dimensional computation. However, aspects are not limited to the above.

Figure 35:
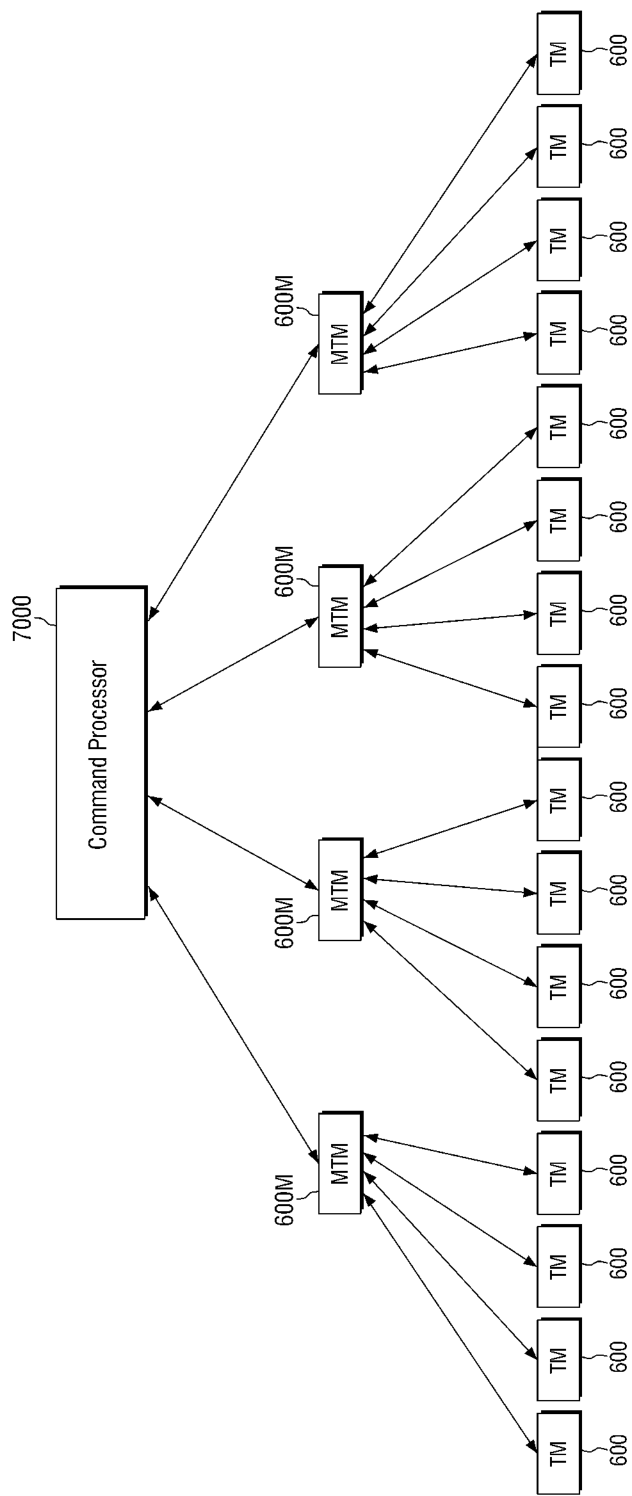
FIG. 35 is a diagram provided to explain the hierarchical structure of the command processor and the task managers of the neural processing device according to some examples.
Figure 36:
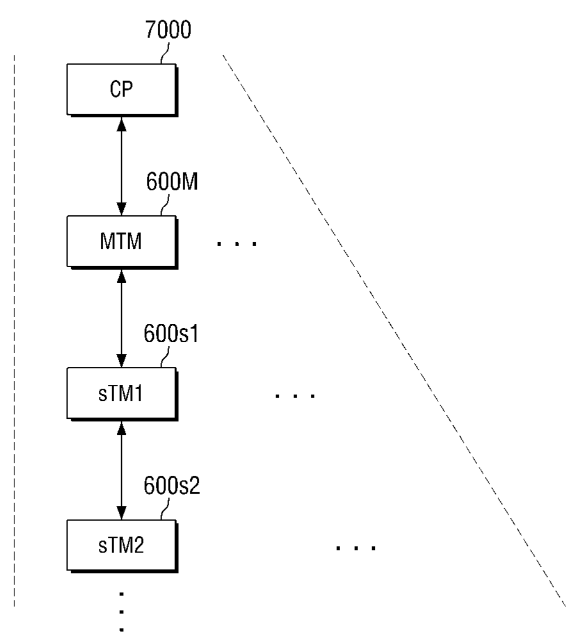
FIG. 36 is a diagram provided to explain the hierarchical structure of the command processor and the task managers of the neural processing device according to some examples.

FIG. 35 is a diagram provided to explain the hierarchical structure of the command processor and the task managers of the neural processing device according to some examples, and FIG. 36 is a diagram provided to explain the hierarchical structure of the command processor and the task managers of the neural processing device according to some examples.

Referring to FIGS. 35 and 36, as the number of task managers 600 increases, it may be difficult for the command processor 7000 to manage all of the task managers 600. Accordingly, the neural processing device 1 according to some examples may have hierarchical structure in which a master task manager 600M manages a plurality of task managers 600, and the command processor 7000 manages the master task manager 600M.

Further, referring to FIG. 36, levels below the master task manager 600M may also be subdivided in various ways. For example, a first sub-task manager 600_s_1 and a second sub-task manager 600_s_2 may form respective classes. That is, one first sub-task manager 600_s_1 may manage at least one second sub-task manager 600_s_2, and one master task manager 600M may manage at least one first sub-task manager 600_s_1. Further, several classes may be added below the second sub-task manager 600_s_2.

That is, although three levels of the task manager 600, the master task manager 600M, and the command processor 7000 are illustrated in FIGS. 35 and 36, the number of levels may be four or more. That is, depth of the hierarchical structure may vary depending on the number of task managers 600.

Figure 37:
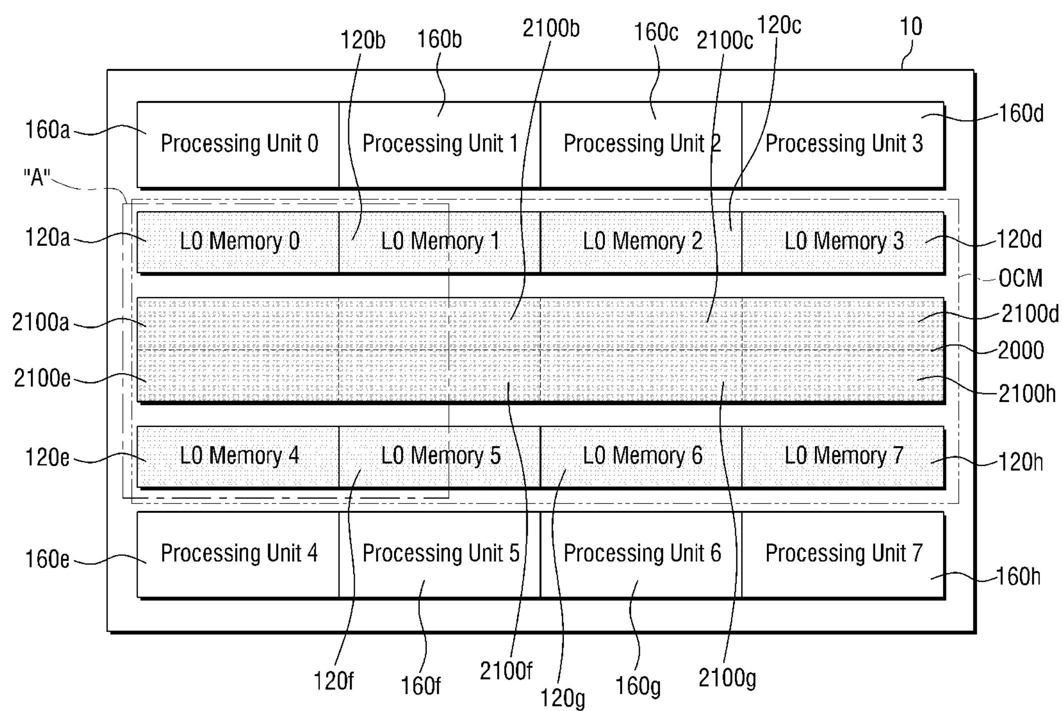
FIG. 37 is a block diagram provided to explain memory reorganization of the neural processing system according to some examples.

FIG. 37 is a block diagram provided to explain memory reorganization of the neural processing system according to some examples.

Referring to FIG. 37, the neural core SoC 10 may include first to eighth processing units 160_a_ to 160_h_ and an on-chip memory (OCM). Although FIG. 37 illustrates eight processing units as an example, this is only an example and the number of processing units may vary.

The on-chip memory (OCM) may include first to eighth L0 memories 120_a_ to 120_h_ and the shared memory 2000.

The first to eighth L0 memories 120_a_ to 120_h_ may be used as private memories for the first to eighth processing units 160_a_ to 160_h_, respectively. That is, the first to eighth processing units 160_a_ to 160_h_ and the first to eighth L0 memories 120_a_ to 120_h_ may correspond to each other on a 1:1 basis.

The shared memory 2000 may include first to eighth memory units 2100_a_ to 2100_h_. The first to eighth memory units 2100_a_ to 2100_h_ may correspond to the first to eighth processing units 160_a_ to 160_h_ and the first to eighth L0 memories 120_a_ to 120_h_, respectively. That is, the number of memory units may be 8, which is same as the number of processing units and L0 memories.

The shared memory 2000 may operate in any one of two formats of the on-chip memory. That is, the shared memory 2000 may operate in any one of an L0 memory format or a global memory format. The shared memory 2000 may implement two logical memories with one hardware.

If the shared memory 2000 is implemented in the L0 memory format, the shared memory 2000 may operate as a private memory for each of the first to eighth processing units 160_a_ to 160_h_, such as the first to eighth L0 memories 120_a_ to 120_h_. The L0 memory may operate at a relatively higher clock speed compared to the global memory, and the shared memory 2000 may also use a relatively faster clock when operating in the L0 memory format.

If the shared memory 2000 is implemented in the global memory format, the shared memory 2000 may operate as a common memory used by both the first processing unit 100_a_ and the second processing unit 100_b_. The shared memory 2000 may be shared not only by the first to eighth processing units 160_a_ to 160_h_, but also by the first to eighth L0 memories 120_a_ to 120_h_.

The global memory may generally use a lower clock than the L0 memory, but aspects are not limited thereto. If the shared memory 2000 operates in the global memory format, the first to eighth processing units 160_a_ to 160_h_ may share the shared memory 2000. In this case, the shared memory 2000 may be connected to the volatile memory 32 of FIG. 2 through the global interconnection 6000, and may operate as a buffer of the volatile memory 32.

At least part of the shared memory 2000 may operate in the L0 memory format, and the remainder of the shared memory may operate in the global memory format. That is, the entire shared memory 2000 may operate in the L0 memory format, or the entire shared memory 2000 may operate in the global memory format. Alternatively, part of the shared memory 2000 may operate in the L0 memory format, and the other of the shared memory may operate in the global memory format.

Figure 38:
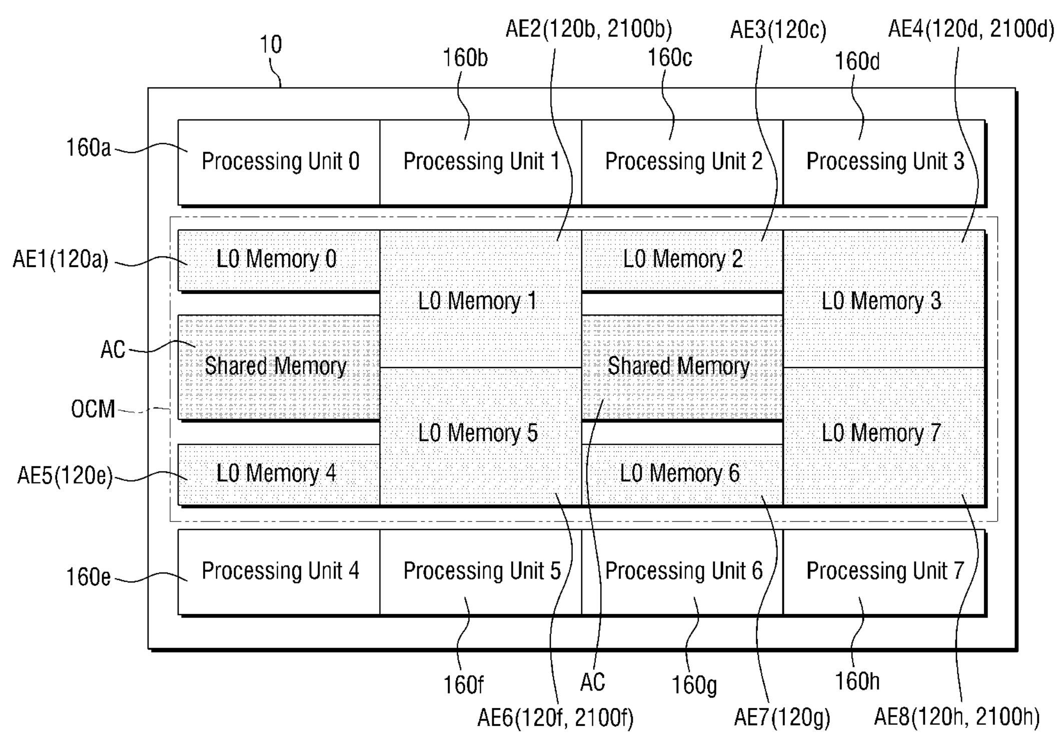
FIG. 38 is a block diagram illustrating an example of memory reorganization of the neural processing system according to some examples.

FIG. 38 is a block diagram illustrating an example of memory reorganization of the neural processing system according to some examples.

Referring to FIGS. 37 and 38, first, third, fifth, and seventh private areas AE1, AE3, AE5, and AE7 of each of the first, third, fifth, and seventh processing units 100*a*, 100*c*, 100*e*, and 100*g* may include only the first, third, fifth, and seventh L0 memories 120*a*, 120*c*, 120*e*, and 120*g*. Further, second, fourth, sixth, and eighth private areas AE2, AE4, AE6, and AE8 of each of the second, fourth, sixth, and eighth processing units 100*b*, 100*d*, 100*f*, and 100*h* may include the second, fourth, sixth, and eighth L0 memories 120*b*, 120*d*, 120*f*, and 120*h*. Further, the second, fourth, sixth, and eighth private areas AE2, AE4, AE6, and AE8 may include the second, fourth, sixth, and eighth memory units 2100*b*, 2100*d*, 2100*f*, and 2100*h*. The first, third, fifth, and seventh memory units 2100*a*, 2100*c*, 2100*e*, and 2100*g* of the shared memory 2000 may be used as a common area (AC).

The common area (AC) may be a memory shared by the first to eighth processing units 160*a* to 160*h*. The second private area (AE2) may include the second L0 memory 120*b* and the second memory unit 2100*b*. The second private area (AE2) may be an area where the hardware-separated second L0 memory 120*b* and second memory unit 2100*b* operate in the same manner so as to logically operate as one L0 memory. Further, the fourth, sixth, and eighth private areas AE4, AE6, and AE8 may operate in the same manner as the second private area (AE2).

The shared memory 2000 may be configured such that the areas corresponding to each neural core may be converted into an optimized ratio of logical L0 memories and logical global memories. The shared memory 2000 may perform adjustment of such ratio at run time.

That is, each neural core may perform the same works, or may perform different works. Accordingly, the capacity of the L0 memories and the capacity of the global memories required for the work performed by each neural core are different each time. Accordingly, if the ratio of the L0 memories and the shared memories is fixed as in the case of the related on-chip memory, inefficiency may occur due to the computational works assigned to each neural core.

Accordingly, the shared memory 2000 of the neural processing device can improve efficiency and speed of computation by setting an optimal ratio of the L0 memories and the global memories depending on the computational work at run time.

Figure 39:
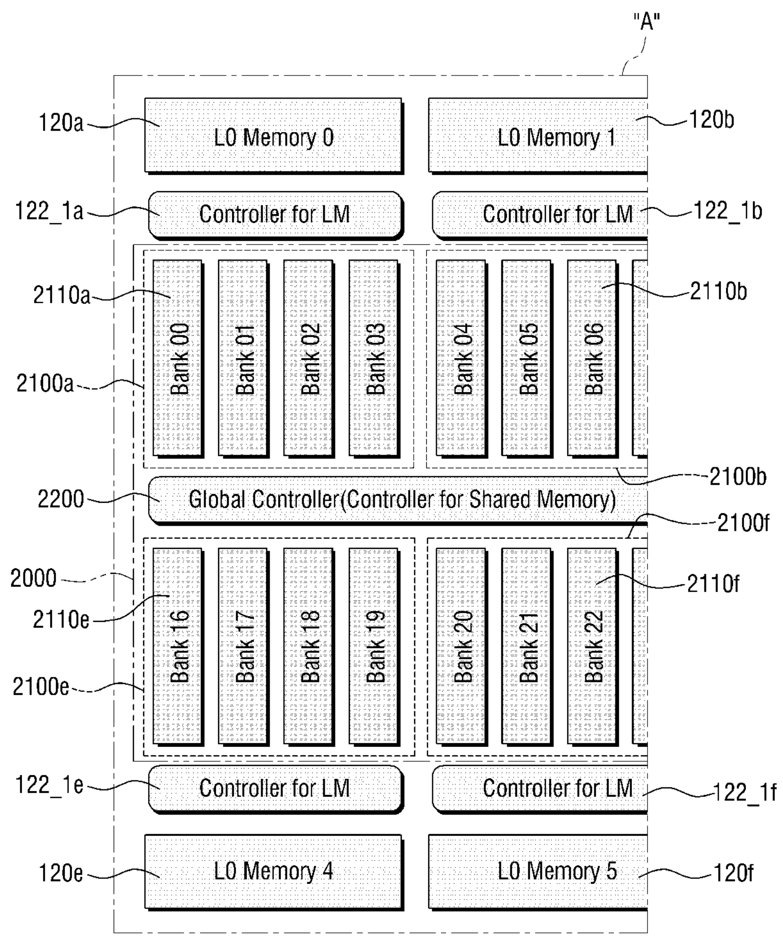
FIG. 39 is an enlarged block diagram of the area Ain FIG. 37.

FIG. 39 is an enlarged block diagram of the area A in FIG. 37.

Referring to FIGS. 37 and 39, the shared memory 2000 may include a first L0 memory controller 122_1*a*, a second L0 memory controller 122_1*b*, a fifth L0 memory controller 122_1*e*, a sixth L0 memory controller 122_1*f*, first to eighth memory units 2100*a* to 2100*h*, and a global controller 2200. Although not illustrated, the other L0 memory controllers may also be included, but they will not be described herein for convenience of description.

The first L0 memory controller 122_1*a* may control the first L0 memory 120*a*. Further, the first L0 memory controller 122_1*a* may control the first memory unit 2100*a*. Specifically, if the first memory unit 2100*a* is implemented in a logical L0 memory format, control by the first L0 memory controller 122_1*a* may be performed over the first memory unit 2100*a*.

The second L0 memory controller 122_1*b* may control the second L0 memory 120*b*. Further, the second L0 memory controller 122_1*b* may control the second memory unit 2100*b*. That is, if the second memory unit 2100*b* is implemented in the logical L0 memory format, control by the first L0 memory controller 122_1*a* may be performed over the second memory unit 2100*b*.

The fifth L0 memory controller 122_1*e* may control the fifth L0 memory 120*e*. Further, the fifth L0 memory controller 122_1*e* may control the fifth memory unit 2100*e*. That is, if the fifth memory unit 2100*e* is implemented in the logical L0 memory format, control by the fifth L0 memory controller 122_1*e* may be performed over the fifth memory unit 2100*e*.

The sixth L0 memory controller 122_1*f* may control the sixth L0 memory 120*f*. Further, the sixth L0 memory controller 122_1*f* may control the sixth memory unit 2100*f*. That is, if the sixth memory unit 2100*f* is implemented in the logical L0 memory format, control by the sixth L0 memory controller 122_1*f* may be performed over the sixth memory unit 2100*f*.

The global controller 2200 may control all of the first to eighth memory units 2100*a* to 2100*h*. Specifically, if each of the first to eighth memory units 2100*a* to 2100*h* logically operates in the global memory format (i.e., not logically operating in the L0 memory format), the global controller 2200 may control the first memory unit 2100*a* to eighth memory unit 2100*h*.

That is, each of the first to eighth memory units 2100*a* to 2100*h* may be controlled by the first to eighth L0 memory controllers 122_1*a* to 122_1*h*, or by the global controller 2200, depending on which of the memory formats they are implemented logically.

If the L0 memory controllers including the first, second, fifth, and sixth L0 memory controllers 122_1*a*, 122_1*b*, 122_1*e*, and 122_1*f* control the first to eighth memory units 2100*a* to 2100*h*, respectively, the first to eighth L0 memory controllers 122_1*a* to 141*h*, which control the first to eighth memory units 2100*a* to 2100*h* in the same manner as the first to eighth L0 memories 120*a* to 120*h*, may control as the private memories of the first to eighth processing units 160*a* to 160*h*. Accordingly, the first to eighth memory units 2100*a* to 2100*h* may operate at a clock frequency corresponding to the clock frequency of the first to eighth processing units 160*a* to 160*h*.

The L0 memory controllers including the first L0 memory controller 122_1*a*, the second L0 memory controller 122_1*b*, the fifth L0 memory controller 122_1*e*, and the sixth L0 memory controller 122_1*f* may each include the LSU 110 of FIG. 8.

If the global controller 2200 controls at least one of the first to eighth memory units 2100*a* to 2100*h*, the global controller 2200 may control each of the first to eighth memory units 2100*a* to 2100*h* by the global memory of the first to eighth processing units 160*a* to 160*h*. Accordingly, at least one of the first to eighth memory units 2100*a* to 2100*h* may operate at a clock frequency not related to the clock frequencies of each of the first to eighth processing units 160*a* to 160*h*. However, aspects are not limited to the above.

The global controller 2200 may connect the first to eighth memory units 2100*a* to 2100*h* to the global interconnection 6000 of FIG. 3. The first to eighth memory units 2100*a* to 2100*h* may exchange data with the off-chip memory 30 of FIG. 1 by the global controller 2200, or exchange data with each of the first to eighth L0 memories 120*a* to 120*h*.

The first to eighth memory units 2100*a* to 2100*h* may each include at least one memory bank. The first memory unit 2100*a* may include at least one or more first memory banks 2110*a*. The first memory banks 2110*a* may be the areas of the first memory unit 2100*a* divided by a specific size. The first memory banks 2110*a* may all be the memory elements of a same size. However, aspects are not limited to the above. In FIG. 39, it is illustrated that four memory banks are included in one memory unit.

Similarly, the second, fifth, and sixth memory units 2100*b*, 2100*e*, and 2100*f* may include at least one second memory bank 2110*b*, at least one fifth memory bank 2110*e*, and at least one sixth memory bank 2110*f*, respectively.

Hereinbelow, the first memory bank 2110*a* and the fifth memory bank 2110*e* will be mainly described, but it is to be noted that the same applies to the other memory banks including the second and sixth memory banks 2110*b* and 2110*f*.

The first memory bank 2110*a* may logically operate in the L0 memory format or logically operate in the global memory format. The first memory bank 2110*a* may operate independently of the other memory banks in the first memory unit 2100*a*. However, aspects are not limited to the above.

If each memory bank operates independently, the first memory unit 2100*a* may include a first area operating in the same manner as the first L0 memory 120*a*, and a second area operating in a different manner from the first L0 memory 120*a*. The first area and the second area may not necessarily exist in parallel, and any one area may occupy the entire area of the first memory unit 2100*a*.

Likewise, the second memory unit 2100*b* may include a third area operating in the same manner as the second L0 memory 120*b*, and a fourth area operating in a different manner from the second L0 memory 120*b*. The third area and the fourth area may not necessarily exist in parallel, and any one area may occupy the entire area of the first memory unit 2100*a*.

The ratio of the first area and the second area may be different from the ratio of the third area and the fourth area. However, aspects are not limited to the above. Accordingly, the ratio of the first area and the second area may be same as the ratio of the third area and the fourth area. That is, the ratio of the memories configured in each memory unit may vary as desired.

In the related system-on-chip, high-density, low-power SRAM is used for configuring the on-chip memories excluding high-speed L0 memory. This is because SRAM has high efficiency in terms of chip size and power consumption compared to the required capacity. However, inefficiency occurs, because the processing speed of the related on-chip memory will considerably slow down if it is necessary to use the data that exceeds the predetermined capacity of the L0 memory quickly, and besides, there is no way to utilize the remaining global memory even when the need for the global memory is not so large.

Conversely, the shared memory 2000 according to some examples may be selectively controlled by one of the two controllers if necessary. In this case, the shared memory 2000 may not be controlled as a whole by only one of the two controllers, but may be independently controlled on a memory unit basis or a memory bank basis.

Through this, the shared memory 2000 may obtain the optimal ratio of memories according to the computational work during run time, and may thus be able to perform faster and more efficient computational work. For the processing unit specialized for artificial intelligence, different sizes of the L0 memory and global memory may be needed on a specific application basis. Further, even for the same application, if a deep learning network is used, the sizes of the L0 memory and global memory required for each layer may vary. The shared memory 2000 may enable fast and efficient deep learning work because the memory ratio can change during run time according to changes in the computation steps of each layer.

Figure 40:
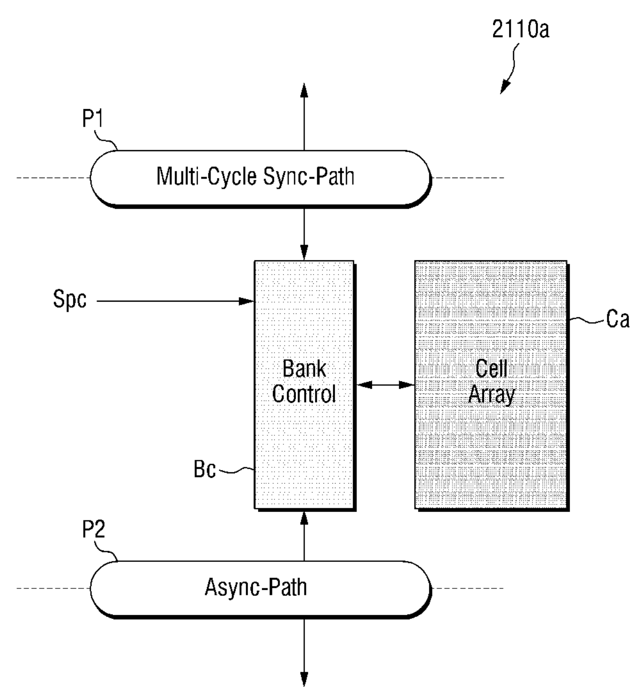
FIG. 40 is a diagram provided to explain the first memory bank of FIG. 39 in detail.

FIG. 40 is a diagram provided to explain the first memory bank of FIG. 39 in detail. Although FIG. 40 illustrates the first memory bank 2110*a*, the other memory banks may also have the same structure as the first memory bank 2110*a*.

Referring to FIG. 40, the first memory bank 2110*a* may include a cell array (Ca), a bank controller (Bc), a first path unit (P1), and a second path unit (P2).

The cell array (Ca) may include a plurality of memory elements (Cells) therein. For the cell array (Ca), a plurality of memory elements may be aligned and disposed in lattice structure. For example, the cell array (Ca) may be a Static Random Access Memory (SRAM) cell array.

The bank controller (Bc) may control the cell array (Ca). The bank controller (Bc) may determine whether the cell array (Ca) is to operate in the L0 memory format or the global memory format, and control the cell array (Ca) accordingly.

Specifically, the bank controller (Bc) may determine during run time whether to transmit and receive data in a direction of the first path unit (P1) or in a direction of the second path unit (P2). The bank controller (Bc) may determine a direction of transmitting and receiving data according to the path control signal (Spc).

The path control signal (Spc) may be generated by a previously designed device driver or compiler. The path control signal (Spc) may be generated according to the features of the computational work. Alternatively, the path control signal (Spc) may be generated by the input received from the user. That is, user may directly apply the input to the path control signal (Spc) in order to select the most optimal memory ratio.

The bank controller (Bc) may determine, through the path control signal (Spc), a path for transmitting and receiving the data stored in the cell array (Ca). The data exchange interface may vary according to the determination of the bank controller (Bc) regarding the path for transmitting and receiving the data. That is, the bank controller (Bc) may use a first interface for exchanging data with the first path unit (P1), and use a second interface for exchanging data with the second path unit (P2). The first interface and the second interface may be different from each other.

Further, an address system for storing the data may vary. That is, if a specific interface is selected, read and write operations may be performed by the corresponding address system.

The bank controller (Bc) may operate at a specific clock frequency. For example, if the cell array (Ca) is an SRAM cell array, the bank controller (Bc) may operate at a general SRAM operating clock frequency.

The first path unit (P1) may be connected to the bank controller (Bc). The first path unit (P1) may directly exchange data of the cell array (Ca) with the first processing unit 100*a*. By "direct" exchange, it may mean exchange without intervention of the global interconnection 6000. That is, the first processing unit 100*a* may directly exchange data with the first L0 memory 120*a*, and the first processing unit 100*a* may exchange data through the first path unit (P1) when the shared memory 2000 is logically implemented in the L0 memory format. The first path unit (P1) may include the L0 memory controllers including the first L0 memory controller 122_1*a* and the second L0 memory controller 122_1*b* of FIG. 29.

The first path unit (P1) may configure a multi-cycle sync path. That is, the operating clock frequency of the first path unit (P1) may be the same as the operating clock frequency of the first processing unit 100*a*. The first L0 memory 120*a* may quickly exchange data at the same clock frequency as the operating clock frequency of the first processing unit 100*a* so as to quickly exchange data with the same speed as that of the operation of the first processing unit 100*a*. The first path unit (P1) may also operate at the same clock frequency as the operating clock frequency of the first processing unit 100*a*.

The operating clock frequency of the first path unit (P1) may be a multiple of the operating clock frequency of the bank controller (Bc). In this case, clock domain crossing (CDC) work for clock synchronization between the bank controller (Bc) and the first path unit (P1) is not required, and accordingly, a delay in data transmission may not occur. Accordingly, faster and more efficient data exchange is possible.

In FIG. 40, for example, the operating clock frequency of the first path unit (P1) may be 1.5 GHz. This may be two times the frequency of 750 MHz of the bank controller (Bc). However, aspects are not limited to the above, and other examples are possible as long as the first path unit (P1) operates at an integer multiple of the clock frequency of the bank controller (Bc).

The second path unit (P2) may be connected to the bank controller (Bc). The second path unit (P2) may exchange data of the cell array (Ca) through the global interconnection 6000 instead of directly exchanging the data with the first processing unit 100*a*. That is, the first processing unit 100*a* may exchange the data with the cell array (Ca) through the global interconnection 6000 and the second path unit (P2). The cell array (Ca) may exchange the data with not only the first processing unit 100*a* but also the other neural cores.

That is, the second path unit (P2) may be a data exchange path between the cell array (Ca) and all of the neural cores, if the first memory bank 2110*a* is logically implemented in the global memory format. The second path unit (P2) may include the global controller 2200 of FIG. 28.

The second path unit (P2) may configure async-path. The operating clock frequency of the second path unit (P2) may be the same as that of the global interconnection 6000. The second path unit (P2) may also operate at the same clock frequency as the operating clock frequency of the global interconnection 6000.

The operating clock frequency of the second path unit (P2) may not be synchronized with the operating clock frequency of the bank controller (Bc). In this case, a clock domain crossing (CDC) work may be required to synchronize the clocks between the bank controller (Bc) and the second path unit (P2). If the operating clock frequency of the bank controller (Bc) and the operating clock frequency of the second path unit (P2) are not synchronized with each other, the degree of freedom in designing the clock domain may increase. Accordingly, difficulty of hardware design can be lowered and hardware operation may be derived more easily.

The bank controller (Bc) may use different address systems when exchanging data through the first path unit (P1) and when exchanging data through the second path unit (P2). That is, the bank controller (Bc) may use a first address system through the first path unit (P1) and use a second address system through the second path unit (P2). The first address system and the second address system may be different from each other.

The bank controller (Bc) may not necessarily exist for each memory bank. That is, because the bank controller (Bc) is not a part of scheduling, but plays a role of transmitting signals, it is not an essential part for each memory bank having two ports. Therefore, one bank controller (Bc) may control several memory banks. Even when the bank controller (Bc) controls the several memory banks, the several memory banks may operate independently. However, aspects are not limited to the above.

Of course, the bank controller (Bc) may exist for each memory bank. In this case, the bank controller (Bc) may individually control each memory bank.

Referring to FIGS. 39 and 40, the first memory unit 2100*a* may use the first address system for exchanging data through the first path unit (P1), and use the second address system for exchanging data through the second path unit (P2). Similarly, the second memory unit 2100*b* may use the third address system for exchanging data through the first path unit (P1), and use the second address system for exchanging data through the second path unit (P2). The first address system and the third address system may be the same as each other. However, aspects are not limited to the above.

The first address system and the third address system may be used exclusively for the first processing unit 100*a* and the second processing unit 100*b*, respectively. The second address system may be commonly applied to the first processing unit 100*a* and the second processing unit 100*b*.

In FIG. 40, as an example, the second path unit (P2) may operate at an operating clock frequency of 1 GHz. This frequency may not be synchronized with 750 MHz of the operating clock frequency of the bank controller (Bc). That is, the operating clock frequency of the second path unit (P2) may be freely set and may not be dependent on the operating clock frequency of the bank controller (Bc).

In the general global memory that uses a slow SRAM (e.g., 750 MHz) with a faster global interconnection (e.g., 1 GHz), delay inevitably occurs according to CDC work. Conversely, because it is possible that the shared memory 2000 according to some examples uses the first path unit (P1) in addition to the second path unit (P2), delay according to CDC work can be avoided.

Further, because a plurality of neural cores use a single global interconnection 6000 in the general global memory, decrease in overall processing speed easily occurs when data transmission traffics occur simultaneously. Conversely, it is possible that the shared memory 2000 according to some examples uses the first path unit (P1) in addition to the second path unit (P2), thereby providing effects of dispersing the data processing load congesting the global controller 2200.

Figure 41:
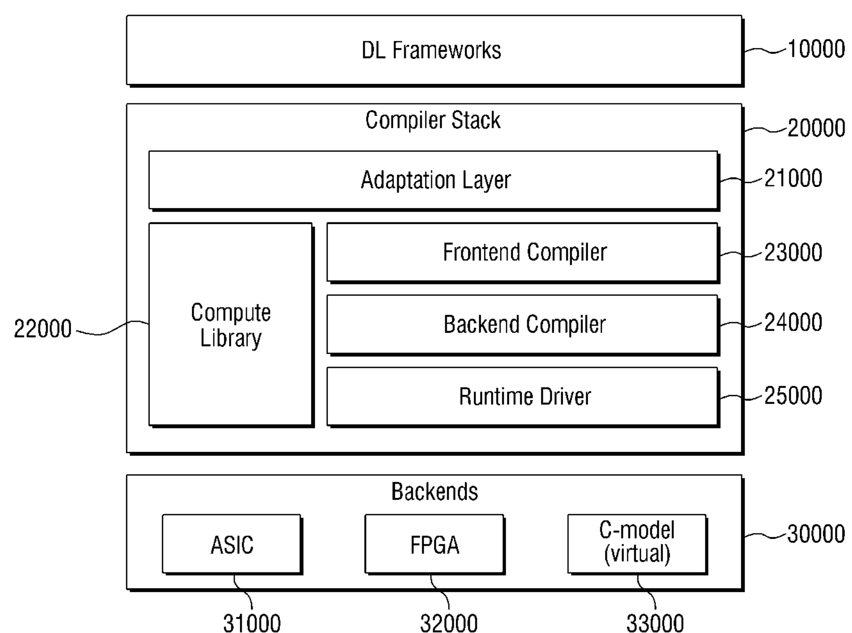
FIG. 41 is a block diagram provided to explain a software hierarchy of the neural processing device.

FIG. 41 is a block diagram provided to explain a software hierarchy of the neural processing device.

Referring to FIG. 41, the software layer structure of the neural processing device according to some examples may include a DL framework 10000, a compiler stack 20000, and a backend module 30000.

The DL framework 10000 may refer to a framework for a deep learning model network used by the user. For example, a fully trained neural network may be generated using programs such as TensorFlow or PyTorch.

The compiler stack 20000 may include an adaptation layer 21000, a compute library 22000, a frontend compiler 23000, a backend compiler 24000, and a runtime driver 25000.

The adaptation layer 21000 may be a layer in contact with the DL framework 10000. The adaptation layer 21000 may quantize the user's neural network model generated in the DL framework 10000 and modify the graph. In addition, the adaptation layer 21000 may convert the type of the model into a required type.

The frontend compiler 23000 may convert various neural network models and graphs received from the adaptation layer 21000 into a certain intermediate representation (IR). The converted IR may be a preset expression that is easy to handle later in the backend compiler 24000.

The IR of the frontend compiler 23000 may be optimized in advance at the graph level. In addition, the frontend compiler 23000 may generate the IR by way of conversion into a hardware-optimized layout.

The backend compiler 24000 optimizes the IR converted in the frontend compiler 23000, and converts this into a binary file for use by the runtime driver. The backend compiler 24000 may generate optimized code by dividing the job at a scale that matches the details of the hardware.

Among various operations, the compute library 22000 may store template operations designed in a form suitable for hardware. The compute library 22000 provides the backend compiler 24000 with several template operations that require hardware, thereby generating optimized code.

During operation, the runtime driver 25000 may continuously perform monitoring so as to operate the neural network device according to some examples. Specifically, it may be responsible for executing the interface of the neural network device.

The backend module 30000 may include an application specific integrated circuit (ASIC) 31000, a field programmable gate array (FPGA) 32000, and a C-model 33000. The ASIC 31000 may refer to a hardware chip determined according to a predetermined way of design. The FPGA 32000 may be a programmable hardware chip. The C-model 33000 may refer to a model implemented by simulating hardware on software.

The backend module 30000 may perform various works and derive results using binary code generated through the compiler stack 20000.

Figure 42:
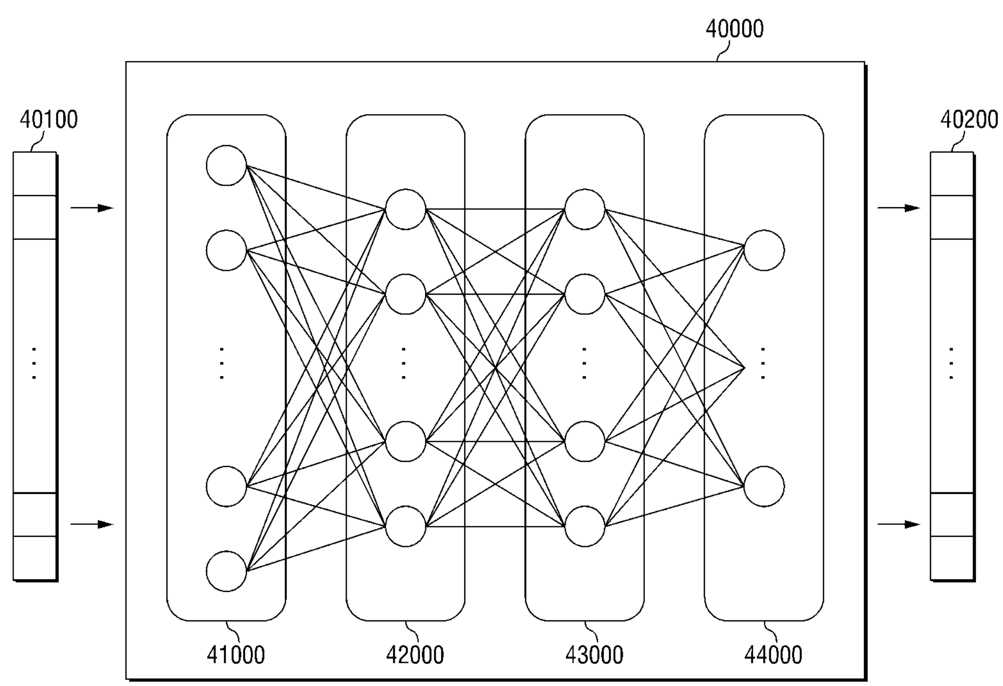
FIG. 42 is a conceptual diagram provided to explain a deep learning computation performed by the neural processing device.

FIG. 42 is a conceptual diagram provided to explain a deep learning computation performed by the neural processing device.

Referring to FIG. 42, in machine learning technology and cognitive science, the artificial neural network model 40000 as an example of the machine learning model refers to a statistical learning algorithm implemented based on a structure of a biological neural network, or to a structure that executes such algorithm.

The artificial neural network model 40000 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 40000 may include any probability model, neural network model, and the like, that is used in artificial intelligence training methods such as machine learning and deep learning.

The neural processing device according to some examples may perform computations by implementing this form of artificial neural network model 40000. For example, the artificial neural network model 40000 may receive an input image and output information on at least a portion of the object included in the input image.

The artificial neural network model 40000 is implemented as a multilayer perceptron (MLP) formed of multiple nodes and connections between them. The artificial neural network model 40000 may be implemented using one of various artificial neural network model structures including the MLP. As illustrated in FIG. 39, the artificial neural network model 40000 includes an input layer 41000 to receive an input signal or data 40100 from the outside, an output layer 44000 to output an output signal or data 40200 corresponding to the input data, and (n) number of hidden layers 42000 to 43000 (where n is a positive integer) positioned between the input layer 41000 and the output layer 44000 to receive a signal from the input layer 41000, extract the features, and transmit the features to the output layer 44000. The output layer 44000 receives signals from the hidden layers 42000 to 43000 and outputs the same to the outside.

The method of training the artificial neural network model 40000 includes the supervised learning that trains to optimize for solving a problem with inputs of teacher signals (correct answers), and the unsupervised learning that does not require a teacher signal.

The neural processing device may directly generate the training data for training the artificial neural network model 40000 through simulation. As described above, the input layer 41000 and the output layer 44000 of the artificial neural network model 40000 are respectively matched with a plurality of output variables corresponding to a plurality of input variables, and as the synaptic values between nodes included in the input layer 41000, the hidden layers 42000 to 43000, and the output layer 44000 are adjusted, training can be processed to extract a correct output corresponding to a specific input. Through this training process, the features hidden in the input variables of the artificial neural network model 40000 may be confirmed, and the synaptic values (or weights) between the nodes of the artificial neural network model 40000 may be adjusted so as to reduce the errors between the output variable calculated based on the input variable and the target output.

Figure 43:
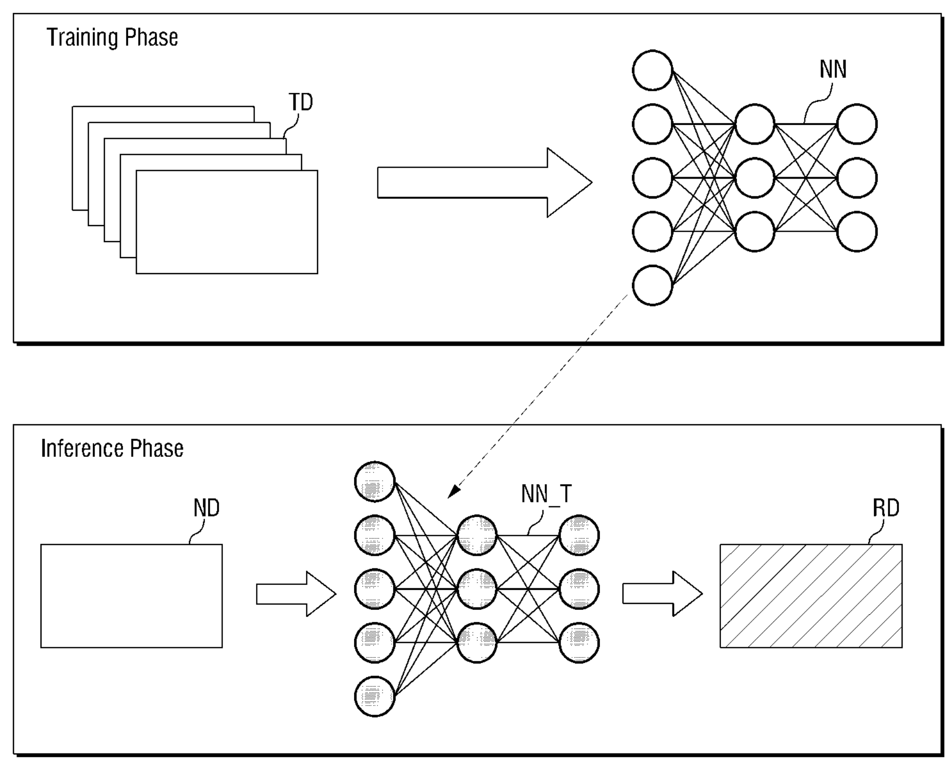
FIG. 43 is a conceptual diagram provided to explain training and inference operations of a neural network of the neural processing device.

FIG. 43 is a conceptual diagram provided to explain training and inference operations of the neural network of the neural processing device.

Referring to FIG. 43, in the training phase, a plurality of training data (TD) may go through the process of being forwarded to the artificial neural network model (NN) and then backwarded. Through this, the weights and biases of each node of the artificial neural network model (NN) are adjusted, and this allows the model to be trained to produce increasingly accurate results. Through this training phase, the artificial neural network model (NN) may be converted into the trained neural network model (NN_T).

In the inference phase, new data (ND) may be input back to the trained neural network model (NN_T). The trained neural network model (NN_T) may take the new data (ND) as input and derive the result data (RD) through previously trained weights and biases. For this result data (RD), which training materials (TD) are used in the training phase and how many training materials (TD) are used may be important.

Figure 44:
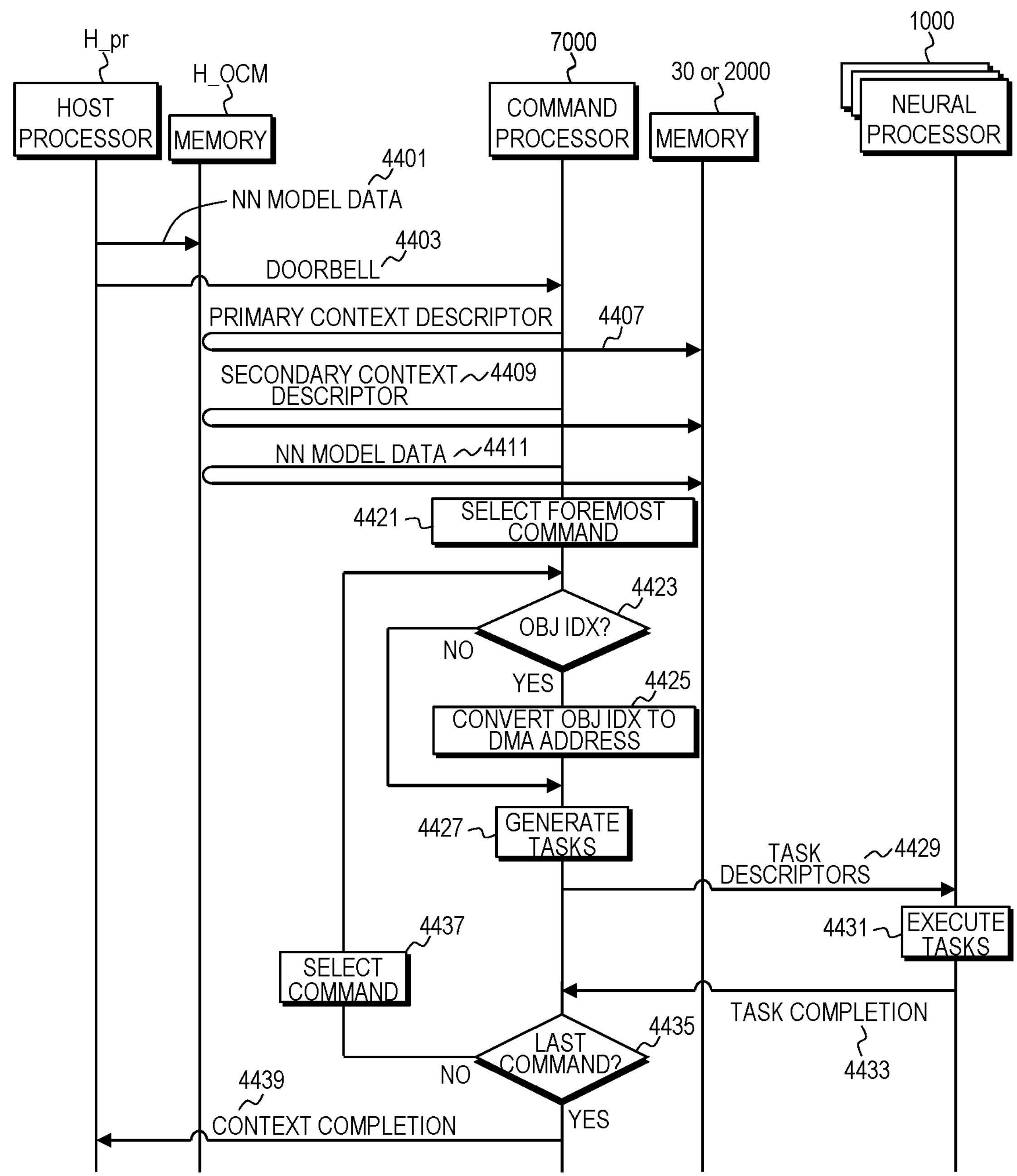
FIG. 44 is a ladder diagram for executing a context of the neural network model according to some examples of the disclosure.

FIG. 44 is a ladder diagram for executing a context of the neural network model according to some examples of the disclosure.

Referring to FIG. 44, the host processor H_pr may create a primary context descriptor, a secondary context descriptor, and a neural network model data for a current context of a neural network model and store them to the host off-chip memory H_OCM at 4401.

In some embodiments, the neural network model data for the current context of the neural network model may comprise parameter data, input data, binary code data, a command stream, and a data structure pool (Ds_p). In some embodiments, the parameter data for the neural network model may comprise weights for each of layers for the current context of the neural network model. In some embodiments, the binary code data may contain one or more binary codes using the input data and the parameter data for the current context of the neural network model. In some embodiments, the parameter data for the current context of the neural network model may be the same as or different from the parameter data for the previous context of the neural network model. In some embodiments, the binary code data for the current context of the neural network model may be the same as or different from the binary code data for the previous context of the neural network model. In some embodiments, the command stream may comprise one or more command descriptors.

In some embodiments, the data structure pool (Ds_p) may comprise one or more objects including one or more variable assignment objects and one or more computation objects. Each of one or more variable assignment objects may comprise a sequence of one or more variable assignment statements. The variable assignment statement may assign a value to a variable. Each of one or more computation objects may comprise a sequence of one or more computation statements for computation using one or more variables set by the variable assignment statement. The computation statement may be a compound statement which may contain sequence of one or more statements. The computation object may use variables set by the variable assignment statement. In some embodiments, the data structure pool (Ds_p) may be referred to as an object database, since the data structure pool (Ds_p) comprises one or more objects.

In some embodiments, the host system may store primary context descriptors in the ring buffer RB.

At 4403, the host processor H_pr may generate a doorbell and transmit the doorbell to the command processor 7000. In some embodiments, a context start signal indicating a start of the current context of the neural network model may be referred to as the doorbell. In some embodiments, the host processor H_pr may write the doorbell to a register which the command processor 7000 monitors as an interrupt. When the command processor 7000 notices that the doorbell has been written in the register, the command processor 7000 may determine that the command processor 7000 receives the doorbell. In some embodiments, the doorbell may comprise or consist of one or more update fields. In some embodiments, each update field of the one or more update fields may include an update index subfield and an update value subfield. In some embodiments, the size of the register the command processor 7000 monitors as an interrupt for the doorbell may be, but not limited to, 32 bits. In some embodiments, the sizes of the update field, the update index subfield, and the update value subfield may be, but not limited to, 32 bits, 8 bits, and 24 bits, respectively. In some embodiments, the update index subfield may indicate an information field to be updated in the primary context descriptor and the secondary context descriptor. In some embodiments, the update value subfield may indicate a value to be updated of the field indicated by the update index subfield. In some embodiments, the doorbell may comprise or consist of a plurality of the updated fields.

The command processor 7000 may directly access the host off-chip memory H_OCM independently of the host processor H_pr according to DMA scheme to read the primary context descriptor from the host off-chip memory H_OCM to store the read primary context descriptor in the off-chip memory 30 or the shared memory 2000, at 4407.

In some embodiments, when the command processor 7000 may manage a register storing a counter indicating how many doorbells are received, the command processor 7000 may determine the address of the primary context descriptor based on the counter indicating the number of received doorbells and may directly access the host off-chip memory H_OCM by using the determined address of the primary context descriptor. For example, the command processor 7000 may reset the counter to 0 and increase the counter by 1 when the command processor 7000 receives one doorbell. In some embodiments, the command processor 7000 may determine the address of the primary context descriptor according to the below Equation 1.

[Equation 1]

$$\text{(address of primary context descriptor)} = \text{(the start address of the ring buffer } RB) + [(\text{(value of the counter)} - 1) \bmod \text{(total number of elements in the ring buffer } RB)] \times \text{(the size of an element in the ring buffer } RB)$$

In Equation 1, mod represents the modulo operator, and A mod B represents the modulo operation returning the remainder of a division of A by B.

Referring to Equation 1, for example, if the start address of the ring buffer RB is 0x1000, the value of the counter is 4, the total number of elements in the ring buffer RB is 10, and the size of an element in the ring buffer RB is 2 byte, the command processor 7000 may determine the address of the primary context descriptor as 0x1006 which is equal to 0x1000+((4-1) mod 10)×2. If the value of the counter is 14, the command processor 7000 may determine the address of the primary context descriptor as 0x1006 which is equal to 0x1000+((14-1) mod 10)×2.

In some embodiments, when the doorbell explicitly comprises an index of the doorbell, the command processor 7000 may determine the address of the primary context descriptor based on the index of the received doorbell and may directly access the host off-chip memory H_OCM by using the determined address of the primary context descriptor. For example, the command processor 7000 may determine the address of the primary context descriptor according to the below Equation 2.

[Equation 2]

$$\text{(address of primary context descriptor)} = \text{(the start address of the ring buffer } RB) + [((index) - 1) \bmod \text{(total number of elements in the ring buffer } RB)] \times \text{(the size of an element in the ring buffer } RB)$$

In some embodiments, when the doorbell may explicitly comprise the address of the primary context descriptor, the command processor 7000 may directly access the host off-chip memory H_OCM by using the address of the primary context descriptor in the doorbell.

In some embodiments, the primary context descriptor may comprise one or more information fields. Referring to FIG. 6, the primary context descriptor may comprise a context identifier information field containing an identifier of the current context of the neural network model, a secondary context descriptor address information field containing an address of the secondary context descriptor, and one or more information fields containing binary code for the current context of the neural network model.

The command processor 7000 may directly access the host off-chip memory H_OCM independently of the host processor H_pr according to DMA scheme to read the secondary context descriptor from the host off-chip memory H_OCM to store the read secondary context descriptor in the off-chip memory 30 or the shared memory 2000 at 4409.

In some embodiments, when the primary context descriptor may explicitly comprise the address of the secondary context descriptor, the command processor 7000 may directly access the host off-chip memory H_OCM by using the address of the secondary context descriptor in the primary context descriptor to read the secondary context descriptor.

In some embodiments, when the primary context descriptor may implicitly comprise the address of the secondary context descriptor, the command processor 7000 may determine the address of the secondary context descriptor based on, but not limited to, information in the primary context descriptor and may directly access the host off-chip memory H_OCM by using the address of the secondary context descriptor in the primary context descriptor to read the secondary context descriptor.

In some embodiments, the secondary context descriptor may comprise one or more information fields. Referring to FIG. 7, the secondary context descriptor may comprise a plurality of groups of information fields. Each group of the plurality of groups may be associated with a respective one of a plurality of operations and may comprise one or more information fields. In some embodiments, the secondary context descriptor may comprise a first group of information fields associated with DMA of parameter data for the neural network model, a second group of information fields associated with DMA of input data of the neural network model, a third group of information fields associated with DMA of binary code data for the neural network model, a fourth group of information fields associated with DMA of the command stream for the neural network model, one or more fifth groups of information fields associated with writing a register for the current context of the neural network model, and one or more sixth groups of information fields associated with reading a register for the current context of the neural network model. In some embodiments, the secondary context descriptor may comprise a seventh group of information fields associated with DMA of the data structure pool (Ds_p) for the neural network model.

In some embodiments, the first group of information fields associated with DMA of parameter data for the neural network model may comprise a source address information field containing a source address pointing to a memory area having the parameter data to be accessed according to DMA scheme, a destination address information field containing a destination address pointing to a memory area in which the accessed parameter data is stored, and a transfer size information field containing a size of the parameter data pointed to by the source address.

In some embodiments, the second group of information fields associated with DMA of input data of the neural network model may comprise a source address information field containing a source address pointing to a memory area having the input data to be accessed according to DMA scheme, a destination address information field containing a destination address pointing to a memory area in which the accessed input data is stored, and a transfer size information field containing a size of the input data pointed to by the source address.

In some embodiments, the third group of information fields associated with DMA of binary code data for the neural network model may comprise a source address information field containing a source address pointing to a memory area having the binary code data to be accessed according to DMA scheme, a destination address information field containing a destination address pointing to a memory area in which the accessed binary code data is stored, and a transfer size information field containing a size of the binary code data pointed to by the source address.

The fourth group of information fields associated with DMA of the command stream for the neural network model may comprise a source address information field containing a source address pointing to a memory area having the command stream to be accessed according to DMA scheme, a destination address information field containing a destination address pointing to a memory area in which the accessed command stream is stored, and a transfer size information field containing a size of the command stream pointed to by the source address.

A respective one fifth group of information fields associated with writing a register for the current context of the neural network model may comprise a register address information field containing a register address pointing to a register in which a value is written for the current context of the neural network model and a register value information field containing a value to be written in the register pointed to by the register address.

A respective one sixth group of information fields associated with reading a register for the current context of the neural network model may comprise a register address information field containing a register address pointing to a register in which a value is read for the current context of the neural network model.

The seventh group of information fields associated with DMA of the data structure pool (Ds_p) for the neural network model may comprise a source address information field containing a source address pointing to a memory area having the data structure pool (Ds_p) to be accessed according to DMA scheme, a destination address information field containing a destination address pointing to a memory area in which the accessed data structure pool (Ds_p) is stored, and a transfer size information field containing a size of the data structure pool (Ds_p) pointed to by the source address.

At 4411, the command processor 7000 may directly access the host off-chip memory H_OCM independently of the host processor H_pr according to DMA scheme to read the neural network model data for the current context of the neural network model from the host off-chip memory H_OCM and to store the read neural network model data in the off-chip memory 30 or the shared memory 2000.

In some embodiments, the command processor 7000 may directly access the host off-chip memory H_OCM by using the first group of information fields to read the parameter data for the current context of the neural network model. For example, the command processor 7000 may directly access the host off-chip memory H_OCM by using the source address information field and the transfer size information field of the first group to read the parameter data corresponding to the source address information field and the transfer size information field and to store the read parameter data in a memory area of the off-chip memory 30 or the shared memory 2000 pointed to by the destination address information field of the first group.

In some embodiments, the command processor 7000 may directly access the host off-chip memory H_OCM by using the second group of information fields to read the input data for the current context of the neural network model. For example, the command processor 7000 may directly access the host off-chip memory H_OCM by using the source address information field and the transfer size information field of the second group to read the input data corresponding to the source address information field and the transfer size information field and to store the read input data in a memory area of the off-chip memory 30 or the shared memory 2000 pointed to by the destination address information field of the second group.

In some embodiments, the command processor 7000 may directly access the host off-chip memory H_OCM by using the third group of information fields to read the binary code data for the current context of the neural network model. For example, the command processor 7000 may directly access the host off-chip memory H_OCM by using the source address information field and the transfer size information field of the third group to read the binary code data corresponding to the source address information field and the transfer size information field and to store the read binary code data in a memory area of the off-chip memory 30 or the shared memory 2000 pointed to by the destination address information field of the third group.

In some embodiments, the command processor 7000 may directly access the host off-chip memory H_OCM by using the fourth group of information fields to read the command stream for the current context of the neural network model. For example, the command processor 7000 may directly access the host off-chip memory H_OCM by using the source address information field and the transfer size information field of the fourth group to read the command stream corresponding to the source address information field and the transfer size information field and to store the read command stream in a memory area of the off-chip memory 30 or the shared memory 2000 pointed to by the destination address information field of the fourth group.

In some embodiments, regarding the fifth group of information fields, the command processor 7000 may write a value indicated by the register value information field in the register pointed to by the register address indicated by the register address information field.

In some embodiments, regarding the sixth group of information fields, the command processor 7000 may read a value stored in a register pointed to by the register address indicated by the register address information field.

In some embodiments, the command processor 7000 may directly access the host off-chip memory H_OCM by using the seventh group of information fields to read the data structure pool (Ds_p) for the current context of the neural network model. For example, the command processor 7000 may directly access the host off-chip memory H_OCM by using the source address information field and the transfer size information field of the seventh group to read the data structure pool (Ds_p) corresponding to the source address information field and the transfer size information field and to store the read data structure pool (Ds_p) in a memory area of the off-chip memory 30 or the shared memory 2000 pointed to by the destination address information field of the seventh group.

At 4421, the command processor 7000 may select the foremost command among commands in the command stream as a current command.

At 4423, the command processor 7000 may determine whether the current command has a DMA address format or an object index format. In some embodiments, the command processor 7000 may determine whether the current command comprises one or more object indices.

Hereinafter, the command descriptor will be described with reference to FIG. 45.

Figure 45:
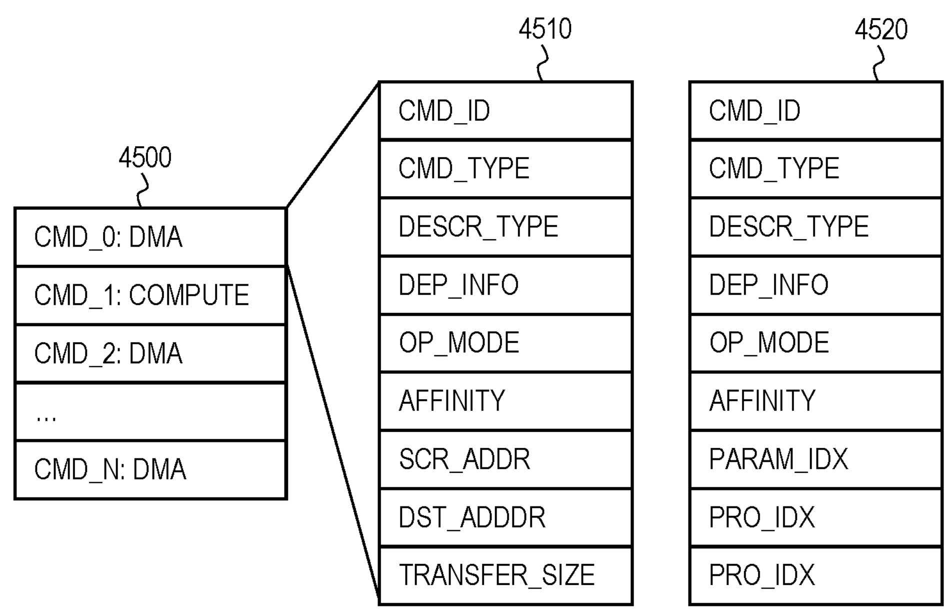
FIG. 45 shows formats of command descriptors in accordance with an embodiment.

FIG. 45 shows formats of command descriptors in accordance with an embodiment.

Referring to FIG. 45, a command stream 4500 may include N command descriptors CMD_0 to CMD_N. A command descriptor may comprise one or more information fields. A command descriptor may comprise a common information field and one or more DMA information fields.

The command common information field may include information common to command descriptors. In some embodiments, the command common information field may include a command identifier subfield (CMD_ID), a command type subfield (CMD_TYPE), a descriptor type subfield (DESCR_TYPE), a dependency information subfield (DEP_INFO), an operation mode subfield (OP_MODE) and an affinity subfield (AFFINITY). The command identifier subfield (CMD_ID) may include a command identifier indicating the command described by the command descriptor. The command type subfield (CMD_TYPE) may include a command type indicating a type of the command described by the command descriptor. The descriptor type subfield (DESCR_TYPE) may include a descriptor type indicating a type of the command descriptor. The dependency information subfield (DEP_INFO) may include dependency information indicating a list of reference commands which the command described by the command descriptor depends on. In some embodiments, since the command described by the command descriptor depends on the reference commands listed in the dependency information, the command described by the command descriptor may be executed after the reference commands are completed. The operation mode subfield (OP_MODE) may include an operation mode of the command described by the command descriptor.

In some embodiments, if a command descriptor CMD_0 has the DMA address format, the command descriptor CMD_0 may have a format shown in a command descriptor 4510. The command descriptor CMD_0 may include one or more DMA information fields. A respective DMA information field of the command descriptor CMD_0 may include one or more DMA address information subfields including a source address information subfield (SRC_ADDR) containing a source address pointing to a memory area having data to be accessed according to DMA scheme, a destination address information subfield (DST_ADDR) containing a destination address pointing to a memory area in which the accessed data is stored, and a transfer size information subfield (TRANSFER_SIZE) containing a transfer size indicating a size of the data pointed to by the source address.

In some embodiments, if the command descriptor CMD_0 has the object index format, the command descriptor CMD_0 may have a format shown in a command descriptor 4520. The command descriptor CMD_0 may include one or more DMA information fields. A respective DMA information field of the command descriptor CMD_0 may include one or more object index information subfields which include object indices, respectively. A respective one object index may indicate a variable assignment object or a computation object. Referring to FIG. 45, the object index (PARAM_IDX) may indicate a variable assignment object and the object index (PRO_IDX) may indicate a computation object. In some embodiments, a combination of one or more variable assignment objects and one or more computation objects may form a binary code to be executed by the neural processor 1000.

In some embodiments, the size of a command descriptor in the object index format may be smaller than the size of a command descriptor in the DMA address format. For example, if the sizes of the source address information subfield (SRC_ADDR), the destination address information subfield (DST_ADDR), and the transfer size information subfield (TRANSFER_SIZE) are 32, 32, and 16 bits, respectively, a total of 80 bits may be necessary to describe one binary code for a command. If the sizes of the object index (PARAM_IDX) indicating a variable assignment object and the object index (PRO_IDX) indicating a computation object are 16 bits, a total of 32 bits may be necessary to describe one binary code for a command. Since the command stream may describe many binary codes, it may be important to reduce the size of bits describing the binary code. If the command descriptor in the object index format is used, the size of a command stream may be reduced, efficiency for transmitting the neural network model data including the command stream from the host system HS to neural processing device 1 may increase.

In some embodiments, the same sequence of one or more variable assignment statements may be repeatedly used and the same sequence of one or more computation statements may be repeatedly used for describing the tasks in the neural network model. For example, if sequences A1, A2, and A3 of one or more variable assignment statements and sequences B1 and B2 of one or more computation statements are used, the binary code data of the neural network model data may have to include sequences (A1, B1), (A1, B2), (A2, B1), (A2, B2), (A3, B1), and (A3, B2) to support the command descriptor in the DMA address format. However, the data structure pool of the neural network model data may have to include sequences (A1), (A2), (A3), (B1), and (B2) to support the command descriptor in the object index format. If it is assumed that the size of one sequence is M bytes, Mx12 bytes of neural network model data need to be transmitted from the host system HS to neural processing device 1 to support the command descriptors in the DMA address format. However, Mx5 bytes of neural network model data need to be transmitted from the host system HS to neural processing device 1 to support the command descriptors in the object index format. Therefore, efficiency for transmitting the neural network model data from the host system HS to neural processing device 1 may increase.

Referring to FIG. 44 again, in some embodiments, the command processor 7000 may determine whether the current command has a DMA address format or an object index format based on at least one of the command type subfield (CMD_TYPE) or the descriptor type subfield (DESCR_TYPE). In some embodiments, the command processor 7000 may determine whether the current command comprises one or more object indices based on at least one of the command type subfield (CMD_TYPE) or the descriptor type subfield (DESCR_TYPE). In some embodiments, the command type subfield (CMD_TYPE) set equal to a first set of one or more predetermined values may indicate that the command has the DMA address format and the command type subfield (CMD_TYPE) set equal to a second set of one or more predetermined values may indicate that the command has the object index format. In some embodiments, the descriptor type subfield (DESCR_TYPE) set equal to a first set of one or more predetermined values may indicate that the command has the DMA address format and the descriptor type subfield (DESCR_TYPE) set equal to a second set of one or more predetermined values may indicate that the command has the object index format.

At 4425, the command processor 7000 may convert one or more object index information fields in the current command to one or more sets of DMA information fields. In some embodiments, the command processor 7000 may convert a format of the current command to the DMA address format.

In some embodiments, the command processor 7000 may calculate the source address, the destination address and the transfer size based on an object index according to Equations 3, 4, and 5.

$$(\text{source address})=(\text{default memory address for source memory addresses})+(\text{object index})\times(\text{size of object}) \quad \text{[Equation 3]}$$

$$(\text{destination address})=(\text{default address for destination addresses})+(\text{object index})\times(\text{size of object}) \quad \text{[Equation 4]}$$

$$(\text{transfer size})=(\text{size of object}) \quad \text{[Equation 5]}$$

In some embodiments, the command processor 7000 may obtain the default memory address for source memory addresses, the default address for destination addresses, and the transfer size based on the secondary context descriptor. For example, the command processor 7000 may read the start address of data structure pool, the default address for destination addresses, and the transfer size stored from registers pointed to by the register addresses indicated by register address information fields in the secondary context descriptor. In some embodiments, the default memory address for source memory addresses may be equal to the start address of data structure pool.

In some embodiments, the command processor 7000 may replace a respective one of the one or more object index information fields in the command descriptor describing the current command with the calculated source address, destination address, and the transfer size.

convert the current command in the object index format to the current command in the DMA address format.

The command processor 7000 may generate task descriptors based on at least one of the primary context descriptor, the secondary context descriptor, and the neural network model data at 4427 and distribute the task descriptors to the plurality of neural processors 1000 at 4429 so that the plurality of neural processors 1000 perform tasks described by the task descriptors. In some embodiments, the command processor 7000 may generate task descriptors based on a command descriptor describing the current command in the DMA address format. Even though the command processor 7000 supports both the DMA address format and the object index format for the command descriptor, the command processor 7000 may not need to include hardware or software for generating task descriptors based on command descriptors in the object index format by converting the format of the command descriptor to the DMA address format.

After a respective neural processor of the plurality of neural processors 1000 receives a task descriptor, the respective neural processor may execute the task described by the received task descriptor at 4431.

In some embodiments, the respective neural processor may directly access the off-chip memory 30 or the shared memory 2000 according to an address of input data indicated by the task descriptor to read the input data indicated by the task descriptor.

In some embodiments, the respective neural processor may directly access the off-chip memory 30 or the shared memory 2000 according to an address of parameter data indicated by the task descriptor to read the parameter data indicated by the task descriptor.

In some embodiments, the respective neural processor may directly access the off-chip memory 30 or the shared memory 2000 according to an address of a binary code indicated by the task descriptor to read the binary code indicated by the task descriptor.

In some embodiments, the respective neural processor may execute the binary code using the input data and the parameter data to generate a task result.

After the plurality of neural processors 1000 complete tasks described by the task descriptors, the command processor 7000 may receive task completion signals from the plurality of neural processors 1000, at 4433.

In some embodiments, the task completion signal from the respective neural processor may include the task result generated by the respective neural processor.

At 4435, the command processor 7000 may determine whether the current command is the last command among commands in the command stream.

In some embodiments, the command processor 7000 may determine whether the current command is the last command based on the command common information field. For example, the command processor 7000 may determine it based on the command type subfield (CMD_TYPE) or the descriptor type subfield (DESCR_TYPE) in the command common information field.

If the command processor 7000 determines that the current command is not the last command in the command stream, the command processor 7000 may select a command subsequent to the current command in the command stream as the next command to be executed, at 4437. And the command processor may set the selected next command to the current command, and perform the operation 4423.

If the command processor 7000 determines that the current command is the last command in the command stream and the command processor 7000 receives task completion signals from the plurality of neural processors 1000, the command processor 7000 may transmit a context completion signal indicating that the current context of the neural network model has been completed, at 4439.

In some embodiment, if the command processor 7000 receives task completion signals for all tasks distributed to the plurality of neural processors 1000 for the current context of the neural network model, the command processor 7000 may transmit a signal indicating that the current context of the neural network model has been completed.

In some embodiments, the context completion signal may include, or be transmitted along with, an operation result of the current context of the neural network model.

In some embodiments, blocks, units, modules, and components as described above may be implemented as a circuit or circuitry. Blocks, units, modules, and components which perform processing may be referred to as a processor, a processing circuit, a processor circuit, or a processing circuitry. Blocks, units, modules, and components which store data may be referred to as a memory, a memory circuit, or a memory circuitry.

Hereinafter, various aspects will be described.

In some aspects, an apparatus comprises one or more neural processors configured to perform neural network model tasks; a command processor configured to distribute neural network model tasks to the one or more neural processors; and a shared memory shared by the one or more neural processors. The command processor is configured to cause: directly accessing the memory in a host system to read an object database for the neural network model and store the object database in the shared memory, wherein the object database includes one or more objects indicated by indices; determining whether a command descriptor describing a current command is in a first format or in a second format, wherein the first format includes a source memory address pointing to a memory area in the shared memory having a binary code to be accessed according to direct memory access (DMA) scheme, and the second format includes one or more object indices, a respective one of the one or more object indices indicating an object in the object database; in response to a determination that the command descriptor describing the current command is in the second format, converting a format of the command descriptor to the first format; generating one or more task descriptors describing neural network model tasks based on the command descriptor in the first format; and distributing the one or more task descriptors to the one or more neural processors. If a respective one of the one or more neural processors receives a task descriptor, the respective one neural processor directly accesses the shared memory based on the received task descriptor to load a binary code and executes the loaded binary code.

In some aspects, the command processor is further configured to cause: receiving a context start signal indicating a start of a context of a neural network model from the host system; and in response to receiving the context start signal, directly accessing a memory in the host system to read one or more context descriptors.

In some aspects, converting the format the command descriptor comprises: obtaining a default memory address for source memory addresses, determining one or more source memory addresses based on the default memory address and the one or more object indices, and replacing the one or more object indices with the one or more source memory addresses from the command descriptor in the second format to generate the command descriptor in the first format.

In some aspects, obtaining the default memory address for source memory addresses comprises: acquiring the default memory address for source memory addresses from the host system based on the one or more context descriptors.

In some aspects, the command processor is further configured to cause: directly accessing the memory in the host system based on the one or more context descriptors to read binary code data for the neural network model and store the binary code data in the shared memory, the binary code data including one or more binary codes accessed according to direct memory access (DMA) scheme; directly accessing a memory in the host system based on the one or more context descriptors to read a command stream for the neural network model and store the command stream in the shared memory, the command stream including a plurality of command descriptors describing commands; and selecting a command among commands in the command stream as the current command.

In some aspects, directly accessing the memory in the host system to read the object database comprises: directly accessing the memory in the host system based on the one or more context descriptors to read the object database.

In some aspects, the first format further includes: a destination memory address pointing to a memory area in which the accessed binary code is stored, and a transfer size indicating a size of the binary code pointed to by the source memory address.

In some aspects, the one or more objects includes one or more variable assignment objects and one or more computation objects, a respective one of the one or more variable assignment objects includes a sequence of one or more variable assignment statements for assigning values to one or more variables, a respective one of the one or more computation objects includes a sequence of one or more assignment statements for computation, and at least one of the one or more variable assignment objects and at least one of the one or more computation objects form a binary code.

In some aspects, determining comprises: determining whether the command descriptor describing the current command is in the first format or in the second format based on an information field in the command descriptor describing the current command.

In some aspects, the size of bits of the respective one of the one or more object is smaller than the size of bits of the source memory address.

In some aspects, a method performed by a command processor operably coupled to a shared memory shared by one or more neural processors and configured to distribute neural network model tasks to the one or more neural processors, comprises: directly accessing the memory in a host system to read an object database for the neural network model and store the object database in the shared memory, wherein the object database includes one or more objects indicated by indices; determining whether a command descriptor describing a current command is in a first format or in a second format, wherein the first format includes a source memory address pointing to a memory area in the shared memory having a binary code to be accessed according to direct memory access (DMA) scheme, and the second format includes one or more object indices, a respective one of the one or more object indices indicating an object in the object database; in response to a determination that the command descriptor describing the current command is in the second format, converting a format of the command descriptor to the first format; generating one or more task descriptors describing neural network model tasks based on the command descriptor in the first format; and distributing the one or more task descriptors to the one or more neural processors, wherein, if a respective one of the one or more neural processors receives a task descriptor, the respective one neural processor directly accesses the shared memory based on the received task descriptor to load a binary code and executes the loaded binary code.

In some aspects, the method further comprises: receiving a context start signal indicating a start of a context of a neural network model from the host system; and in response to receiving the context start signal, directly accessing a memory in the host system to read one or more context descriptors.

In some aspects, converting the format the command descriptor comprises: obtaining a default memory address for source memory addresses, determining one or more source memory addresses based on the default memory address and the one or more object indices, and replacing the one or more object indices with the one or more source memory addresses from the command descriptor in the second format to generate the command descriptor in the first format.

In some aspects, obtaining the default memory address for source memory addresses comprises: acquiring the default memory address for source memory addresses from the host system based on the one or more context descriptors.

In some aspects, the method further comprises: directly accessing the memory in the host system based on the one or more context descriptors to read binary code data for the neural network model and store the binary code data in the shared memory, the binary code data including one or more binary codes accessed according to direct memory access (DMA) scheme; directly accessing a memory in the host system based on the one or more context descriptors to read a command stream for the neural network model and store the command stream in the shared memory, the command stream including a plurality of command descriptors describing commands; and selecting a command among commands in the command stream as the current command.

In some aspects, directly accessing the memory in the host system to read the object database comprises: directly accessing the memory in the host system based on the one or more context descriptors to read the object database.

In some aspects, the first format further includes: a destination memory address pointing to a memory area in which the accessed binary code is stored, and a transfer size indicating a size of the binary code pointed to by the source memory address.

In some aspects, the one or more objects includes one or more variable assignment objects and one or more computation objects, a respective one of the one or more variable assignment objects includes a sequence of one or more variable assignment statements for assigning values to one or more variables, a respective one of the one or more computation objects includes a sequence of one or more assignment statements for computation, and at least one of the one or more variable assignment objects and at least one of the one or more computation objects form a binary code.

In some aspects, determining comprises: determining whether the command descriptor describing the current command is in the first format or in the second format based on an information field in the command descriptor describing the current command.

In some aspects, the size of bits of the respective one of the one or more object is smaller than the size of bits of the source memory address.

The above description is merely illustrative of the technical idea of the examples, and those of ordinary skill in the art to which the examples pertain will be able to make various modifications and variations without departing from the essential characteristics of the examples. Accordingly, the examples are not intended to limit the technical idea of the examples, but to explain the technical idea, and the scope of the technical idea of the examples is not limited by these examples. The scope of protection of the examples should be interpreted in accordance with the claims below, and all technical ideas within the equivalent scope should be interpreted as being included in the scope of claims of the examples.

The invention claimed is:

1. An apparatus comprising:

one or more neural processors configured to perform neural network model tasks;

a command processor configured to distribute neural network model tasks to the one or more neural processors; and a shared memory shared by the one or more neural processors, wherein the command processor is configured to cause:

directly accessing a memory in a host system to read an object database for a neural network model and store the object database in the shared memory, wherein the object database includes one or more objects indicated by indices;

determining whether a command descriptor describing a current command is in a first format or in a second format, wherein the first format includes a source memory address pointing to a memory area in the shared memory having a binary code to be accessed according to direct memory access (DMA) scheme, and the second format includes one or more object indices, a respective one of the one or more object indices indicating an object in the object database;

in response to a determination that the command descriptor describing the current command is in the second format, converting a format of the command descriptor from the second format to the first format;

generating one or more task descriptors describing neural network model tasks based on the command descriptor in the first format; and distributing the one or more task descriptors to the one or more neural processors, wherein, if a respective one of the one or more neural processors receives a task descriptor, the respective one neural processor directly accesses the shared memory based on the received task descriptor to load a binary code and executes the loaded binary code.

2. The apparatus of claim 1, wherein the command processor is further configured to cause:

receiving a context start signal indicating a start of a context of the neural network model from the host system; and in response to receiving the context start signal, directly accessing the memory in the host system to read one or more context descriptors.

3. The apparatus of claim 2, wherein converting the format the command descriptor comprises:

obtaining a default memory address for source memory addresses, determining one or more source memory addresses based on the default memory address and the one or more object indices, and replacing the one or more object indices with the one or more source memory addresses from the command descriptor in the second format to generate the command descriptor in the first format.

4. The apparatus of claim 3, wherein obtaining the default memory address for source memory addresses comprises:

acquiring the default memory address for source memory addresses from the host system based on the one or more context descriptors.

5. The apparatus of claim 2, wherein the command processor is further configured to cause:

directly accessing the memory in the host system based on the one or more context descriptors to read binary code data for the neural network model and store the binary code data in the shared memory, the binary code data including one or more binary codes accessed according to direct memory access (DMA) scheme;

directly accessing the memory in the host system based on the one or more context descriptors to read a command stream for the neural network model and store the command stream in the shared memory, the command stream including a plurality of command descriptors describing commands; and selecting a command among commands in the command stream as the current command.

6. The apparatus of claim 2, wherein directly accessing the memory in the host system to read the object database comprises:

directly accessing the memory in the host system based on the one or more context descriptors to read the object database.

7. The apparatus of claim 1, wherein the first format further includes: a destination memory address pointing to a memory area in which the accessed binary code is stored, and a transfer size indicating a size of the binary code pointed to by the source memory address.

8. The apparatus of claim 1, wherein the one or more objects includes one or more variable assignment objects and one or more computation objects, a respective one of the one or more variable assignment objects includes a sequence of one or more variable assignment statements for assigning values to one or more variables, a respective one of the one or more computation objects includes a sequence of one or more assignment statements for computation, and at least one of the one or more variable assignment objects and at least one of the one or more computation objects form a binary code.

9. The apparatus of claim 1, wherein determining comprises:

determining whether the command descriptor describing the current command is in the first format or in the second format based on an information field in the command descriptor describing the current command.

10. The apparatus of claim 1, wherein the size of bits of the respective one of the one or more object is smaller than the size of bits of the source memory address.

11. A method performed by a command processor operably coupled to a shared memory shared by one or more neural processors and configured to distribute neural network model tasks to the one or more neural processors, the method comprising:

directly accessing a memory in a host system to read an object database for a neural network model and store the object database in the shared memory, wherein the object database includes one or more objects indicated by indices;

determining whether a command descriptor describing a current command is in a first format or in a second format, wherein the first format includes a source memory address pointing to a memory area in the shared memory having a binary code to be accessed according to direct memory access (DMA) scheme, and the second format includes one or more object indices, a respective one of the one or more object indices indicating an object in the object database;

in response to a determination that the command descriptor describing the current command is in the second format, converting a format of the command descriptor from the second format to the first format;

generating one or more task descriptors describing neural network model tasks based on the command descriptor in the first format; and distributing the one or more task descriptors to the one or more neural processors, wherein, if a respective one of the one or more neural processors receives a task descriptor, the respective one neural processor directly accesses the shared memory based on the received task descriptor to load a binary code and executes the loaded binary code.

12. The method of claim 11, further comprising:

receiving a context start signal indicating a start of a context of the neural network model from the host system; and in response to receiving the context start signal, directly accessing the memory in the host system to read one or more context descriptors.

13. The method of claim 12, wherein converting the format the command descriptor comprises:

obtaining a default memory address for source memory addresses, determining one or more source memory addresses based on the default memory address and the one or more object indices, and replacing the one or more object indices with the one or more source memory addresses from the command descriptor in the second format to generate the command descriptor in the first format.

14. The method of claim 13, wherein obtaining the default memory address for source memory addresses comprises:

acquiring the default memory address for source memory addresses from the host system based on the one or more context descriptors.

15. The method of claim 12, further comprising:

directly accessing the memory in the host system based on the one or more context descriptors to read binary code data for the neural network model and store the binary code data in the shared memory, the binary code data including one or more binary codes accessed according to direct memory access (DMA) scheme;

directly accessing the memory in the host system based on the one or more context descriptors to read a command stream for the neural network model and store the command stream in the shared memory, the command stream including a plurality of command descriptors describing commands; and selecting a command among commands in the command stream as the current command.

16. The method of claim 12, wherein directly accessing the memory in the host system to read the object database comprises:

directly accessing the memory in the host system based on the one or more context descriptors to read the object database.

17. The method of claim 11, wherein the first format further includes: a destination memory address pointing to a memory area in which the accessed binary code is stored, and a transfer size indicating a size of the binary code pointed to by the source memory address.

18. The method of claim 11, wherein the one or more objects includes one or more variable assignment objects and one or more computation objects, a respective one of the one or more variable assignment objects includes a sequence of one or more variable assignment statements for assigning values to one or more variables, a respective one of the one or more computation objects includes a sequence of one or more assignment statements for computation, and at least one of the one or more variable assignment objects and at least one of the one or more computation objects form a binary code.

19. The method of claim 11, wherein determining comprises:

determining whether the command descriptor describing the current command is in the first format or in the second format based on an information field in the command descriptor describing the current command.

20. The method of claim 11, wherein the size of bits of the respective one of the one or more object is smaller than the size of bits of the source memory address.

* * * * *